(12) United States Patent
Long et al.

(10) Patent No.: US 11,827,460 B1
(45) Date of Patent: Nov. 28, 2023

(54) ITEM DE-BINNING SYSTEMS AND METHODS

(71) Applicant: Advanced Farm Technologies, Inc., Davis, CA (US)

(72) Inventors: Evan Long, San Luis Obispo, CA (US); Zachary Pascual, Sacramento, CA (US); Charles Johnstone, Davis, CA (US); Cedric Jeanty, Davis, CA (US)

(73) Assignee: Advanced Farm Technologies, Inc., Davis, CA (US)

( * ) Notice: Subject to any disclaimer, the term of this patent is extended or adjusted under 35 U.S.C. 154(b) by 0 days.

(21) Appl. No.: 18/303,443

(22) Filed: Apr. 19, 2023

Related U.S. Application Data

(60) Provisional application No. 63/363,294, filed on Apr. 20, 2022.

(51) Int. Cl.
  *B65G 47/38* (2006.01)
  *B65G 65/23* (2006.01)
  *B65G 43/00* (2006.01)
  *B65G 47/90* (2006.01)

(52) U.S. Cl.
  CPC ............ *B65G 47/38* (2013.01); *B65G 43/00* (2013.01); *B65G 47/904* (2013.01); *B65G 65/23* (2013.01); *B65G 2201/0211* (2013.01); *B65G 2201/0258* (2013.01)

(58) Field of Classification Search
  None
  See application file for complete search history.

(56) References Cited

U.S. PATENT DOCUMENTS

| | | | |
|---|---|---|---|
| 9,358,586 B2 * | 6/2016 | Brown | B65G 37/00 |
| 11,104,527 B1 | 8/2021 | Zhao et al. | |
| 11,548,742 B2 * | 1/2023 | Krishnamoorthy | B65G 13/00 |
| 2016/0176661 A1 | 6/2016 | Hoek | |
| 2017/0297836 A1 | 10/2017 | Burns | |
| 2020/0324982 A1 | 10/2020 | Wiebe | |
| 2021/0024299 A1 | 1/2021 | Scott et al. | |

FOREIGN PATENT DOCUMENTS

JP      7220115 B2 *  2/2023

* cited by examiner

*Primary Examiner* — Kavel Singh
(74) *Attorney, Agent, or Firm* — Knobbe, Martens, Olson & Bear LLP

(57) ABSTRACT

Systems and methods capable of transferring items from a bin are described. A de-binning system includes an item transfer apparatus including a transfer conveyor configured to move a conveyor belt surface, and a bin sub-frame coupled to the transfer conveyor and configured to receive a bin. While an item-containing bin is secured to the bin sub-frame, the bin sub-frame and the transfer conveyor are inverted to transfer the items onto the transfer conveyor, which can move the items onto a second conveyor belt. Various aspects of the present systems and methods prevent damage to the surface of delicate items being transferred.

54 Claims, 43 Drawing Sheets

ITEM DE-BINNING SYSTEMS AND METHODS

CROSS-REFERENCE TO RELATED APPLICATIONS

This application claims the benefit of U.S. Provisional Application Ser. No. 63/363,294, filed Apr. 20, 2022, entitled "ITEM DE-BINNING SYSTEMS AND METHODS," which is incorporated by reference herein in its entirety.

FIELD

The present disclosure relates to systems and methods for transferring items from a bin or other container.

BACKGROUND

Items may be transported in bins or other containers in a variety of processes or subprocesses. In some case, containers may be used to transport items that are soft, brittle, or otherwise susceptible to structural or cosmetic damage, such as produce (e.g., berries or other fruit, vegetables, and the like). Items may be removed from bins or other containers at various phases in transportation and/or processing operations.

SUMMARY

The systems and methods of this disclosure each have several innovative aspects, no single one of which is solely responsible for its desirable attributes. Without limiting the scope as expressed by the claims that follow, its more prominent features will now be discussed briefly.

In a first aspect, a system for transferring items from a bin includes an item transfer apparatus including a first conveyor configured to move a first conveyor belt surface; and a bin sub-frame coupled to the first conveyor and configured to receive a bin. The system further includes one or more processors and a memory storing computer-executable instructions that, when executed by the one or more processors, cause the one or more processors to actuate one or more motors or actuators to perform operations including: securing a bin containing one or more items to the bin sub-frame such that the first conveyor belt surface covers an opening of the bin; rotating the first conveyor and the bin sub-frame about a first lateral axis to a rotated position in which the items rest on the first conveyor belt surface and are laterally contained by side walls of the bin; and translating the bin sub-frame along a second lateral axis in coordination with movement of the first conveyor belt surface to move the items off of the first conveyor belt surface.

In some embodiments, the items are moved off of the first conveyor belt surface onto an item output flow path including a second conveyor configured to move a second conveyor belt surface at a first speed, and a distal end of the first conveyor is disposed above the second conveyor belt surface when the first conveyor and the bin sub-frame are in the rotated position.

In some embodiments, the movement of the first conveyor belt surface is at a second speed slower than the first speed.

In some embodiments, the bin sub-frame is translated at a same speed relative to a speed of the first conveyor belt surface along the first lateral axis to avoid exerting a shearing force on the items.

In some embodiments, the bin sub-frame includes two parallel side rails spaced apart by a distance greater than or equal to a length or a width of a rim of the bin.

In some embodiments, the bin sub-frame further includes an end rail perpendicular to the two parallel side rails and a rotatable clamp parallel to the end rail, the rotatable clamp configured to rotate between an open configuration and a closed configuration that supports a first side of a rim of a bin within the bin sub-frame.

In some embodiments, the end rail includes one or more pads including a rubber material, the one or more pads disposed to contact a second side of the rim of the bin.

In some embodiments, the instructions further cause the one or more processors to actuate the one or more motors or actuators to perform operations including rotating the first conveyor and the bin sub-frame about the first lateral axis to an initial position after the items are dropped onto the item output flow path; and moving the clamp to the open position to release the bin onto a bin output flow path.

In some embodiments, securing the bin to the bin sub-frame includes receiving the bin within the bin sub-frame from an input flow path; and moving one or more clamps coupled to the bin sub-frame to secure a rim of the bin between the one or more clamps and another component of the item transfer apparatus.

In some embodiments, the first conveyor includes a first end roller and a second end roller, and wherein the first conveyor belt surface is mounted on the first and second end rollers such that the first conveyor belt surface is unsupported between the first and second end rollers.

In some embodiments, the items fall less than 2 inches from the first conveyor belt surface onto a surface of the item output flow path.

In some embodiments, the item transfer apparatus further includes a robotic arm configured to move the bin sub-frame and the first conveyor.

In some embodiments, the second lateral axis is parallel to the first lateral axis.

In some embodiments, the second lateral axis is perpendicular to the first lateral axis.

In some embodiments, the items are strawberries.

In some embodiments, the item output flow path conveys the strawberries to a strawberry pack line.

In a second aspect, a method of transferring items from a bin includes, under control of one or more processors: receiving, at a bin sub-frame of an item transfer apparatus, a bin containing one or more items; securing the bin to the bin sub-frame such that a first conveyor belt surface covers an opening of the bin; simultaneously rotating the bin sub-frame and the first conveyor belt surface about a first lateral axis to a rotated position in which the items rest on the first conveyor belt surface and are laterally contained by side walls of the bin; and translating the bin sub-frame along a second lateral axis in coordination with movement of the first conveyor belt surface to drop the items from the first conveyor belt surface onto an item output flow path.

In some embodiments, the item output flow path includes a second conveyor configured to move a second conveyor belt surface at a first speed, and wherein the movement of the first conveyor belt surface is at a second speed slower than the first speed.

In some embodiments, the bin sub-frame is translated at a same speed relative to a speed of the first conveyor belt surface along the first lateral axis to avoid exerting a shearing force on the items.

In some embodiments, securing the bin to the bin sub-frame includes moving one or more clamps movably coupled to the bin sub-frame to secure a rim of the bin within the bin sub-frame.

In some embodiments, the method further includes rotating the first conveyor and the bin sub-frame about the first lateral axis to an initial position after the items are dropped onto the item output flow path; and moving the one or more clamps to release the bin onto a bin output flow path.

In some embodiments, simultaneously rotating the bin sub-frame and the first conveyor belt surface causes the items to rest on an unsupported portion of the first conveyor belt surface.

In some embodiments, dropping the items from the first conveyor belt surface onto the item output flow path includes dropping the items a vertical distance of less than 2 inches.

In some embodiments, the second lateral axis is parallel to the first lateral axis.

In some embodiments, the second lateral axis is perpendicular to the first lateral axis.

In some embodiments, the items are strawberries.

In some embodiments, the item output flow path conveys the strawberries to a strawberry pack line.

BRIEF DESCRIPTION OF THE DRAWINGS

The above-mentioned aspects, as well as other features, aspects, and advantages of embodiments of the present disclosure will now be described in connection with various implementations, with reference to the accompanying drawings. The illustrated implementations are merely examples and are not intended to be limiting. Throughout the drawings, similar symbols typically identify similar components, unless context dictates otherwise.

DETAILED DESCRIPTION

Figure 1:
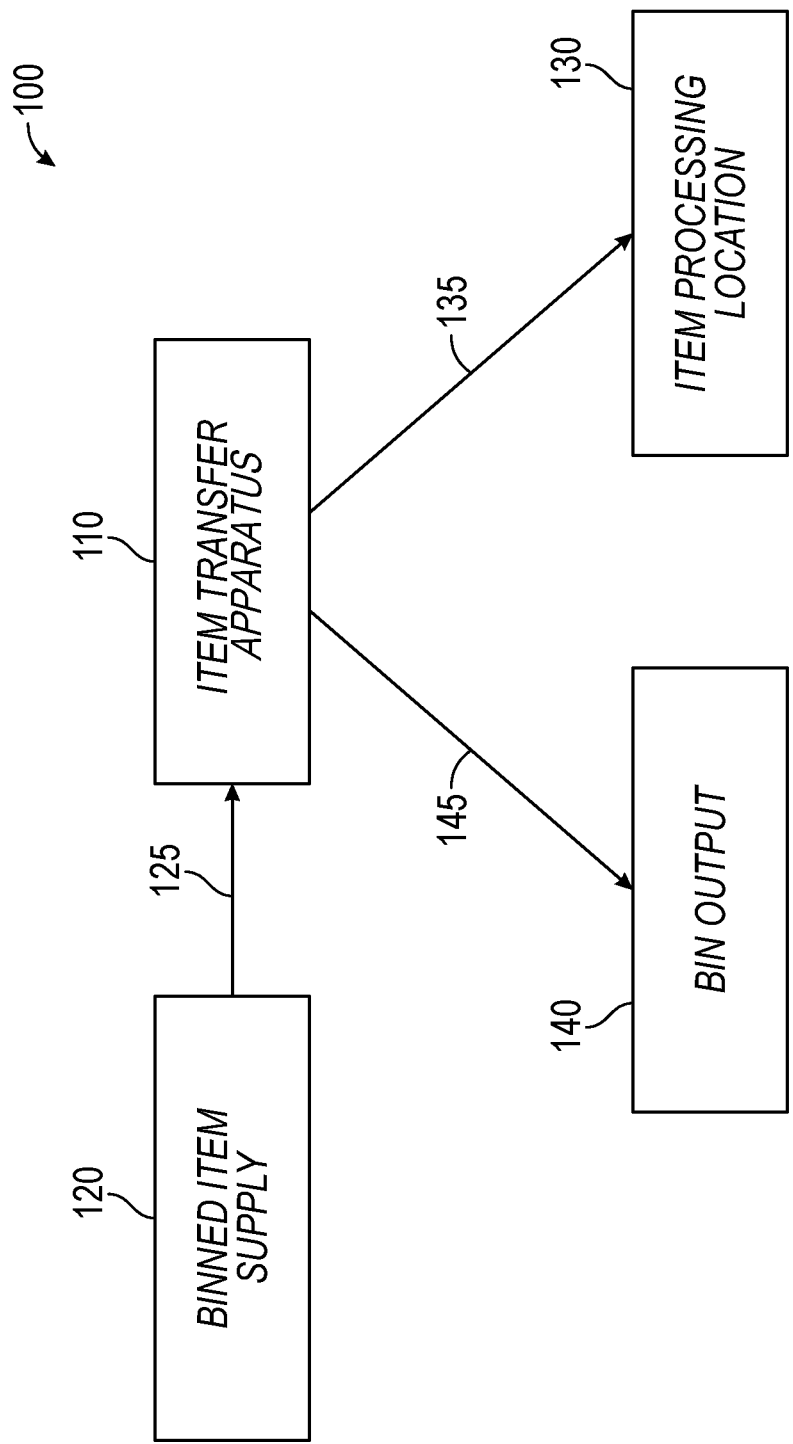
FIG. 1 is a schematic illustration of an example item processing system including an item transfer apparatus.

Embodiments of the present disclosure provide systems and methods capable of transferring items from a bin or other container within a partially or fully automated process such as for transportation, processing, or packaging of items. Throughout the following description, various embodiments will be described with reference to the example implementation of de-binning and/or processing agricultural crops such as strawberries. However, it will be understood that any of the systems, devices, or methods described herein may equally be applied to any other industrial, agricultural, or other application, for example, handling, transporting, loading, unloading, and/or processing of other crops, eggs or other delicate items, or the like.

Items may be transported in containers, such as bins or other open or closed containers. For example, in manual or autonomous harvesting of crops, items such as berries (e.g., strawberries or other berries), apples, or any other fruit or vegetable crop may be picked and placed into a bin or other container for transportation from the location where the items are grown (e.g., a field, orchard, etc.) to a secondary location (e.g., a processing, shipping, or transport facility) where the items are packed into smaller or different containers or otherwise processed. For example, in the non-limiting example implementation of strawberry harvesting, strawberries may be transported in open bins from a field where the strawberries are grown to a processing facility such as a pack line where they are removed from the bins and placed into smaller containers such as clamshells for transportation to retailers, consumers, or other strawberry processing entities.

Transferring items from bins to other processing systems can be done manually. Manually transferring items can be imprecise and time-consuming, especially when the items being transferred are delicate, breakable, or susceptible to cosmetic damage such as bruises or other blemishes on the skin of a fruit or vegetable item. Items may be dropped and damaged during a manual transfer, causing waste and reduced yield from harvesting of crops. In addition, manual transfer involves cost-intensive and highly variable labor sources, as well as additional supervisory resources to ensure quality control. Advantageously, embodiments of the present disclosure provide for rapid, efficient automated transfer of items from a bin to a conveyor or other item receiving structure, while avoiding impacts or other forces such as pinching, crushing, impact forces, and the like, that may damage items such as fruits, vegetables, or other agricultural crops.

Further processing of items after de-binning, such as sorting, packing, or other processing operations, may be difficult or unreliable if the items remain in piles or clusters after they are removed from a bin or other container. Advantageously, the present technology may further provide for automatic singulation of items during a de-binning operation. For example, in some implementations, singulation can be achieved by transferring items from a transfer conveyor moving at a first speed onto a second conveyor moving at a greater speed such that the items have an increased spacing as they are transported away from the de-binning apparatus on the second conveyor. In another example, a gradual transfer process using translation of the bin in coordination with movement of the transfer conveyor, can further improve singulation by causing a few items at a time to fall from the transfer conveyor onto the second conveyor, rather than transferring all items from the bin onto the second conveyor simultaneously.

Item Processing Systems

FIG. 1 schematic illustration of an example item processing system 100 including an item transfer apparatus 110. The item processing system 100 further includes a binned item supply 120, an item processing location 130, and a bin output 140. Bins containing items can be transported from the binned item supply 120 to the item transfer apparatus 110 by an intake flow path 125. After items are transferred from the bins at the item transfer apparatus 110, the de-binned items can be transported to an item processing location 130 by an item output flow path 135 and the empty bins can be transported to the bin output 140 by a bin output flow path 145.

Each of the flow paths 125, 135, 145 can be, for example, a conveyor or other transport mechanism, such as a conveyor belt surface, a series of rollers, any combination thereof, or any other conveying system configured to move bins and/or items laterally and/or vertically. In some embodiments, the intake flow path 125 and the bin output flow path 145 may include a sloped series of rollers that facilitate transport of full or empty bins by gravity. The item output flow path 135 may include a moving conveyor belt surface which may, in some cases, be more suitable than a series of rollers for transporting individual items that are not located within bins.

The binned item supply 120 can include one or more devices or systems for providing bins containing items. For example, the binned item supply 120 can include a receiving platform, a loading dock, a receiving end of the input flow path 125 (e.g., an upper end of a sloped series of rollers), etc., where item-containing bins are received from transport vehicles, harvesters, or the like, manually or by an automated process.

The item processing location 130 can include one or more devices or systems for processing the items after being transferred from bins. For example, in the non-limiting example implementation of strawberry harvesting, the item processing location 130 can include a sorting and/or packing line in which the de-binned strawberries can be sorted by any desired characteristic or characteristics, such as size, ripeness, cosmetic appearance/skin damage, etc., and/or can be packed into containers such as clamshells or other suitable containers for shipment from the item processing location 130. Processing of items at the item processing location 130 can be manual, automated, or a combination of manual and automated.

The bin output 140 can include one or more lines, piles, stacks, carts, dispensers, receivers, or other structures capable of holding a plurality of bins. For example, the bin output 140 may include a bin receiving system located at an end of the bin output flow path 145 for receiving and stacking or otherwise organizing empty bins to be reused for transporting additional items.

In an example method of operation, the item transfer apparatus 110 receives a first bin containing items from the binned item supply 120 via the input flow path 125. At the item transfer apparatus 110, the items in the bin are transferred from the bin to the item output flow path 135. After the transfer, the items travel to the item processing location 130 via the item output flow path 135. The empty bin is sent to the bin output 140 via the bin output flow path 145. After the bin leaves the item transfer apparatus 110, the example method can be repeated with a second bin containing additional items. This example method can be repeated any number of times or indefinitely, for example, based on a desired rate or number of item-containing bins received for processing.

Example Item Processing System According to the Present Disclosure

Figure 2A:
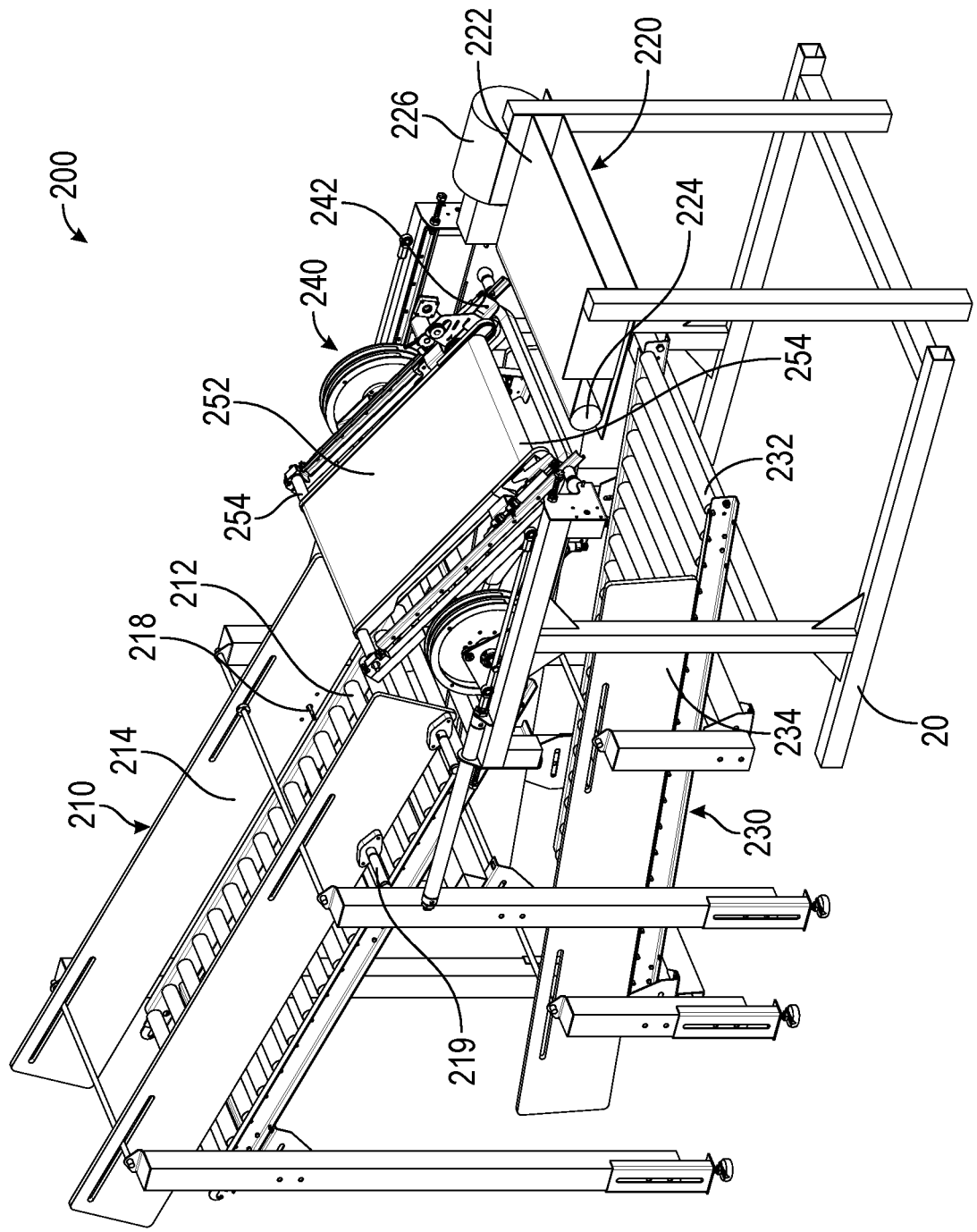
FIGS. 2A-2G depict an example embodiment of a portion of an item processing system including an item transfer apparatus for de-binning items in accordance with the present technology.
Figure 2B:
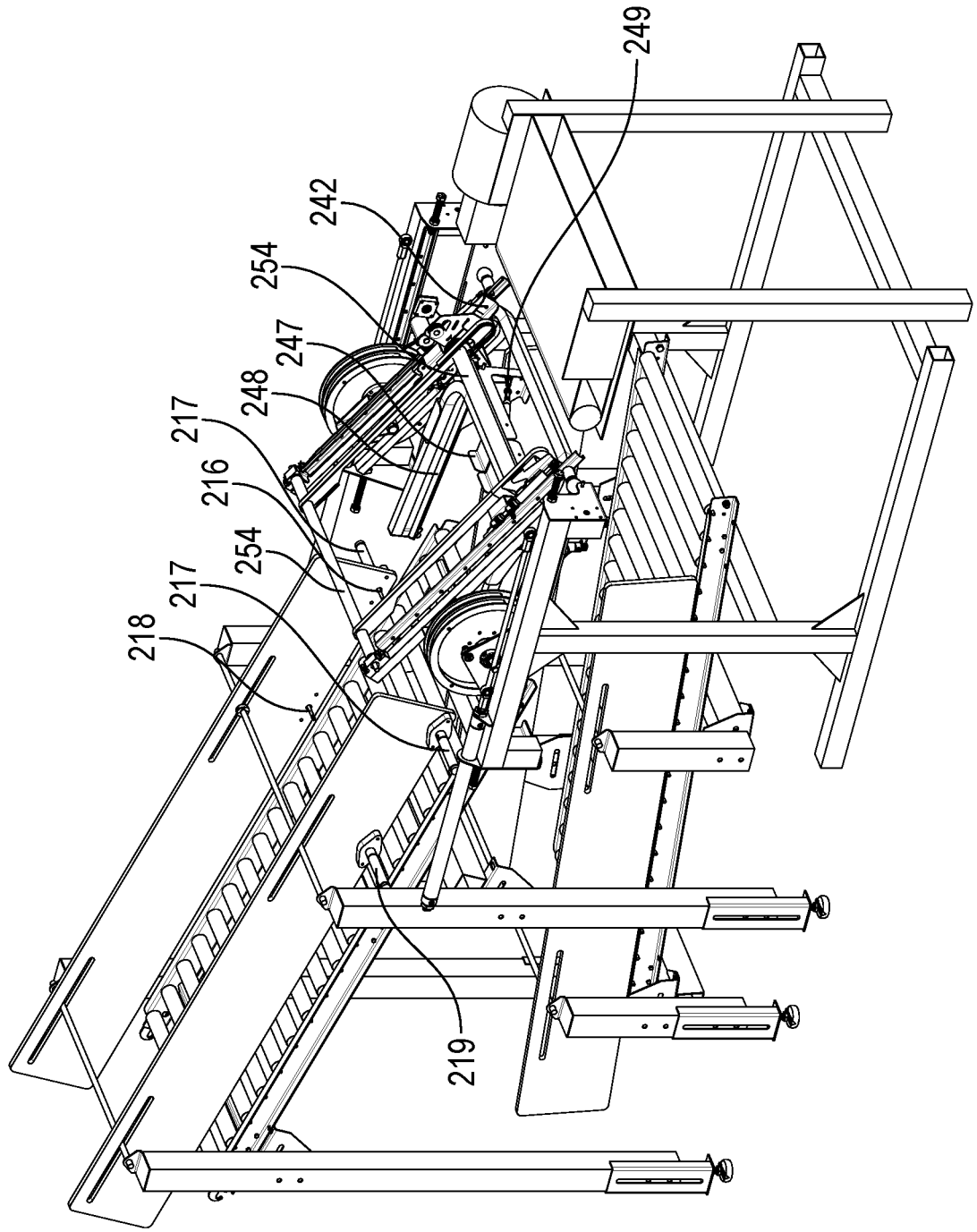
Figure 2C:
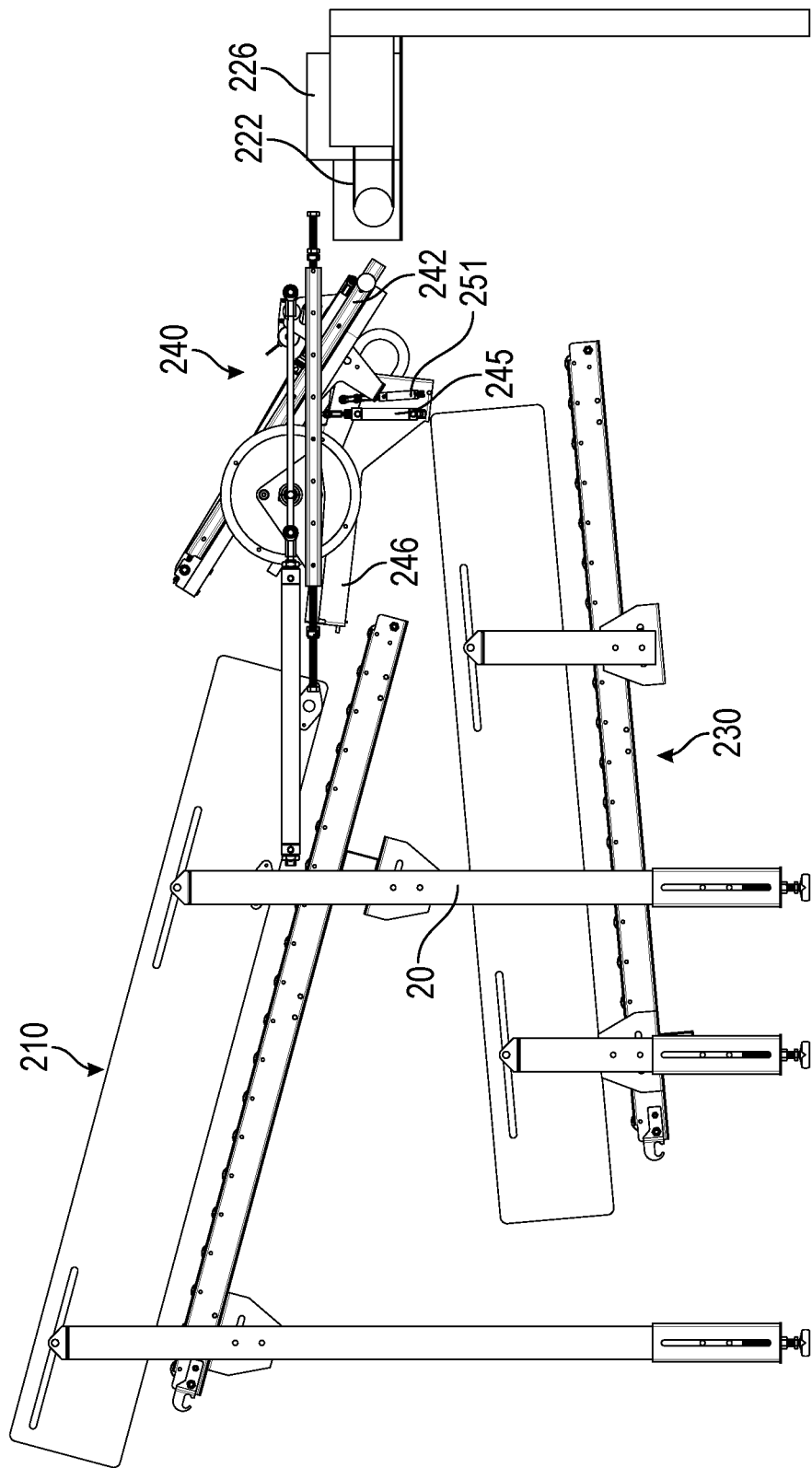
Figure 2D:
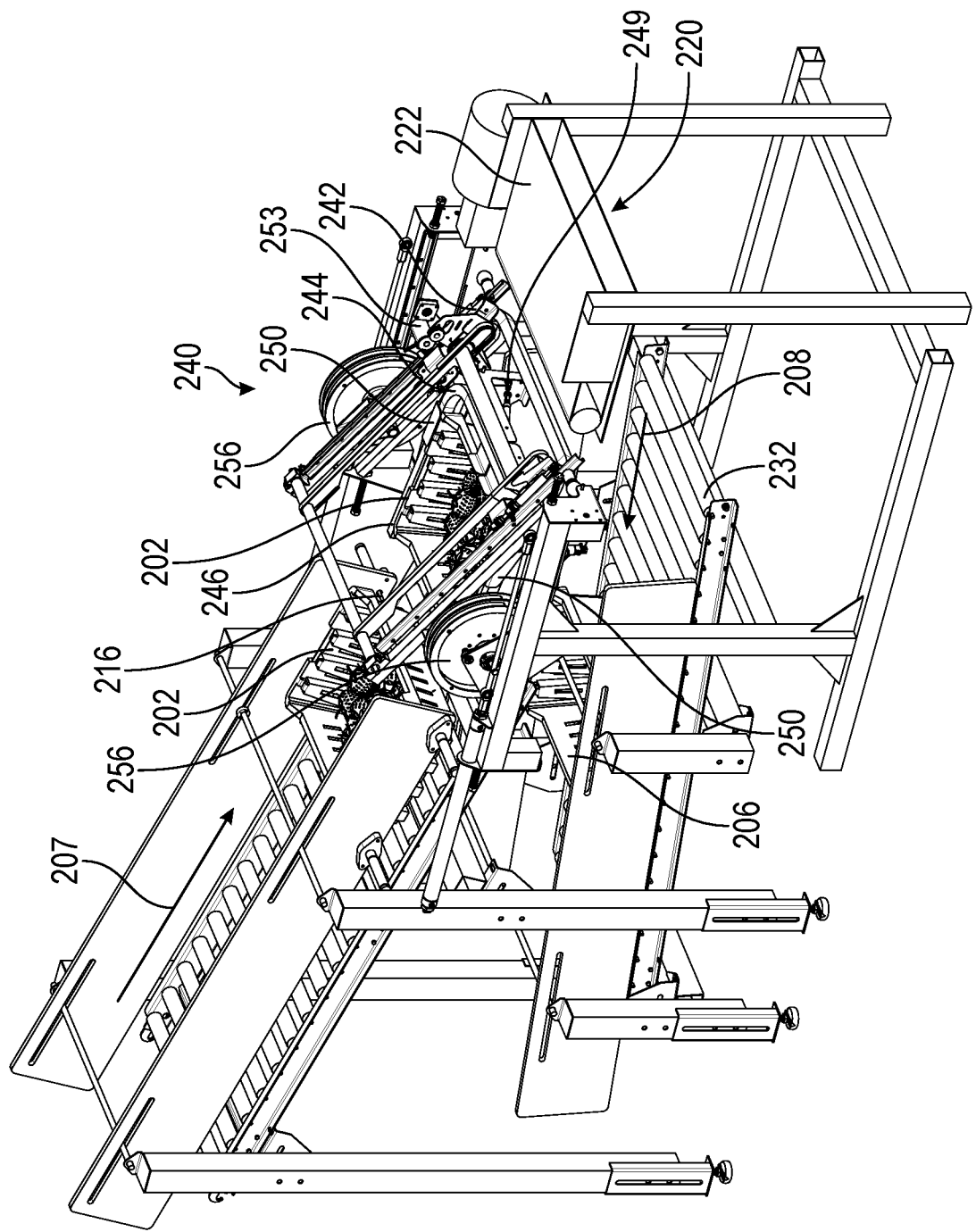
Figure 2E:
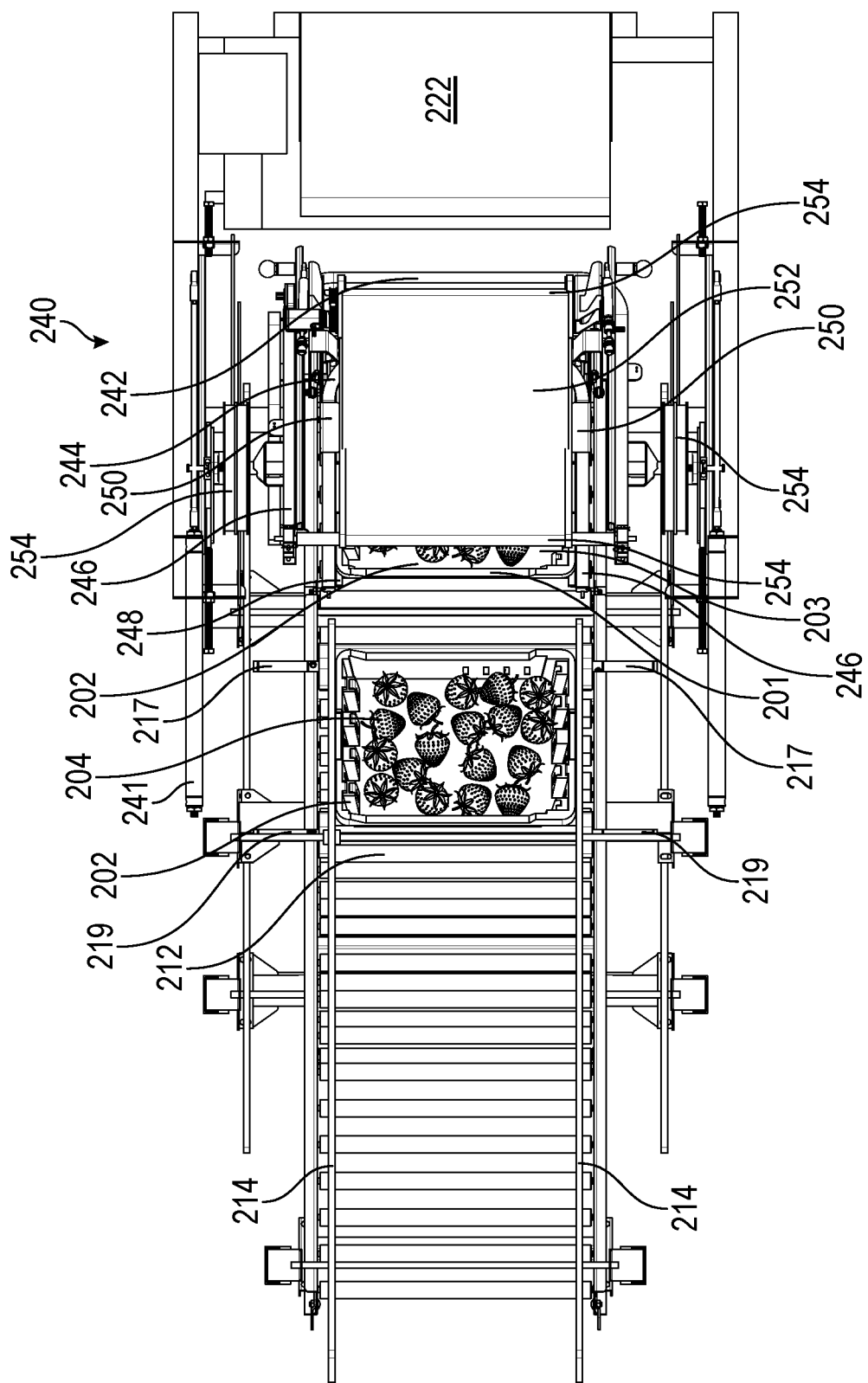
Figure 2F:
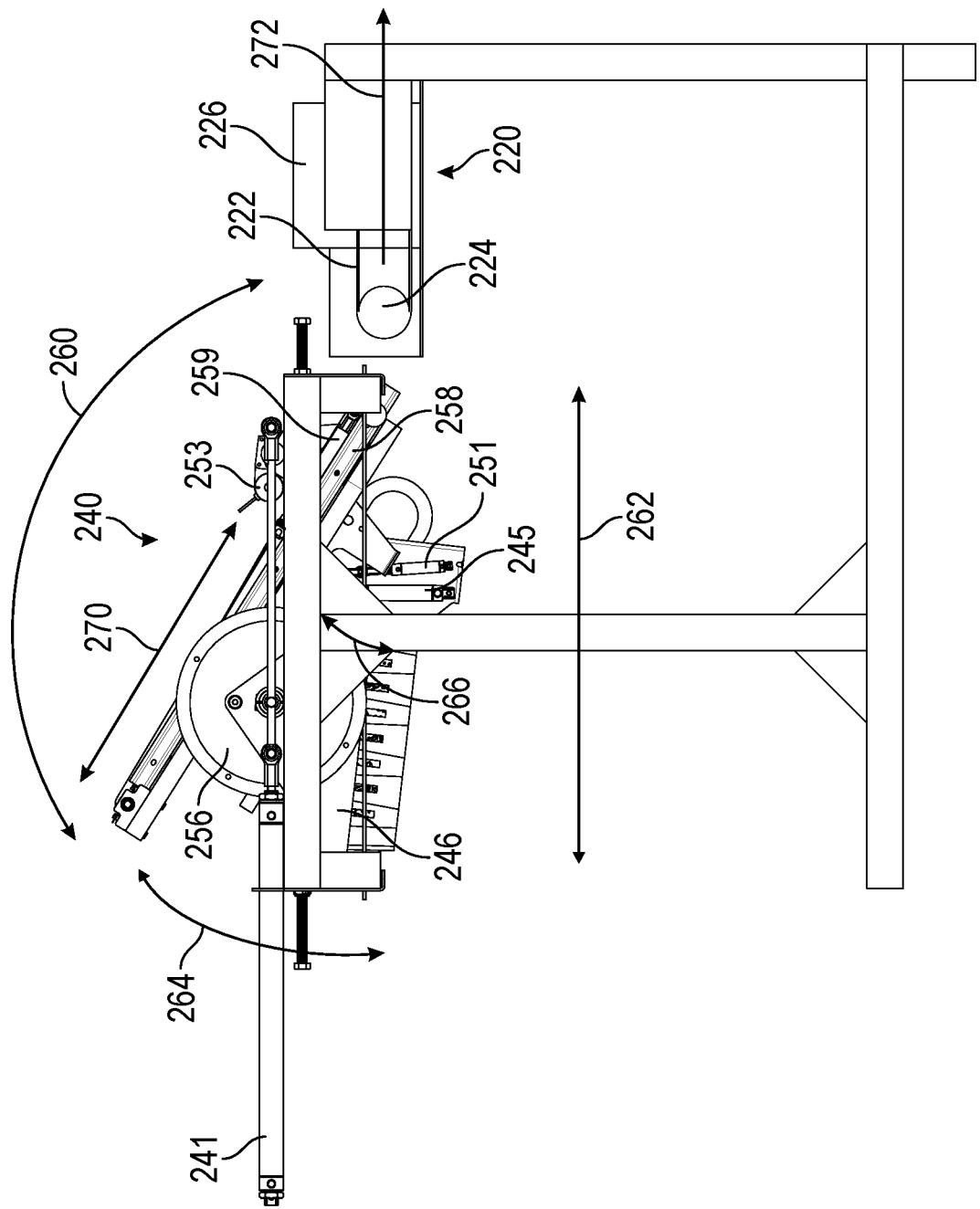
Figure 2G:
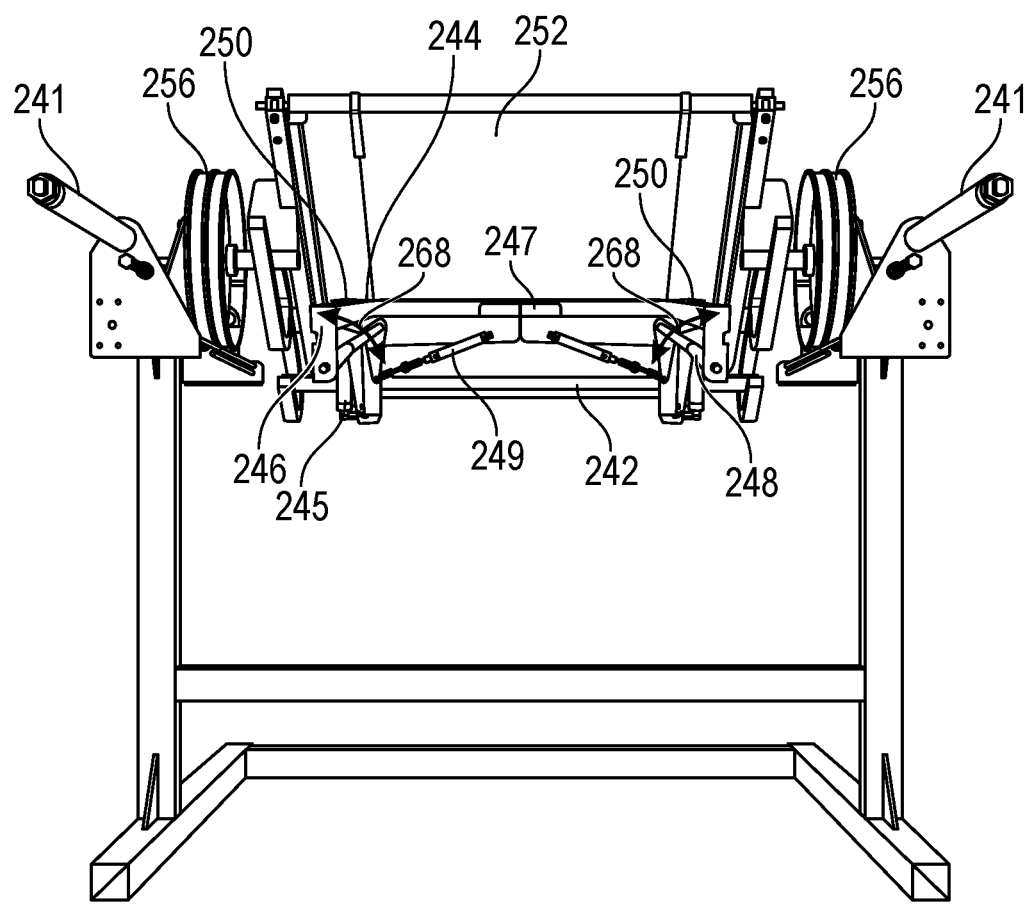

FIGS. 2A-2G depict an example embodiment of at least a portion of an item processing system 200 for de-binning items in accordance with the present technology. FIGS. 2A and 2B are upper side perspective views of the item processing system 200, FIG. 2B being a partial cutaway view in which a movable conveyor 252 is hidden for visibility of certain components. FIG. 2C is a side elevation view of the item processing system 200 in which portions of an external frame 202 are hidden for visibility of certain components. FIGS. 2D and 2E are a partial cutaway upper perspective view and a top plan view, respectively, showing item-containing bins 202 and an empty bin 206 within the item processing system 200. FIGS. 2F and 2G are a side elevation view and a front elevation view, respectively, showing additional details and axes of motion of various components of an item transfer apparatus 240 of the item processing system 200.

As shown in FIGS. 2A-2G, the item processing system 200 includes an input section 210, an item output section 220, a bin output section 230, and an item transfer apparatus 240. Some or all of the components of the item processing system 200 may be supported by a frame 20, which can be a single connected frame 20 or a plurality of sub-frames. In various embodiments, the frame 20 can be any size, shape, or configuration suitable to support the various components of the item processing system 200. For example, the frame 20 can be built into a wall, a shelf, a floor, an agricultural product pack line, or the like, and need not be a free-standing frame as shown in the figures.

Generally described, the item processing system 200 is configured to receive bins containing items at the input section 210, which delivers the bins to the item transfer apparatus 240. The item transfer apparatus 240 is configured to transfer the items from the bins to the item output section 220 and to release the empty bins via the bin output section 230. Accordingly, the input section 210 may correspond to at least a portion of the input flow path 125 of FIG. 1, the item output section 220 may correspond to at least a portion of the item output flow path 135 of FIG. 1, and the bin output section 230 may correspond to at least a portion of the bin output flow path 145 of FIG. 1.

The input section 210 includes a series of rollers 212, sidewalls 214, and bin retainers 216 controlled by bin retainer actuators 217. The input section 210 can further include secondary bin retainers 218 controlled by secondary bin retainer actuators 219. The input section 210 conveys bins along direction 207 (FIG. 2D) toward the item transfer apparatus 240. In the example input section 210 of FIGS. 2A-2E, the rollers 212 are free-spinning rollers in an inclined ramp configuration, allowing gravity to convey the bins along direction 207. Various other implementations are possible, for example, a flat or inclined powered conveyor belt could be used in place of the rollers 212. The end of the input section 210 along direction 207 is disposed proximate the item transfer apparatus 240 such that bins traveling along direction 207 slide off of the rollers 212 and into the item transfer apparatus 240.

Figure 3:
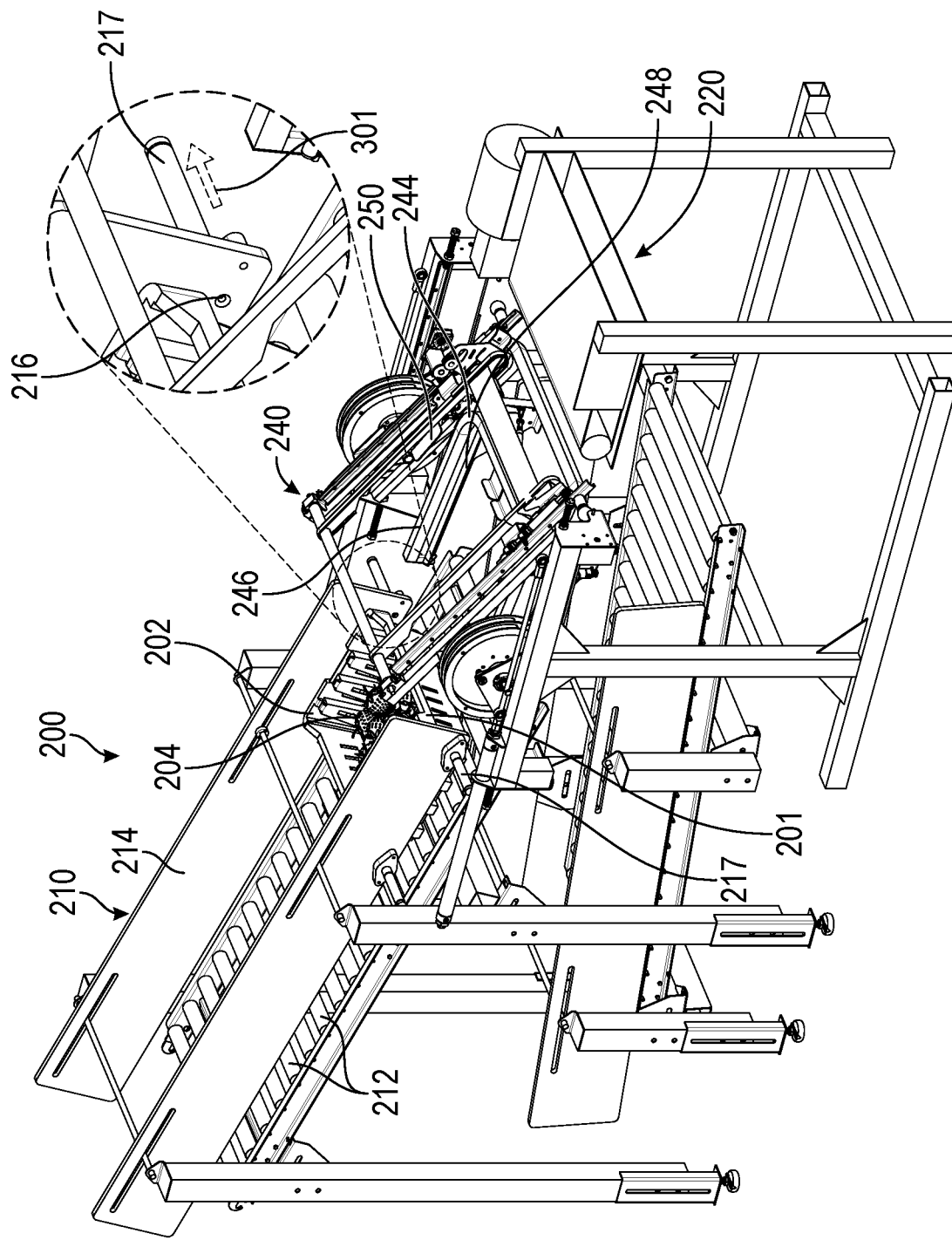
FIGS. 3-12 depict an example sequence for transferring items from a bin using the example item processing system of FIGS. 2A-2G.

The bin retainers 216, and secondary bin retainers 218 if present, are movable by the bin retainer actuators 217 and secondary bin retainer actuators 219, respectively. Each of the bin retainers 216 and the secondary bin retainers 218 are movable between an extended position (e.g., as shown throughout FIGS. 2A-2E) and a retracted position (e.g., as shown in FIG. 3). In the extended position, the bin retainers 216 and/or secondary bin retainers 218 protrude through the sidewalls 214 at a height above the tops of the rollers 212 so as to block the free passage of bins along direction 207. For example, FIGS. 2D and 2E show the bin retainers 216 retaining one item-containing bin 202 on the rollers 212 while another item-containing bin 202 is being emptied within the item transfer apparatus 240. In the retracted position, the bin retainers 216 and/or secondary bin retainers 218 are partially or entirely disposed within their respective actuators such that a bin can pass along direction 207. In some embodiments, only one set of bin retainers 216 is present, or only a single bin retainer 216 and/or a single secondary bin retainer 218 is present. The presence of at least one bin retainer 216 and at least one secondary bin retainer 218 may advantageously prevent the unintended introduction of a second bin 202 into the item transfer apparatus 240 before a first bin 202 has left the item transfer apparatus 240.

The item output section 220 can be in the form of a conveyor configured to move a conveyor belt surface 222 to move transferred items away from the item transfer apparatus 240 to an item processing location such as a pack line or other processing equipment. The conveyor belt surface 222 may be supported on one or more rollers 224 and may be powered by an output conveyor motor 226. As shown in FIG. 2F, the output conveyor motor 226 can cause the upper conveyor belt surface 222 to travel along direction 272 to carry items away from the item processing apparatus 240.

In some embodiments, a relatively large gap may be provided between the end roller 224 (shown in FIGS. 2A-2F) and the next roller supporting the conveyor belt surface 222. For example, the next roller may be spaced from the end roller 224 by a distance of 6 inches, 1 foot 2 feet, or more, such that items deposited onto the conveyor belt surface 222 fall onto an unsupported section of the conveyor belt surface between rollers. Advantageously, this configuration provides greater resilience in the area where items are deposited onto the conveyor belt surface 222 and decreases the probability of bruising or other cosmetic damage to the surface of the items.

The bin output section 230 includes a series of rollers 232 and sidewalls 234. The bin output section 230 conveys bins along direction 208 (FIG. 2D) away from the item transfer apparatus 240. In the example bin output section 230 of FIGS. 2A-2E, the rollers 232 are free-spinning rollers in an inclined ramp configuration, allowing gravity to convey the bins along direction 208. Various other implementations are possible, for example, a flat or inclined powered conveyor belt could be used in place of the rollers 232. The bin output section 230 extends at least partially below the item transfer apparatus 240 such that empty bins released from the item transfer apparatus 240 fall onto the rollers 232 of the bin output section 230 and are conveyed away from the item transfer apparatus 240. For example, FIG. 2D depicts an empty bin 206 traveling out of the item processing system 200 along direction 208 in the bin output section 230.

The item transfer apparatus 240 is configured to receive item-containing bins from the input section 210 and to transfer the items from the bins to the item output section 220. The item transfer apparatus 240 includes a rotatable frame 242 coupled to a bin sub-frame 244 and a transfer conveyor 252. The bin sub-frame 244 includes side rails 246 and an end rail 247. Retractable support pawls 248 extend inward from the side rails 246. Clamps 250 are movably mounted about and at least partially above the side rails 246. The transfer conveyor 252 is mounted on rollers 254 disposed at opposing ends of the transfer conveyor 252. A motor 253 powers the transfer conveyor 252.

The item transfer apparatus 240 is further configured to secure a bin 202 which may contain items 204 such as strawberries, other produce, or any other items to be transferred. As shown in FIGS. 2D and 2E, the side rails 246 are spaced apart by a suitable distance such that a rim 201 of the bin 202 fits between the two side rails 246. When a bin 202 is secured within the item transfer apparatus 240, the rim 201 of the bin 202 is restrained laterally on three sides by the side rails 246 and the end rail 247. The rim 201 is restrained vertically between the support pawls 248 contacting the underside of the rim 201 and the clamps 250 contacting the top side of the rim 201.

Referring now to FIGS. 2F and 2G, many of the components of the item processing system 200 can move along various axes in order to transfer items from a bin, under control of one or more motors. For example, the rotatable frame 242 can rotate about a lateral axis along rotational direction 260. Rotation of the rotatable frame 242 can be controlled by frame rotation actuators 241, which may be linear actuators such as pneumatic cylinders or any other suitable actuators. Frame rotation actuators 241 may induce rotation of the rotatable frame 242 using linear motion along direction 262 in conjunction with wheels 256.

In addition to rotation of the entire rotatable frame 242, including the bin sub-frame 244 and the transfer conveyor 252, the bin sub-frame 244 and the transfer conveyor 252 can be linearly or rotationally movable relative to each other. For example, the item transfer apparatus 240 can include one or more actuators to move either or both of the bin sub-frame 244 and the transfer conveyor 252 relative to the rotatable frame 242. In the non-limiting example item transfer apparatus 240 of FIGS. 2A-2G, the transfer conveyor 252 is fixed relative to the rotatable frame 242 while the bin sub-frame 244 is rotationally movable along rotational direction 264 about a lateral axis parallel to the lateral axis about which the rotatable frame 242 rotates. Rotational movement of the bin sub-frame 244 can be controlled by bin rotation actuators 245 which induce rotational motion of the bin sub-frame 244 in conjunction with a hinged connection between the bin sub-frame 244 and the rotatable frame 242. Bin rotation actuators 245 can be any suitable linear actuator, such as pneumatic cylinders or other actuators.

Further linear actuators can be included to control movement of the support pawls 248 and the clamps 250. For example, pawl actuators 249 mounted to the bin sub-frame 244 can move to cause extension and retraction of the support pawls 248 along direction 268. Clamp actuators 251 can move to open and close the clamps 250 along direction 266. Either or both of the pawl actuators 249 and the clamp actuators 251 can be any suitable linear actuator, such as pneumatic cylinders or other actuators.

In addition, the bin sub-frame 244 and the conveyor belt surface of the transfer conveyor 252 can both be linearly movable along direction 270. The conveyor belt surface of the transfer conveyor 252 (e.g., the bin-facing portion of the conveyor belt surface) can be controlled by transfer conveyor motor 253. Linear movement of the bin sub-frame 244 can be controlled by bin translation actuators 259, which can cause the bin sub-frame 244 to slide along rails 258. It will be understood that linear translation direction 270 extends parallel to the surface of the transfer conveyor 252 regardless of rotational orientation of the rotatable frame 242 and thus rotates along with rotation of the rotatable frame 242.

Figure 2H:
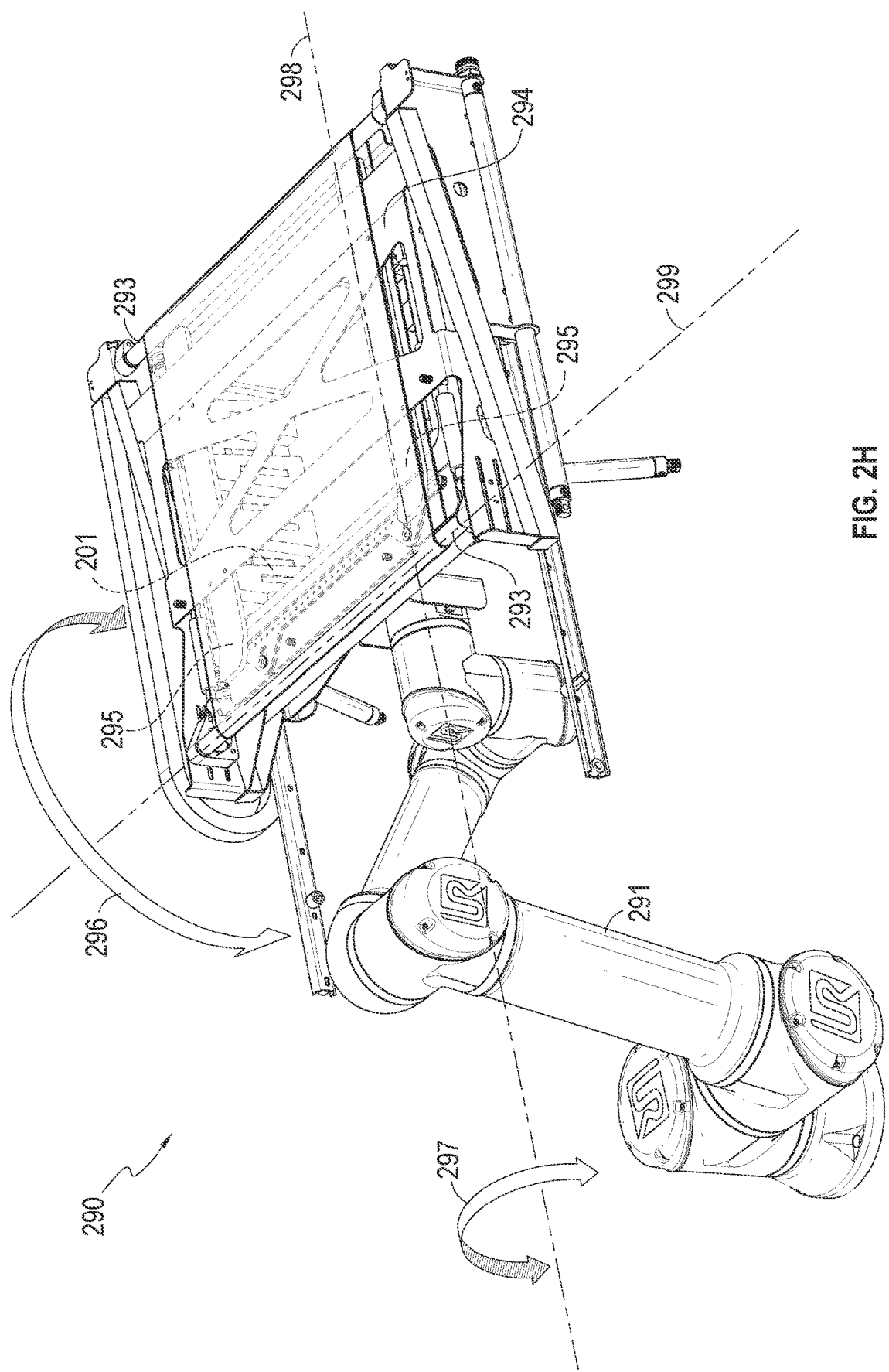
FIG. 2H depicts an example embodiment of an item transfer apparatus in accordance with the present technology.

FIG. 2H depicts a further example of an item transfer apparatus 290 which may be used in conjunction with any of the systems and processes of the present technology. Similar to the item transfer apparatus 240 of FIGS. 2A-2G, the item transfer apparatus 290 includes a frame configured to secure a bin 202 or other container while items within the bin 202 are rotationally transferred from the bin 202 onto a conveyor belt surface of a transfer conveyor 292 which extends between rollers 293.

In the example item transfer apparatus 290, the frame supporting the bin 202 and the transfer conveyor 292 are connected to a robotic arm 291 capable of translating and/or rotating the frame along multiple axes. For example, in some embodiments the item transfer apparatus 290 can rotationally transfer items from the bin 202 onto the transfer conveyor 292 by rotation along direction 296 about a lateral axis 299 (e.g., in the same rotational direction described below with reference to FIGS. 7A and 7B) and/or by rotation along direction 297 about a longitudinal axis 298 perpendicular to the lateral axis 299. In some embodiments, the item transfer apparatus 290 may be used to transfer items in an item processing system in which the input section, bin output section, and item output section are not necessarily aligned along a single longitudinal axis.

As described elsewhere herein, at least a portion of the transfer conveyor 292 may be unsupported so as to provide a resilient surface that cushions the transfer of items from the bin 202 onto the transfer conveyor 292. A further example of an unsupported transfer conveyor 292 configuration is illustrated in FIG. 2H. As shown in FIG. 2H, additional components such as a shear member 294 and/or edge guide members 295 may be present between the two conveyor belt surfaces of the transfer conveyor 292.

The shear member 294 is included to provide additional rigidity and/or dimensional stability to the frame portion of the item transfer apparatus 290. The shear member 294 is a generally planar component which may be spaced away from the bin-facing conveyor belt surface of the transfer conveyor 292 such that it is located relatively closer to the upper conveyor belt surface of the transfer conveyor 292. Accordingly, the spacing between the shear member 294 and the bin-facing conveyor belt surface allows for a downward deflection of the unsupported bin-facing conveyor belt surface as the items are rotationally transferred onto the transfer conveyor 292.

Edge guide members 295 are disposed between the two opposing conveyor belt surfaces and are configured to prevent items from leaving the item transfer apparatus 290 between the rim of bin 202 and the lateral edges of the transfer conveyor 292 during rotational transfer of the items onto the transfer conveyor 292. In some embodiments, the edge guide members 295 may be spaced away from the bin-facing conveyor belt surface of the transfer conveyor 292 and/or may be located where they lie opposite the side walls of the bin 202. Accordingly, the edge members 295 can advantageously improve retention of items between the bin 202 and the transfer conveyor 292, while maintaining the unsupported configuration of the bin-facing conveyor belt surface of the transfer conveyor 292.

Example Item Transfer Process According to the Present Disclosure

FIGS. 3-12 sequentially illustrate an example process for transferring items from a bin 202 using an item processing system 200 as disclosed herein. Although the process of FIGS. 3-12 is shown and described in the context of the item processing system 200 of FIGS. 2A-2G, it will be appreciated that the same or similar steps may be implemented in conjunction with another item processing system or item transfer apparatus without departing from the scope of the present disclosure. For example, the process of FIGS. 3-12 can be implemented in conjunction with the item transfer apparatus 290 of FIG. 2H. Moreover, although the process of FIGS. 3-12 is shown and described in the context of transferring strawberries from a bin to a conveyor for further processing, the same or similar steps may be implemented in the context of any other transfer of items from a container.

FIG. 3 depicts an initial state of the item transfer process. In the initial state, a bin 202 contains items 204. The items can be strawberries, other produce, or any other type of item contained within the bin 202. In the initial state of FIG. 3, the item-containing bin 202 has passed through the input section 210 by traveling along rollers 212 between sidewalls 214 until reaching bin retainers 216. From the initial state, as shown in FIG. 3, bin retainer actuators 217 retract the bin retainers 216 (e.g., by moving the bin retainers 216 along direction 301) to release the bin 202 from the input section 210 such that the bin 202 can travel into the item transfer apparatus 240.

Figure 4A:
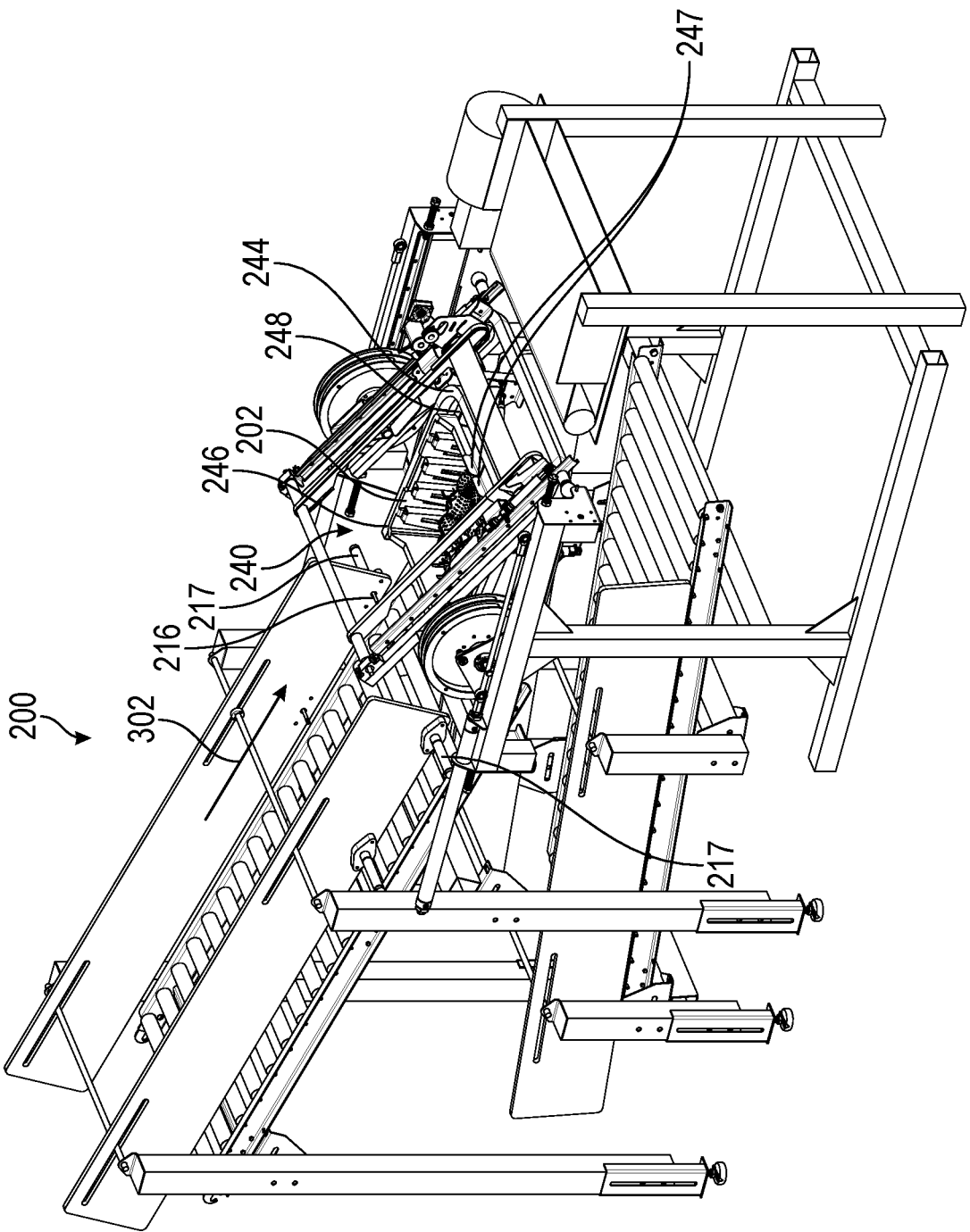
Figure 4B:
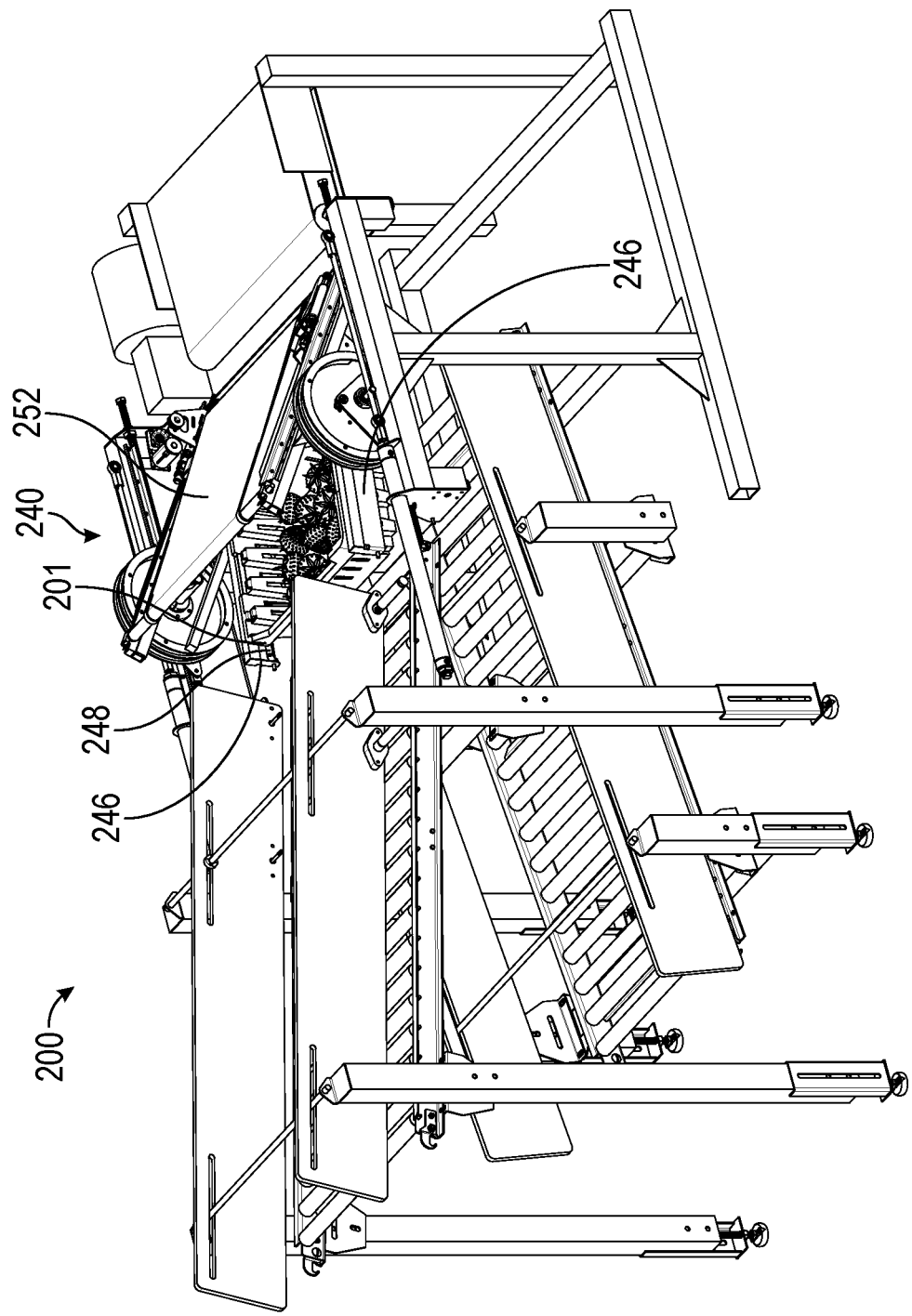

After the bin retainers 216 are retracted, the process continues to the configuration shown in FIGS. 4A and 4B. The transfer conveyor 252 is hidden in FIG. 4A to illustrate components behind the transfer conveyor 252. As shown in the transition from FIG. 3 to FIGS. 4A and 4B, the bin 202 continues traveling along direction 302 from the input section 210 into the bin sub-frame 244 of the item transfer apparatus 240. As the bin 202 enters the bin sub-frame 244 of the item transfer apparatus 240, the rim 201 of the bin 202 enters the space between the side rails 246 and is supported by the support pawls 248. The bin 202 continues sliding into the item transfer apparatus 240 until the rim 201 contacts the end rail 247. At this stage, the bin 202 is stationary within the item transfer apparatus 240 at a position generally below the transfer conveyor 252, held up by the support pawls 248 and stopped laterally by the end rail 247. In the transition from the configuration of FIG. 3 to the configuration of FIGS. 4A and 4B, the clamps 250 are in a raised position such that the rim 201 of the bin 202 can slide beneath the clamps 250.

Figure 5:
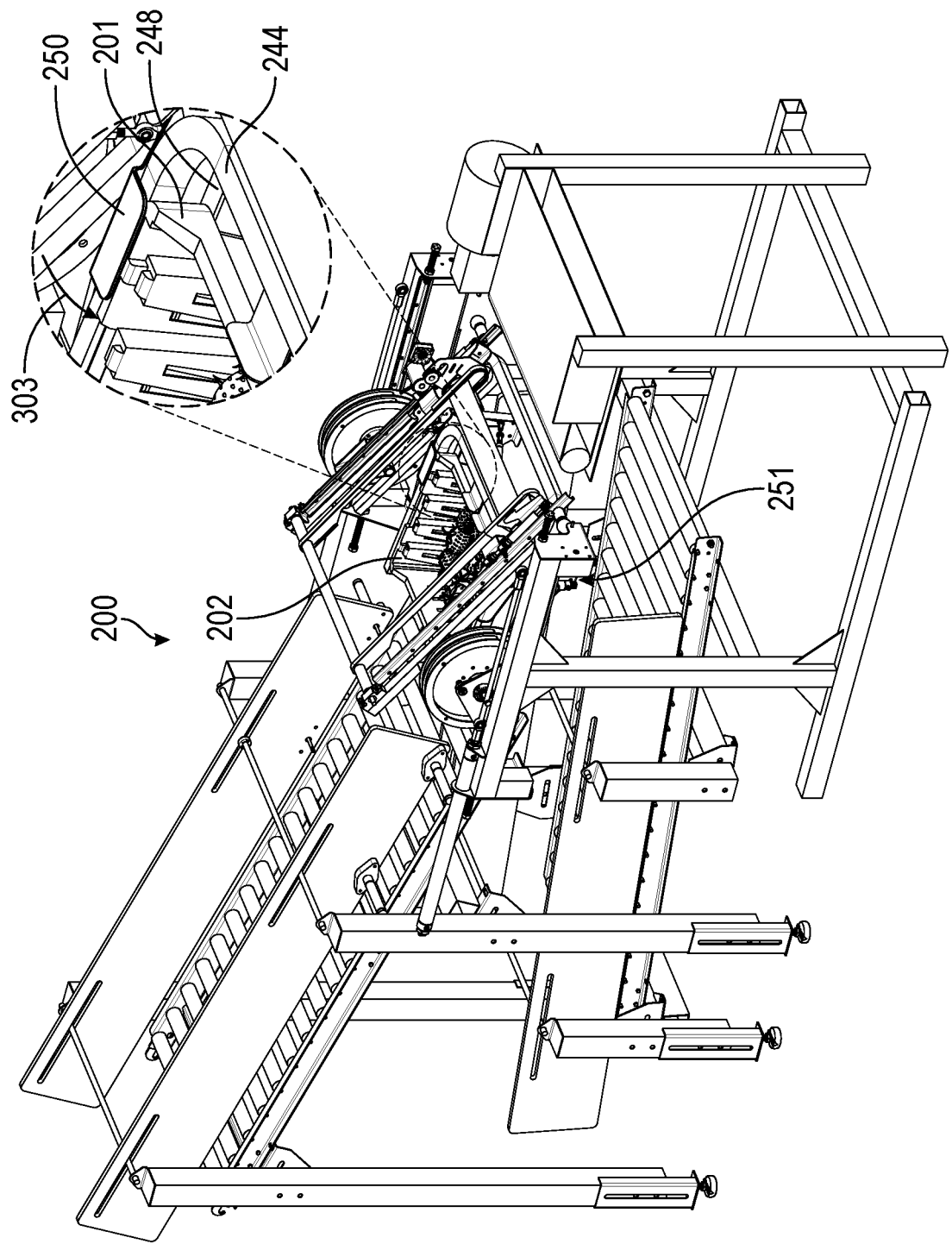

After the bin 202 is received within the bin sub-frame 244 of the item transfer apparatus 240, the process continues to the configuration shown in FIG. 5. As shown in FIG. 5, the clamps 250 move downward along direction 303 (e.g., under control of the actuators 249 of FIG. 2G) to a lowered configuration in which the clamps 250 secure the rim 201 of the bin 202 between the clamps 250 and the support pawls 248. Thus, in the configuration shown in FIG. 5, the bin 202 is secured vertically within the item transfer apparatus 240. It will be understood that the item transfer apparatus 240 of the present technology is not limited to securing a bin 202 using support pawls 248 and clamps 250 below and above the rim 201 of the bin 202, and that various embodiments of the present technology may equally include additional or different structures for securing a bin 202 within a rotatable frame.

Figure 6A:
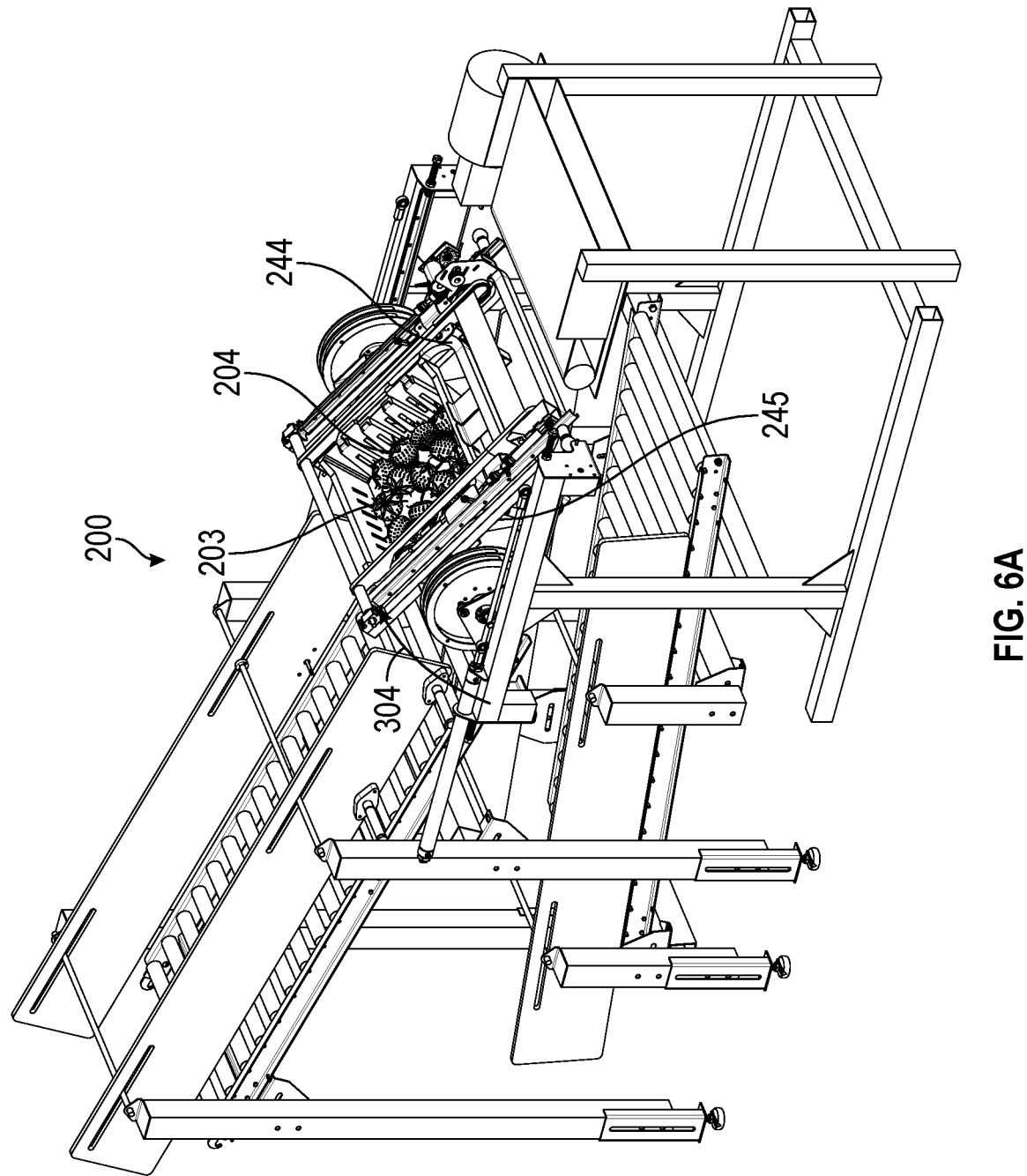
Figure 6B:
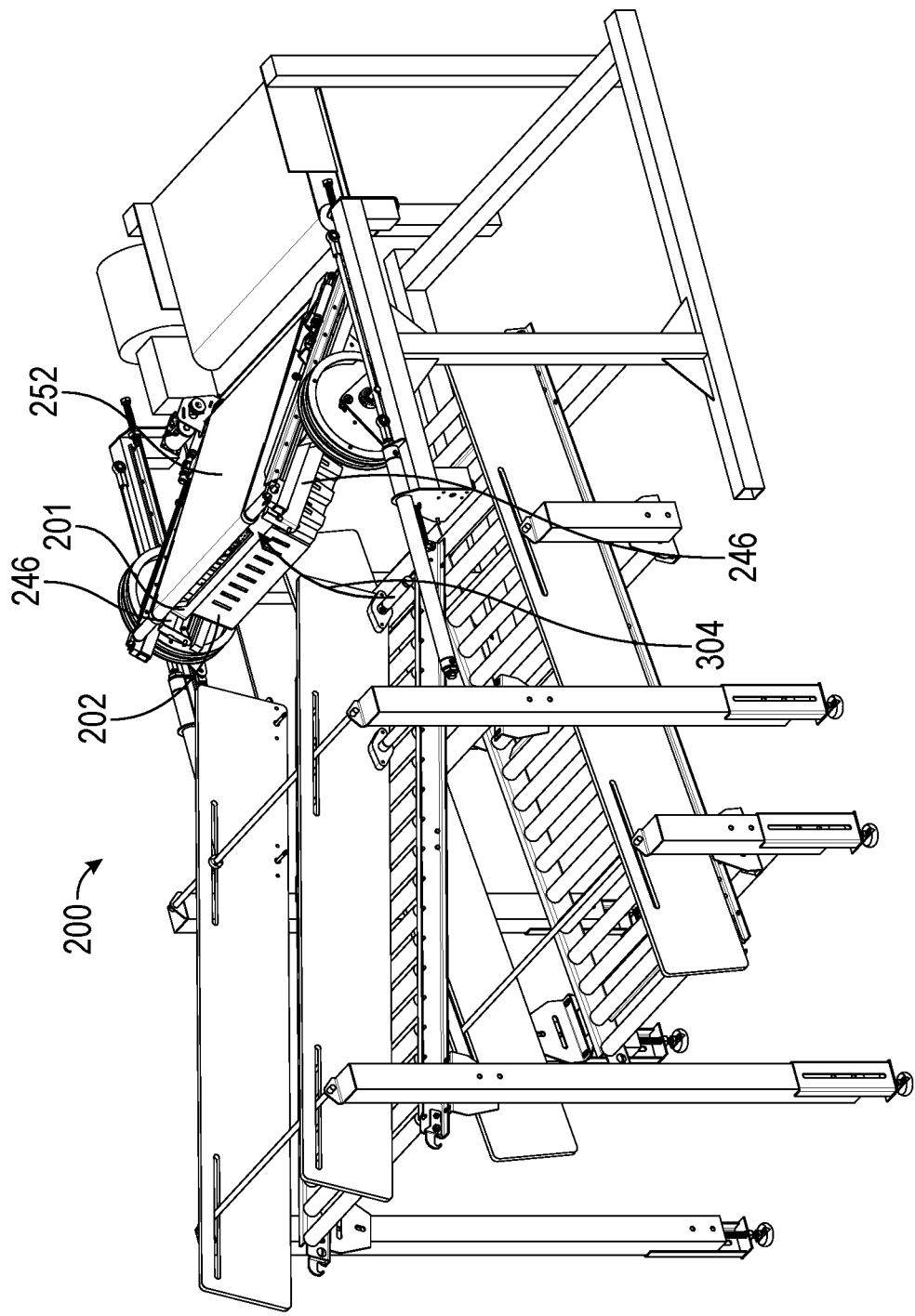

After the clamps 250 are lowered to secure the bin 202 within the item transfer apparatus 240, the process continues to the configuration shown in FIGS. 6A and 6B. As shown in FIGS. 6A and 6B, the bin sub-frame 244 is moved rotationally upward along direction 304 such that the bottom 203 of the bin 202 is generally parallel to the transfer conveyor 252 (shown in FIG. 6B but hidden from view in FIG. 6A to show certain components). Moreover, in the configuration of FIGS. 6A and 6B, the transfer conveyor 252 substantially covers the top opening of the bin 202 such that items 204 will be retained within the bin 202 if the bin 202 and transfer conveyor 252 are rotationally inverted. Although the transition from FIG. 5 to FIGS. 6A and 6B shows that the bin 202 and the bin sub-frame 244 are rotated upward to meet the transfer conveyor 252, it will be appreciated that other embodiments of the present disclosure may instead move the transfer conveyor 252 downward to cover a stationary bin 202, or both the bin sub-frame 244 and the transfer conveyor 252 may move toward each other to accomplish a similar relative motion as shown in the transition from FIG. 5 to FIGS. 6A and 6B. Any such relative rotations of the bin sub-frame 244 and the transfer conveyor 252 can be described as movement from an open configuration (e.g., as shown in FIG. 5) to a closed configuration (e.g., as shown in FIGS. 6A and 6B) of the item transfer apparatus 240.

Figure 7A:
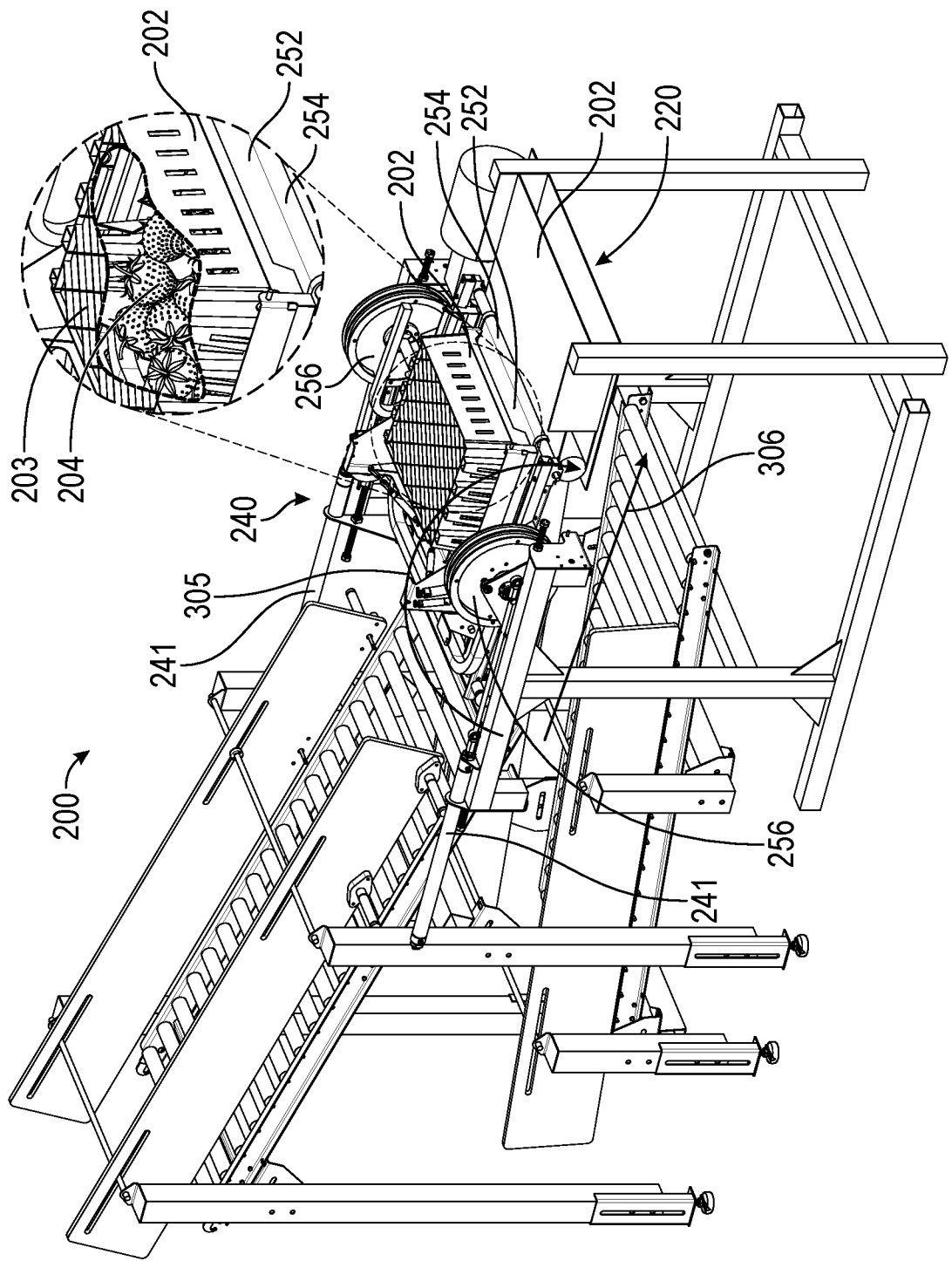
Figure 7B:
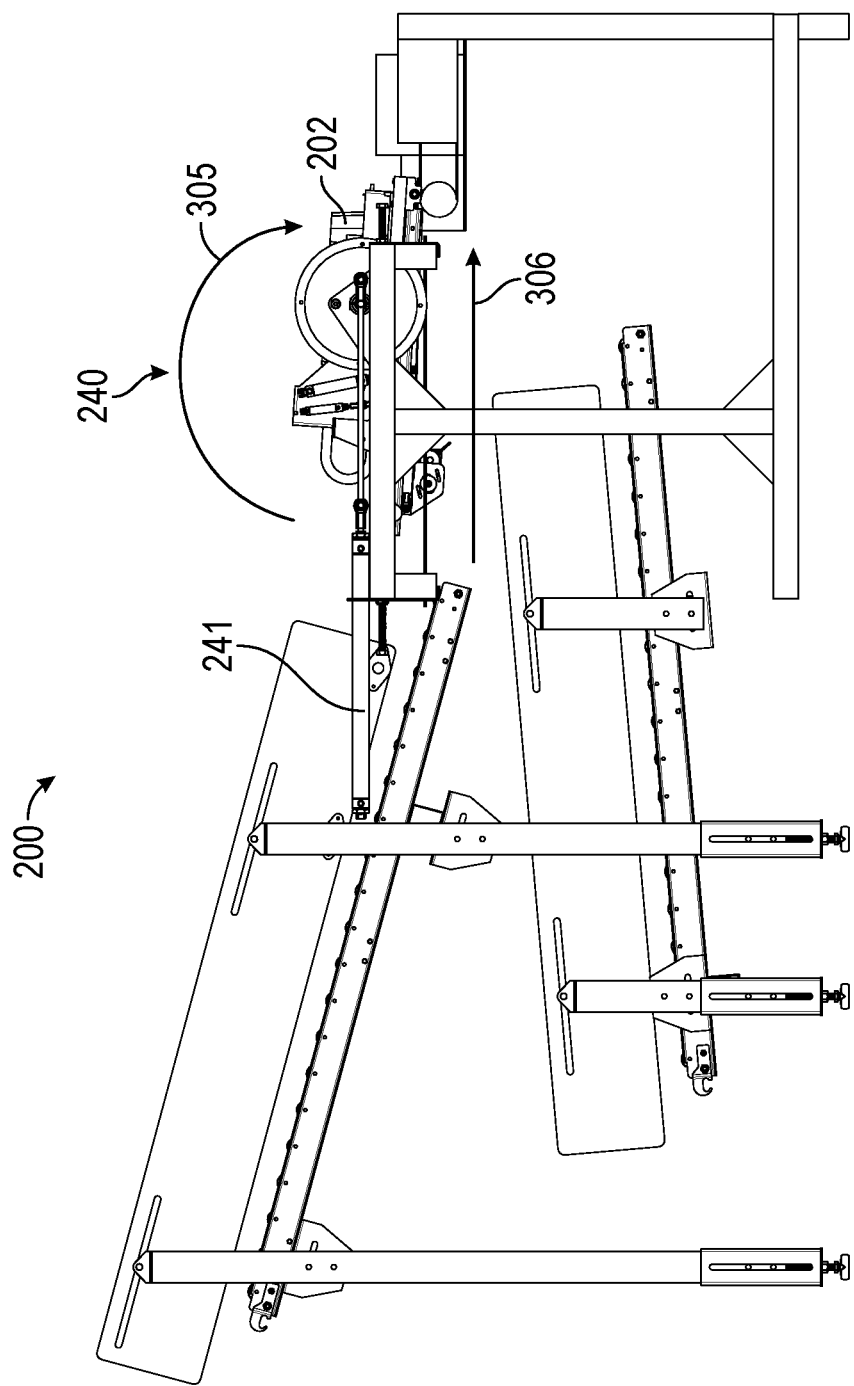

After the items 204 are contained between the bin 202 and the transfer conveyor 252, the process continues to the configuration shown in FIGS. 7A and 7B. As shown in FIGS. 7A and 7B, the transfer conveyor 252, the bin sub-frame 244, and the bin 202 contained therein, are rotated along rotational direction 305 about a lateral axis to an inverted or rotated position in which the items 204 rest on the conveyor belt surface of the transfer conveyor 252 beneath the inverted bottom 203 of the bin 202. Moreover, a distal end of the transfer conveyor 252 can be disposed above the conveyor belt surface 222 of the item output section 220 to facilitate transfer of the items onto the conveyor belt surface 222. As described above, rotation of the transfer conveyor 252, the bin sub-frame 244, and the bin 202 can be controlled by linear actuator 241 in conjunction with wheels 256. Some linear motion along direction 306 may also be included within the transition from the configuration of FIGS. 6A and 6B to the configuration of FIGS. 7A and 7B.

As discussed above, in some embodiments, the transfer conveyor 252 may be supported only on rollers 254, without any additional intermediate rollers disposed between the rollers 254 which are disposed at opposite ends of the transfer conveyor. This configuration in which the middle portion of the transfer conveyor 252 (e.g., the portion of the transfer conveyor 252 below the bin 202) is unsupported can advantageously provide additional resilience and shock absorption when the items 204 fall onto the transfer conveyor, further reducing the probability of bruising or other cosmetic damage to the items in the inversion from FIGS. 6A and 6B to FIGS. 7A and 7B.

Figure 8A:
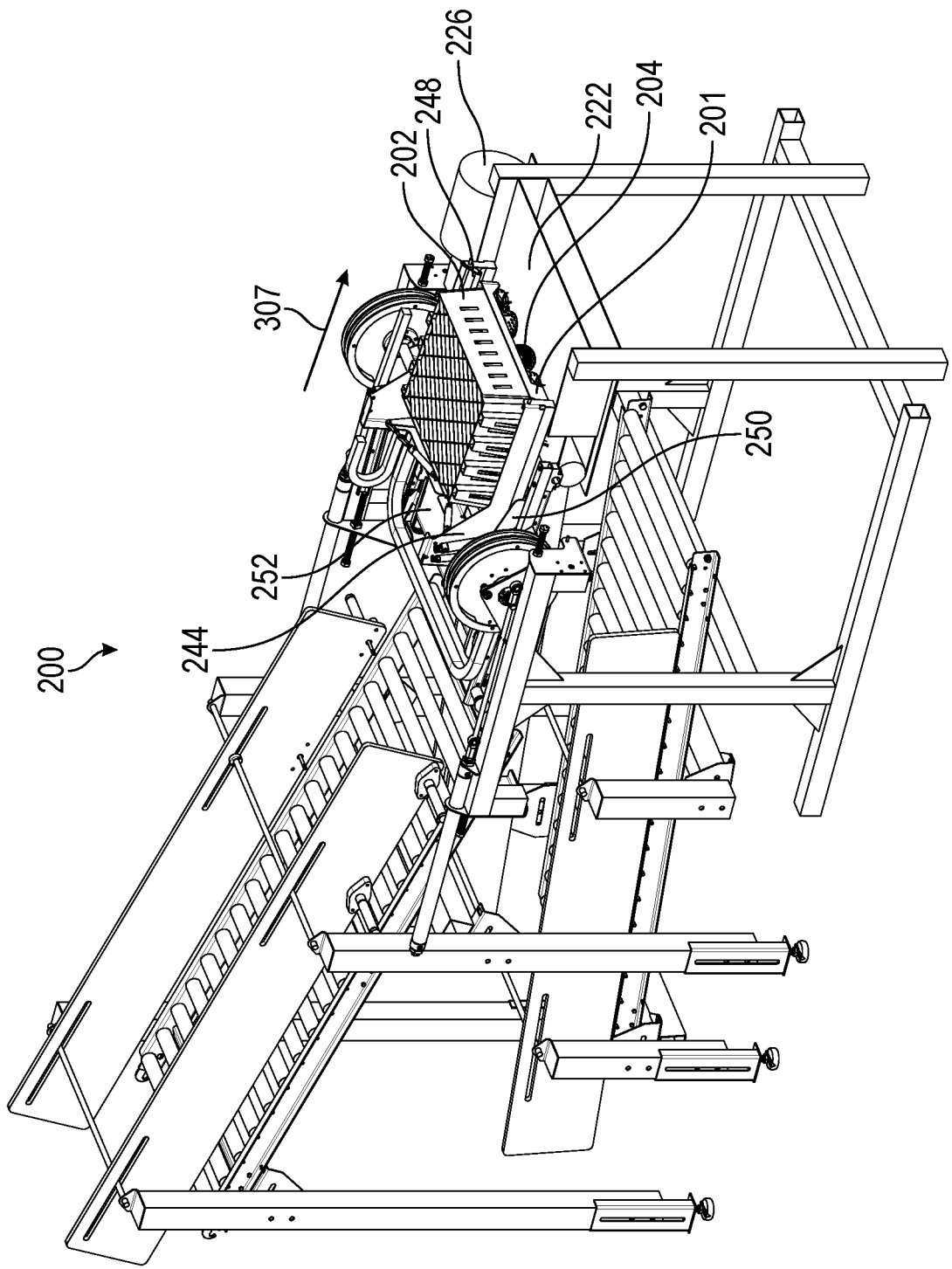
Figure 8B:
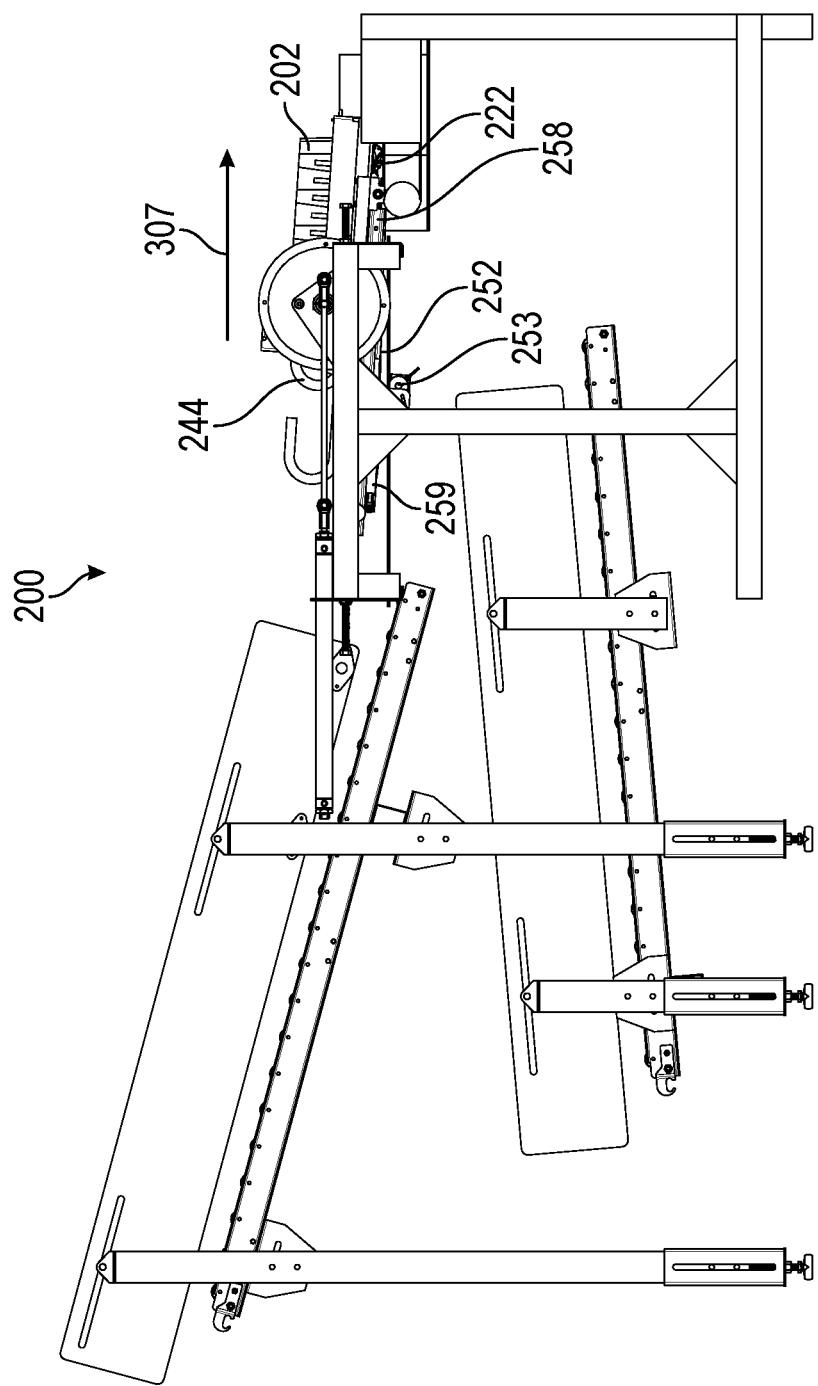

After the transfer conveyor 252 and bin sub-frame 244 have been rotationally inverted to transfer the items 204 onto the transfer conveyor 252, the process continues to the configuration shown in FIGS. 8A and 8B. From the inverted or rotated position of FIGS. 7A and 7B, the bin sub-frame 244 is translated linearly along direction 307 in coordination with movement of the item-facing conveyor belt surface of the transfer conveyor 252 along the same direction 307. In some embodiments, the transfer conveyor 252 is moved linearly along direction 307 at the same speed as the bin sub-frame 244 and the bin 202 are linearly translated along direction 307, such that the items 204 are moved toward the conveyor belt surface 222 of the item output section 220 while being contained within the inverted bin 202. In this manner, the items 204 are moved toward the item output section 220 without being able to fall laterally out of the item processing system 200.

As items 204 reach the end of the transfer conveyor 252, the items 204 begin to fall from the transfer conveyor 252 onto the conveyor belt surface 222 of the item output section 220. As discussed above, the conveyor belt surface 222 may similarly be at least partially unsupported at the end adjacent the item transfer apparatus 240 such that the items 204 falling onto the conveyor belt surface 222 are not bruised or otherwise cosmetically damaged as they are transferred from the item transfer apparatus 240 to the item output section 220. Moreover, the diameter of the rollers 254 of the transfer conveyor 252 can be selected such that the drop from the transfer conveyor 252 onto the conveyor belt surface 222 is relatively small, reducing or minimizing kinetic energy imparted to the items, thereby reducing impact and/or shearing forces and further reducing the probability of cosmetic damage to the items. For example, the vertical distance can be 5 inches or less, such as 3 inches or less, 2 inches or less, 1 inch or less, ½ inch or less, etc.

In some embodiments, the motor 226 can move the conveyor belt surface 222 of the item output section 220 at a speed greater than the translational speed of the transfer conveyor 252 and the bin sub-frame 244 along direction 307. Advantageously, the transfer of items 204 from a slower transfer conveyor 252 onto a faster conveyor belt surface 222 of the item output section 220 can provide for increased spacing of the items 204 on the conveyor belt surface 222. Increased spacing of the items 204 can facilitate efficient sorting, packing, and/or other processing of the items 204 downstream of the item transfer apparatus 240, either manually or automatically.

Figure 9A:
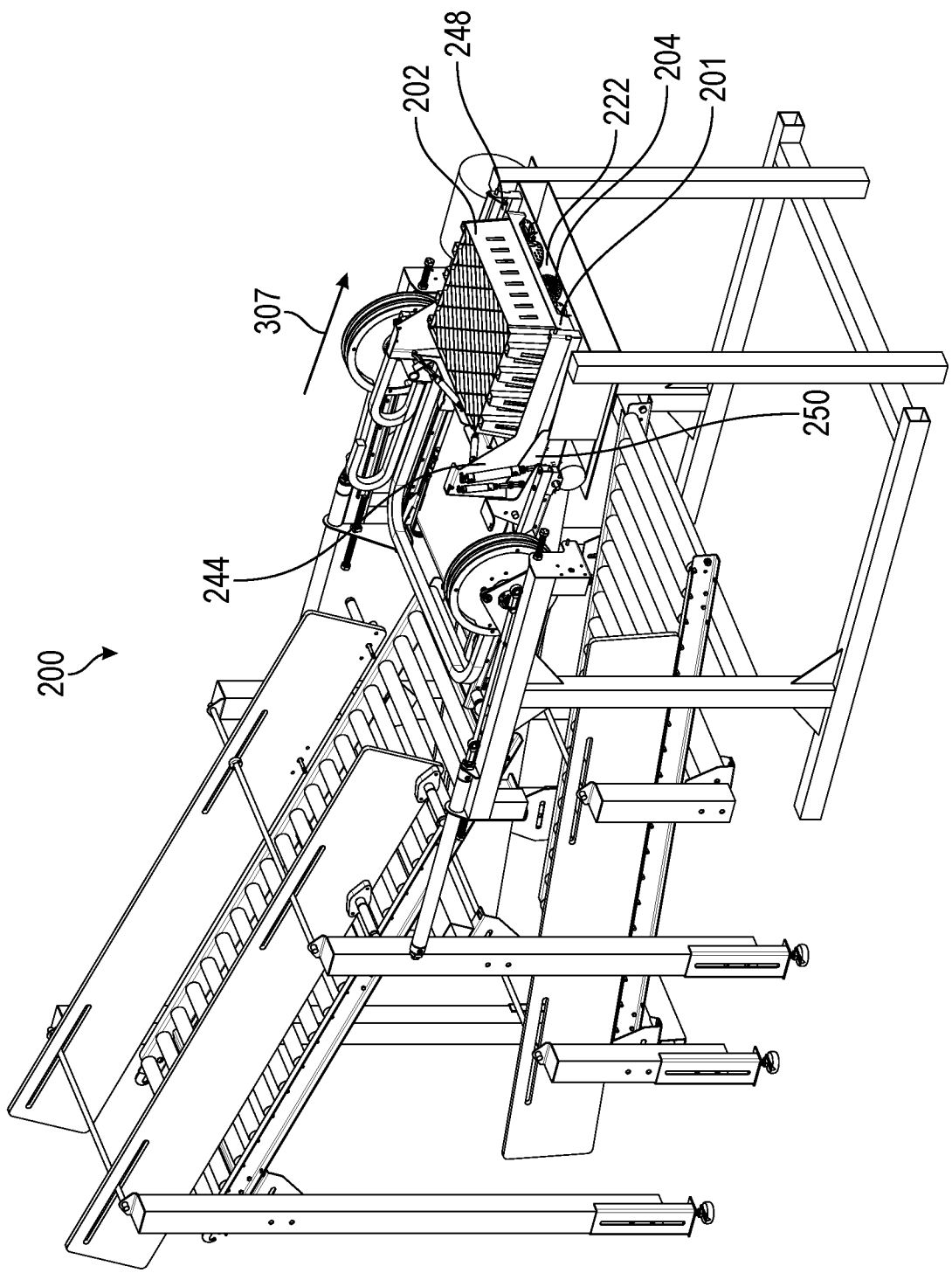
Figure 9B:
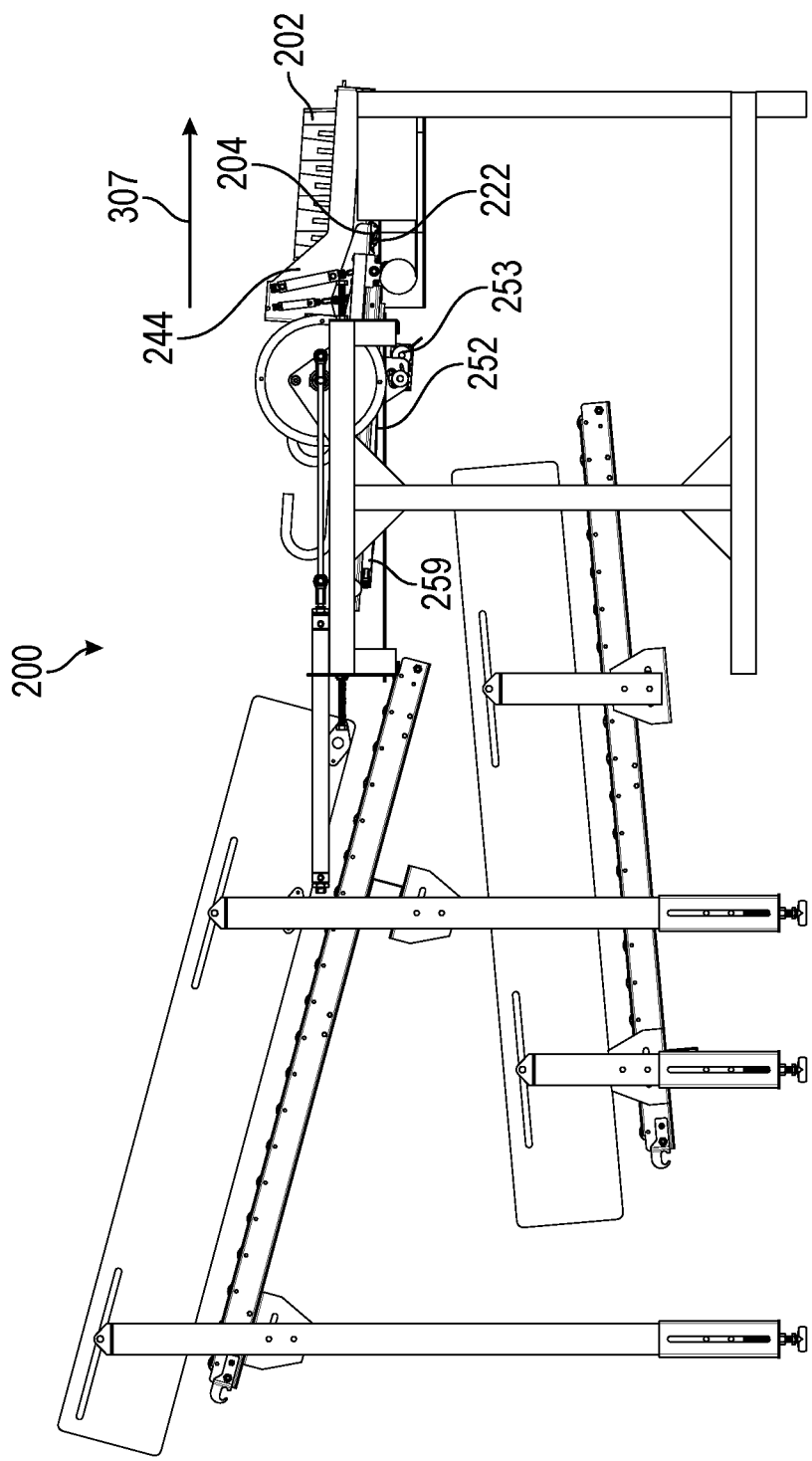

Referring now to FIGS. 9A and 9B, the linear translation along direction 307 continues until the entirety of the bin 202 is disposed above the conveyor belt surface 222 of the item output section 220, such that all items 204 are transferred from the transfer conveyor 252 onto the conveyor belt surface 222.

Figure 10A:
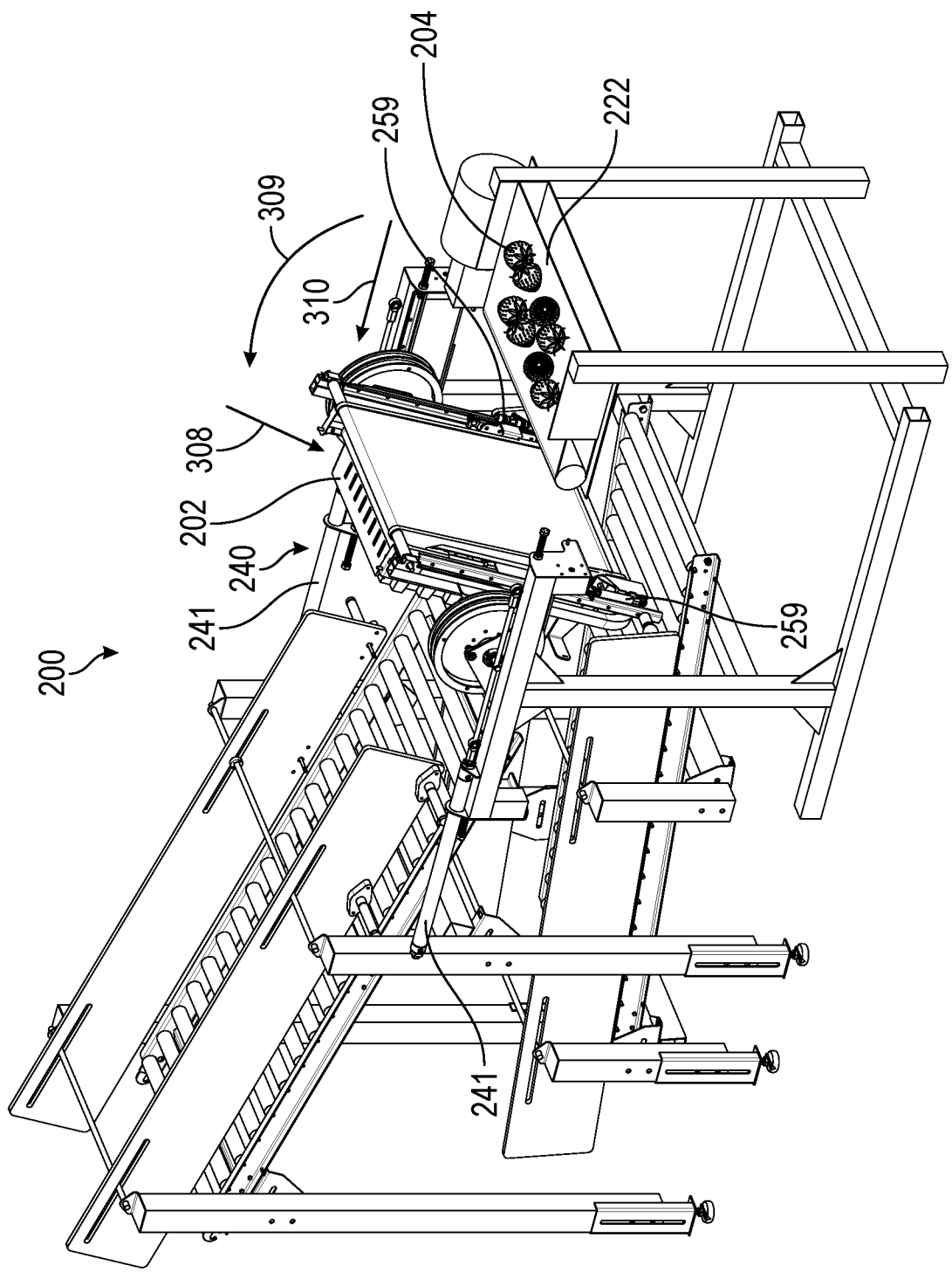
Figure 10B:
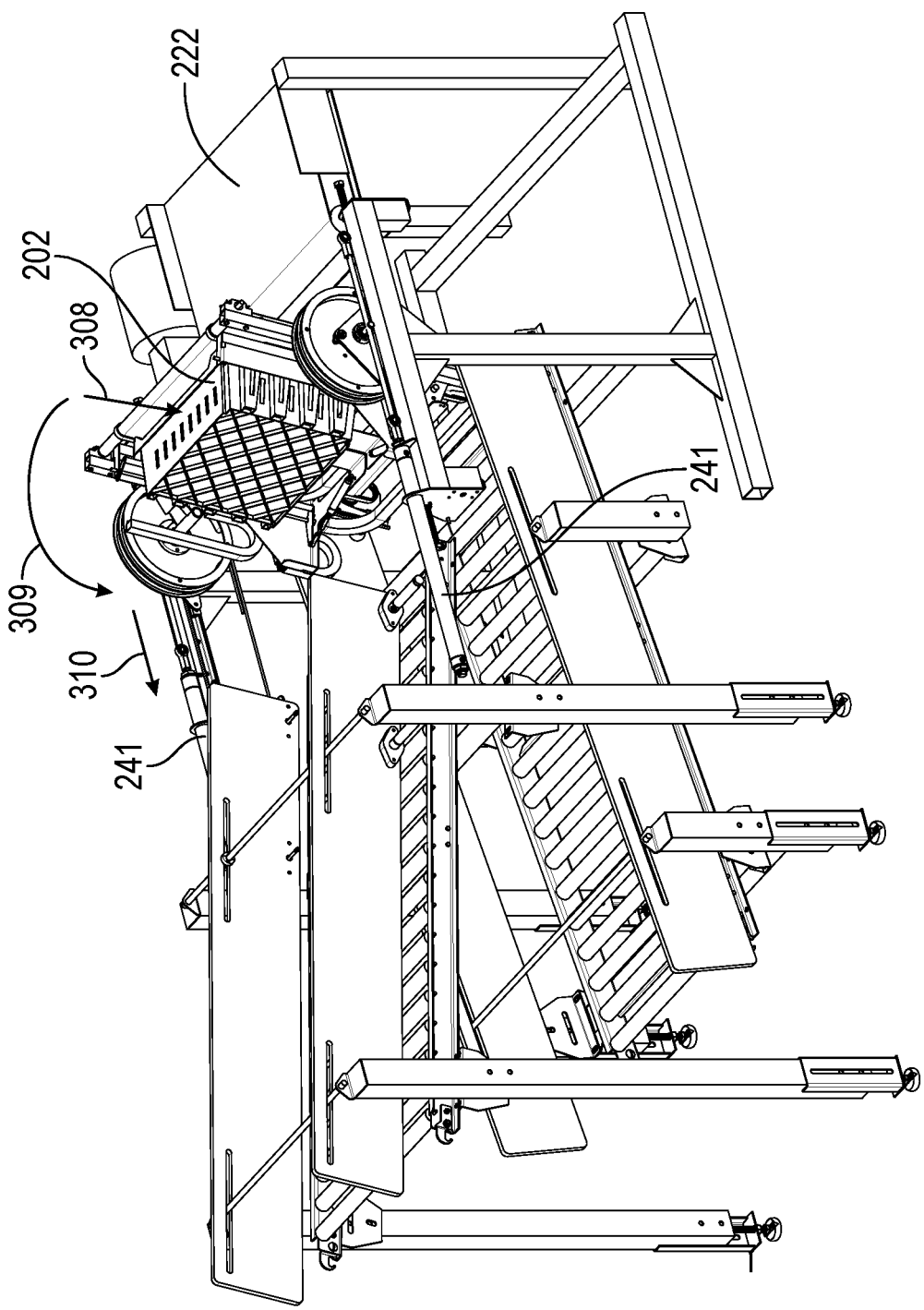

After all items 204 from the bin 202 are transferred onto the conveyor belt surface 222, the process continues to the configuration shown in FIGS. 10A and 10B. As shown in FIGS. 10A and 10B, the items 204 deposited on the conveyor belt surface 222 are transferred away from the item transfer apparatus 240 by the motion of the conveyor belt surface 222, as the item transfer apparatus rotates back along rotational direction 309 and/or along linear translation direction 310. Simultaneously, before rotation, and/or after rotation of the item transfer apparatus 240, the bin sub-frame 244 and the bin 202 are also linearly translated back along direction 308.

Figure 11:
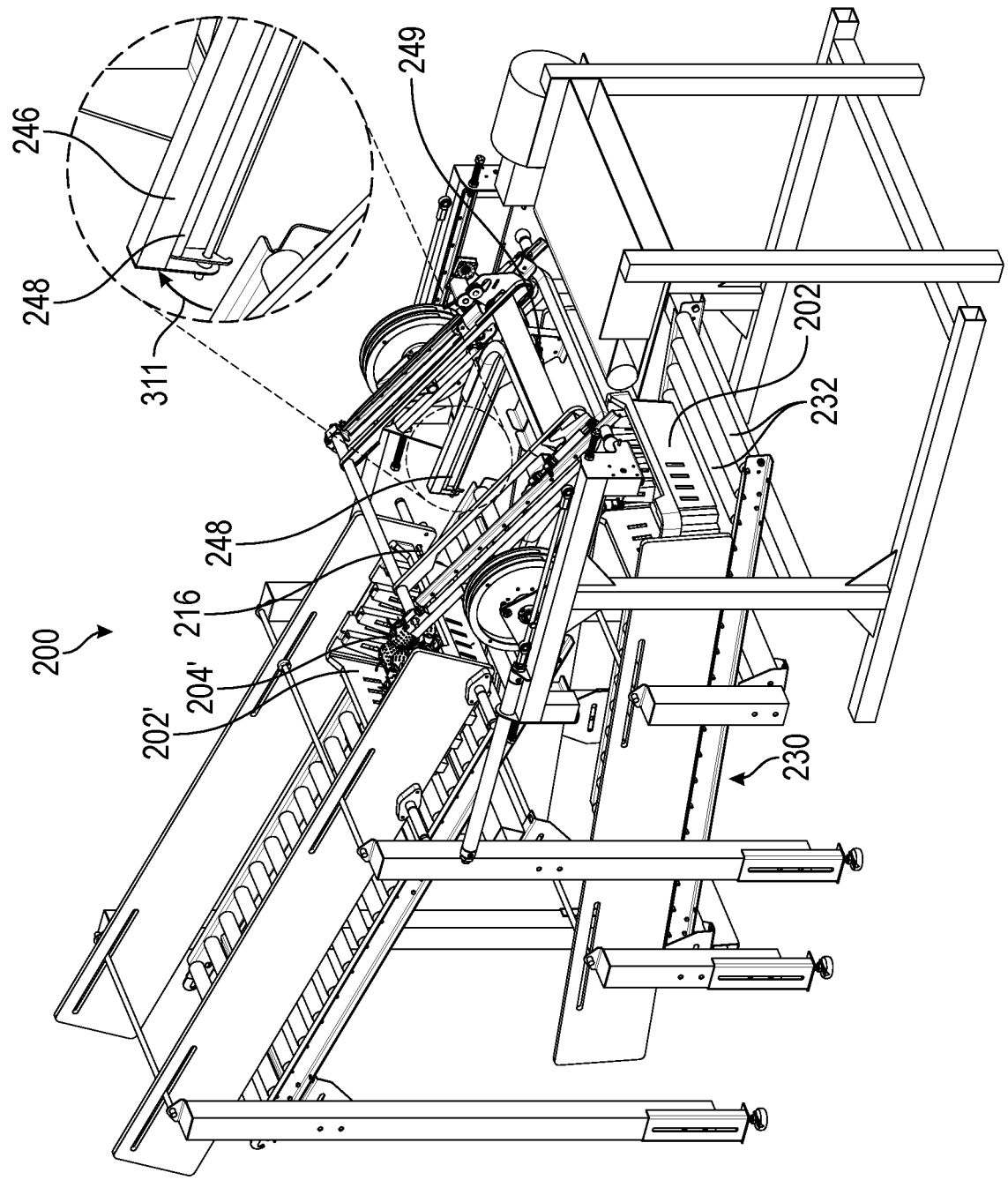

Continuing to FIG. 11, the item transfer apparatus 240 translates back to the original upright and open-jaw configuration of FIGS. 3-5. As the item transfer apparatus 240 reaches the original upright configuration, the support pawl actuators 249 retract the support pawls 248 into the side rails 246 along direction 311, such that the bin 202 is released from the item transfer apparatus 240 as the rim 201 of the bin 202 is no longer supported by the support pawls 248. The bin 202 falls onto the rollers 232 of the bin output section 230, where the bin 202 can travel away from the item transfer apparatus 240 to a bin output location. A next bin 202', containing additional items 204' to be transferred, may have been received in the item processing system 200 and may be retained by item retainers 216.

Figure 12:
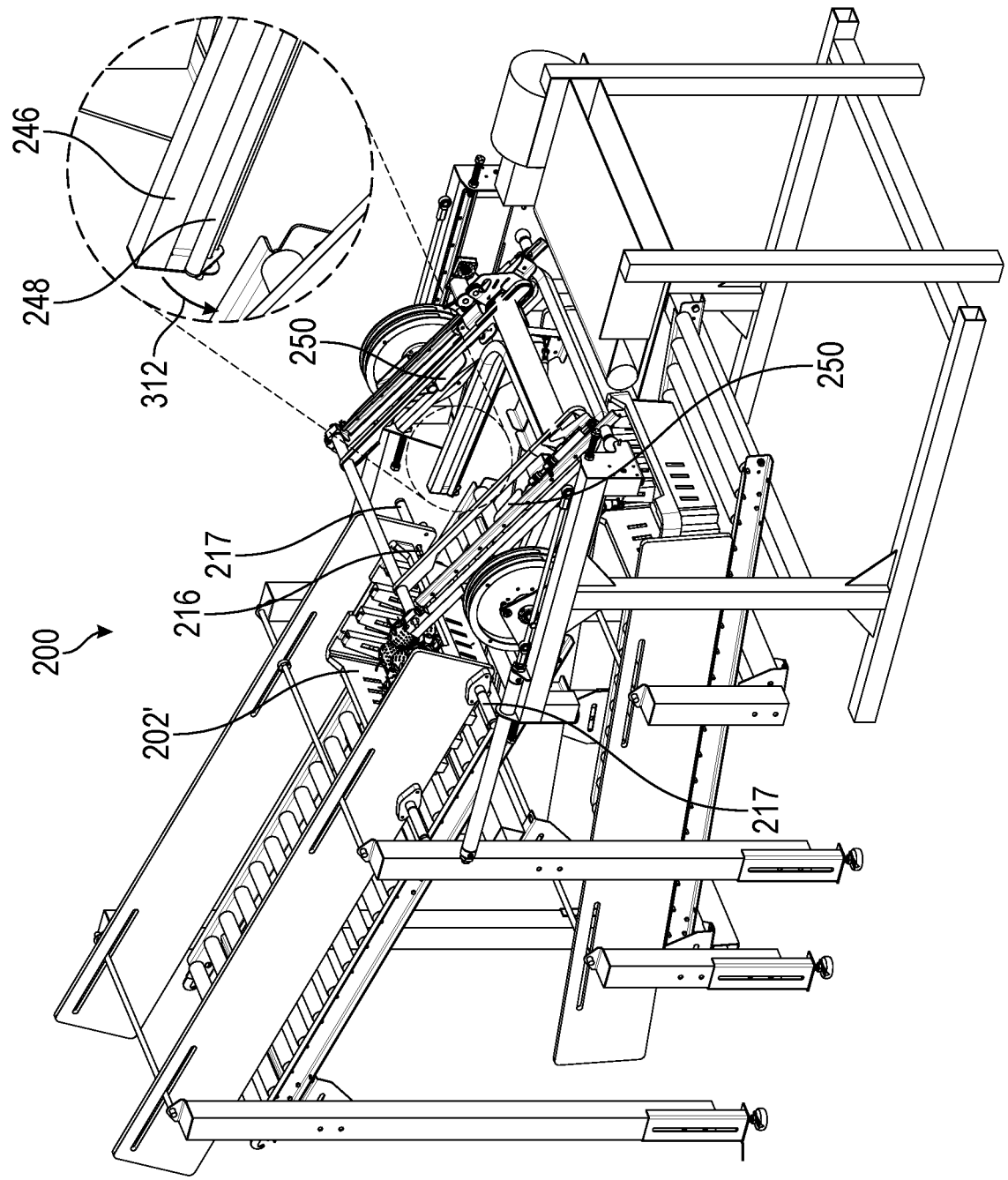

Continuing to FIG. 12, after the first bin 202 is released, the support pawl actuators 249 extend the support pawls 248 back out from the side rails 246 along direction 312, such that the support pawls 248 are ready to receive the rim of the next bin 202'. Additionally, the clamps 250 may be raised by the clamp actuators 251 such that the item transfer apparatus 240 is ready to receive the next bin 202'. From the configuration of FIG. 12, the bin retainer actuators 217 may retract the bin retainers 216 to return to the configuration of FIG. 3 and repeat the process of FIGS. 3-12 indefinitely as more bins are received containing items to be transferred.

Further Implementations of Systems and Methods of the Present Disclosure

Figure 13:
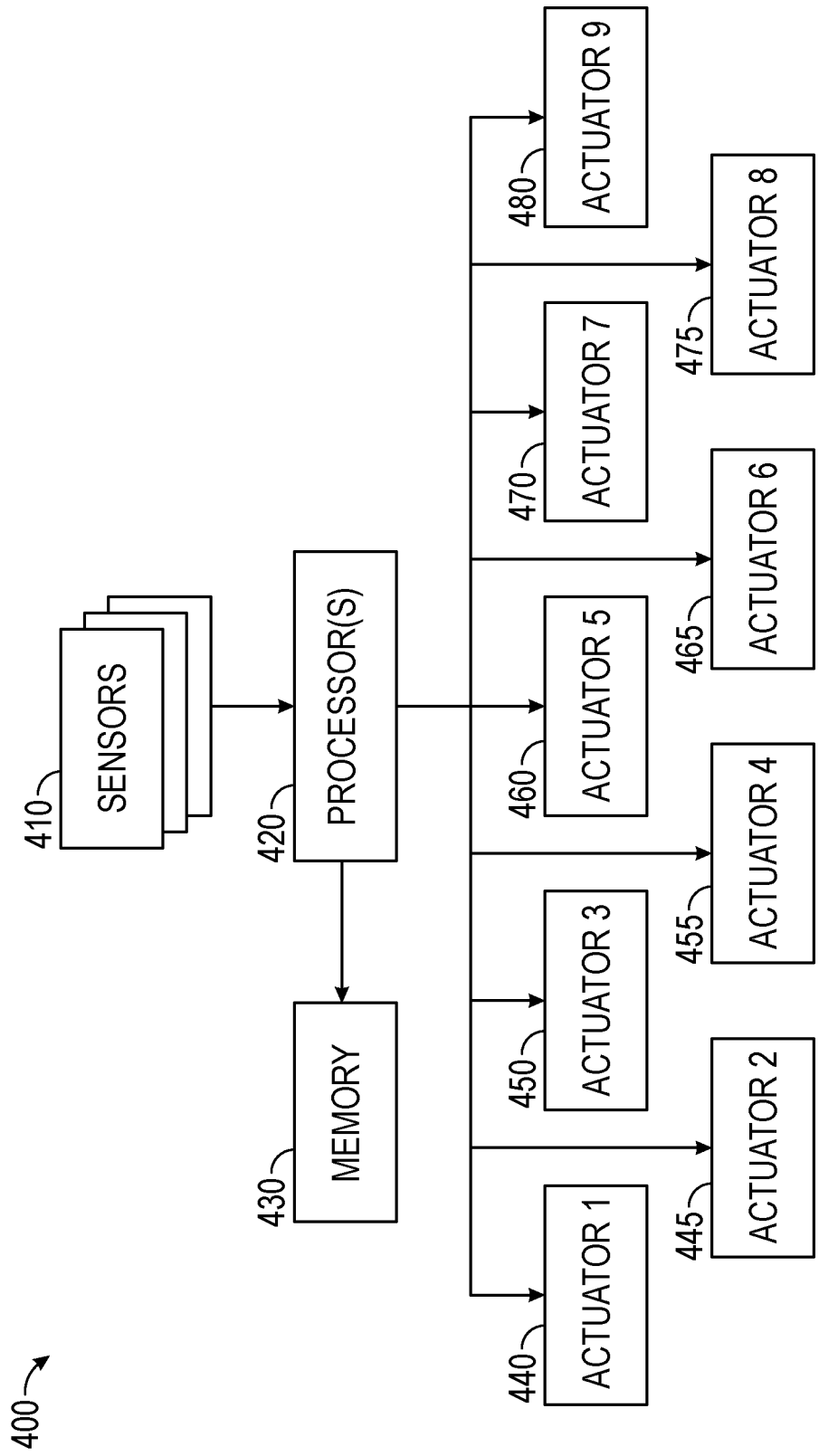
FIG. 13 is a block diagram of an item processing system.

FIG. 13 is a block diagram of an item processing system 400 in accordance with an example embodiment. The system 400 includes one or more sensors 410 in communication with one or more processors 420. The processors 420 are further in communication with a memory 430 and actuators including actuator 440, actuator 445, actuator 450, actuator 455, actuator 460, actuator 465, actuator 470, actuator 475, and actuator 480. Although the system 400 is depicted as having 9 actuators, the number of actuators in various embodiments can be greater or smaller than 9, for example, based on the number of parts to be moved in any particular embodiment of the system 400.

The system 400 can include one or more sensors 410 configured to determine a status of one or more components of the system 400. For example, the sensors 410 can include a sensor configured to detect the presence of a bin before initiating a transfer process (e.g., an optical or mechanical sensor disposed to be triggered when a bin reaches the end of the input section 210 at bin retainers 216 as shown in FIGS. 2A-2G). In another example, the sensors 410 can include one or more position sensors configured to determine a position of one or more components of the item transfer apparatus 240. In yet another example, the sensors 410 can include a sensor such as sensor 644 as shown in FIGS. 15A-15D (e.g., an optical sensor, photoelectric sensor, proximity sensor, or the like) configured to detect the presence of a bin at a particular location within an item transfer apparatus. In various implementations, the sensors 410 can include one or more proximity sensors, pressure sensors, force sensors, scales, cameras, optical pattern recognition devices such as barcode scanners, optical sensors, or the like. In some embodiments, the sensors 410 can include a manually activated device, such as a button or other input device, configured to produce a signal indicating that a bin has been loaded into the system 400.

The one or more processors 420 are configured to control and receive input from the sensors 410, the memory 430, and the actuators 440, 445, 450, 455, 460, 465, 470, 475, and 480. The memory 430 can store data received from the one or more processors 420 and send data stored therein to the one or more processors 420. Examples of information that may be received and stored in the memory 430 include, for example, information received at the one or more processors 420 from the sensors 410, information received at the one or more processors from the actuators 440, 445, 450, 455, 460, 465, 470, 475, and 480, and one or more computer-executable instructions that, when executed by the one or more processors 420, cause the one or more processors to selectively activate and/or deactivate the actuators 440, 445, 450, 455, 460, 465, 470, 475, and 480 in a predetermined sequence to transfer items from a bin.

The actuators 440, 445, 450, 455, 460, 465, 470, 475, and 480 can be electronically controllable actuators each coupled to and configured to move one or more mechanical components of the system 400. Each actuator 440, 445, 450, 455, 460, 465, 470, 475, and 480 can include one or more electric motors, hydraulic cylinders, pneumatic actuators, screw jacks, servos, solenoids, or the like. For example, in some embodiments, some of the actuators 440, 445, 450, 455, 460, 465, 470, 475, and 480 can each correspond to a plurality of actuators such as a pair of actuators disposed on opposing sides of the item transfer apparatus 240 or 600. In one example implementation of the item processing system 200 depicted in FIGS. 2A-2G, the actuators may be arranged such that, for example, actuator 440 corresponds to the bin retainer actuators 217, actuator 445 corresponds to the secondary bin retainer actuators 219, actuator 450 corresponds to the pawl actuators 249, actuator 455 corresponds to the clamp actuators 251, actuator 460 corresponds to the bin rotation actuators 245, actuator 465 corresponds to the frame rotation actuators 241, actuator 470 corresponds to the bin translation actuators 259, actuator 475 corresponds to the transfer conveyor motor 253, and actuator 480 corresponds to the output conveyor motor 226. In another example implementation of the item processing system 660 of FIGS. 16-25 including the item transfer apparatus 600 of FIGS. 15A-15D, the actuators may be arranged such that, for example, actuator 440 corresponds to the robotic arm 605, actuator 445 corresponds to the linear actuators 624, actuator 450 corresponds to the motors 643 controlling translation of the conveyor sub-frame 634, actuator 455 corresponds to a motor controlling the transfer conveyor 630, and actuator 460 corresponds to an output conveyor motor.

Figure 14:
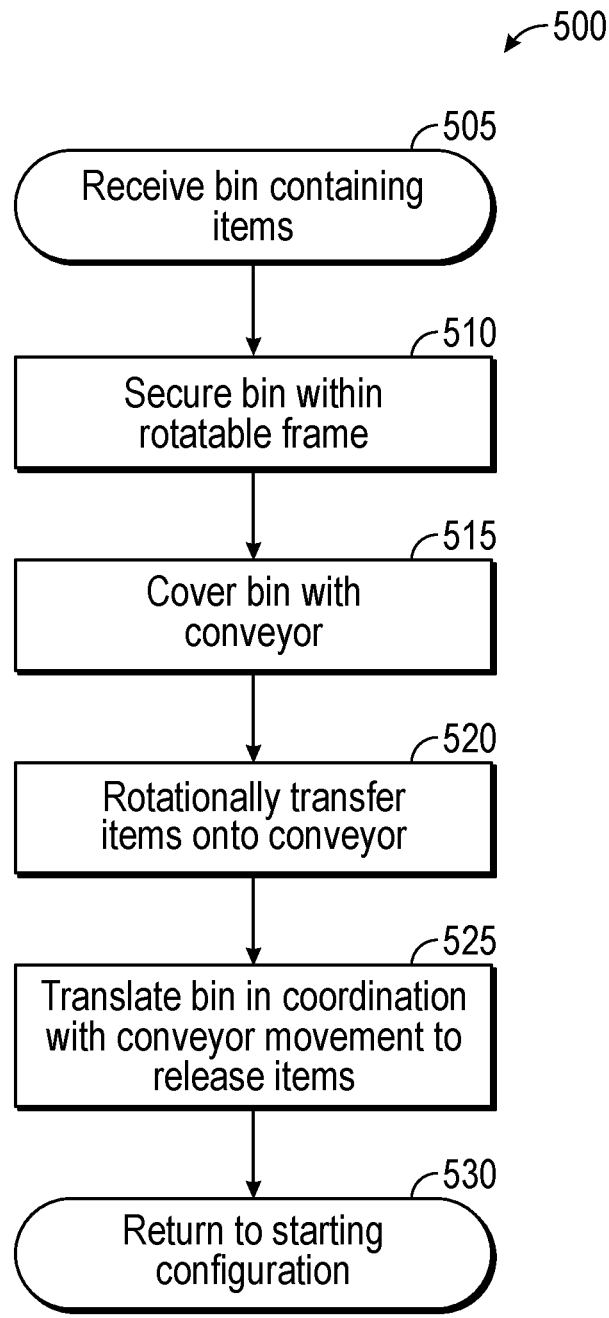
FIG. 14 is a flowchart illustrating an example method of transferring items from a bin in an item transfer apparatus.

FIG. 14 is a flowchart illustrating an example method 500 of transferring items from a bin in an item transfer apparatus within an item processing system. Throughout the description of FIG. 14, reference will also be made to components of the systems and processes of FIGS. 2A-12. Although the method 500 will be described with reference to components of the item processing systems 200 and 660 and item transfer apparatus 240 and 600 of FIGS. 2A-2G and 15A-25, the method 500 can be performed by a computer integrated within any item processing system such as the systems 100, 200, 400, and 660 (and item transfer apparatus 600) depicted in FIGS. 1-13 and 15A-25, for example, under control of one or more processors 420 based on computer-executable instructions stored in the memory 430.

The method 500 begins at block 505, where a bin containing items is received within the item processing system 200. The bin may be the bin 202 containing items 204 such as strawberries as shown in FIG. 3. Receiving the bin 202 can include an operator placing the bin 202 onto the rollers 212 of the input section 210. In another example, the bin 202 can be received at the input section 210 from an output of another automated or semi-automated component. In the example system 200 of FIGS. 2A-12, the received bin 202 containing items 204 can travel to a position in which the bin 202 rests against extended bin retainers 216. In the example system 660 of FIGS. 16-25, the received bin 202 containing items 204 may be received at input section 665. After the bin 202 is received, the method 500 continues to block 510.

At block 510, the bin is secured within a rotatable frame. In the example item processing system 200, securing the bin 202 can include activating bin retainer actuators 217 to retract the bin retainers 216 while the support pawls 248 are extended and the clamps 250 are in a raised position such that the bin 202 slides from the input section 210 into a position within the rotatable frame 242 in which the rim 201 of the bin 202 is disposed between the side rails 246 and rests on the support pawls 248. Securing the bin 202 at block 510 can further include causing the clamp actuators 251 to lower the clamps 250 to grip the rim 201 between the clamps 250 and the support pawls 248. In the example item transfer apparatus 600 of FIGS. 15A-15D, the bin sub-frame 610 may be lowered onto the bin 202 and the clamp 618 may be rotated to a closed position to secure the rim of the bin 202 between the clamp 618, upper stops 617, and pads 616. After the bin 202 is secured within the rotatable frame, the method 500 continues to block 515.

At block 515, the bin is covered with a conveyor. In the example item processing system 200, covering the bin 202 with a conveyor can include rotationally raising the bin sub-frame 244 and the bin 202 using bin rotation actuators 245, to a position in which the rim 201 of the bin 202 is close to and parallel to the bin-facing conveyor belt surface of the transfer conveyor 252. In other example systems, a transfer conveyor structure can be moved closer to the bin, or both the bin and a transfer conveyor can be moved together to achieve the covering of the bin at block 515. Preferably, the spacing between the rim 201 of the bin 202 and the bin-facing conveyor belt surface of the transfer conveyor 252 is close enough that items 204 are unlikely to fall out of the system 200 between the rim 201 and the transfer conveyor 252 when the rotatable frame is rotated. In the example item transfer apparatus 600 of FIGS. 15A-15D, securing the bin 202 within the bin sub-frame 610 may simultaneously result in the bin 202 being covered by the transfer conveyor 630, and a separate action may not be performed at block 515. When the bin 202 has been covered by the transfer conveyor, the method 500 continues to block 520.

Figure 18:
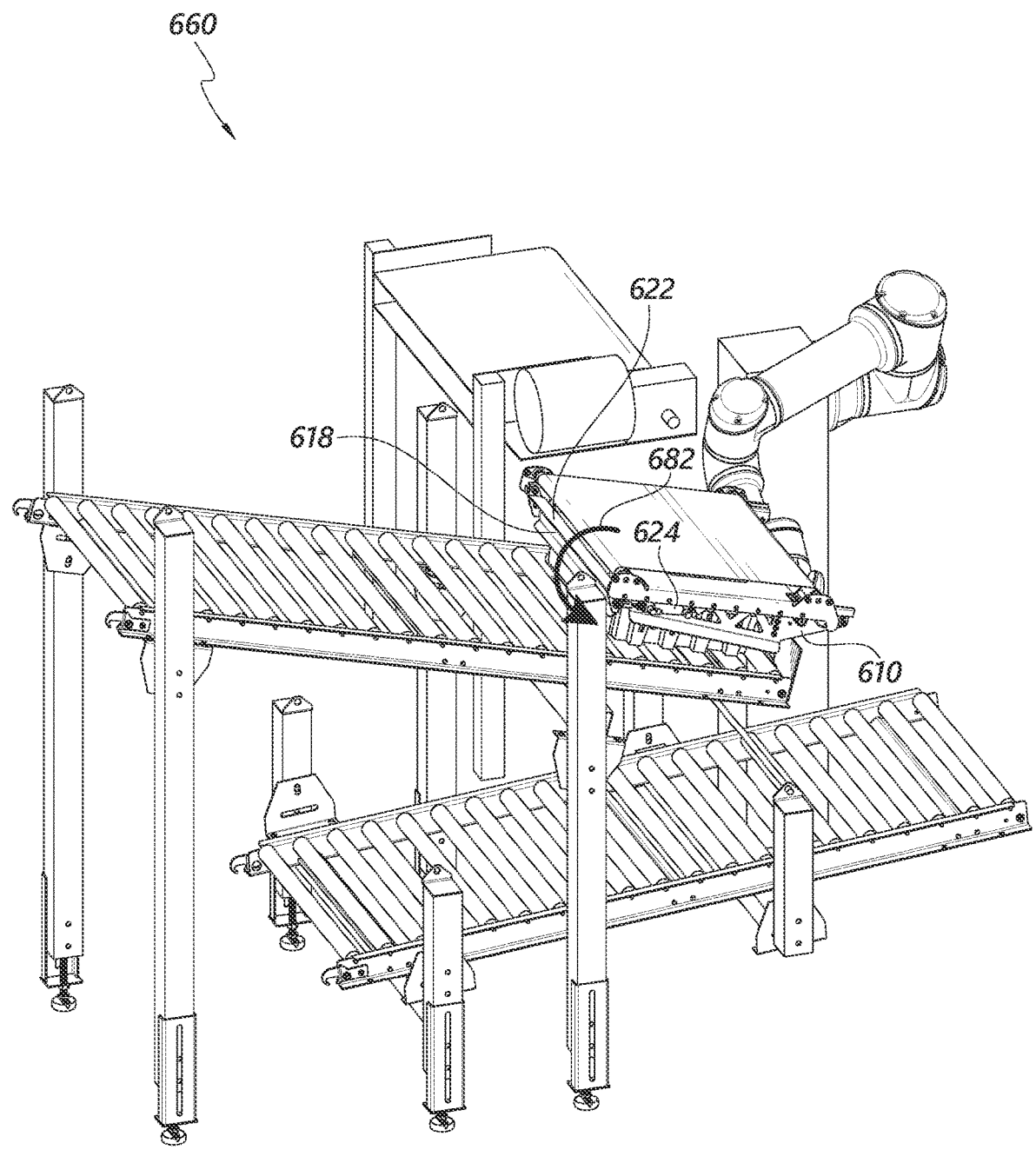
Figure 19:
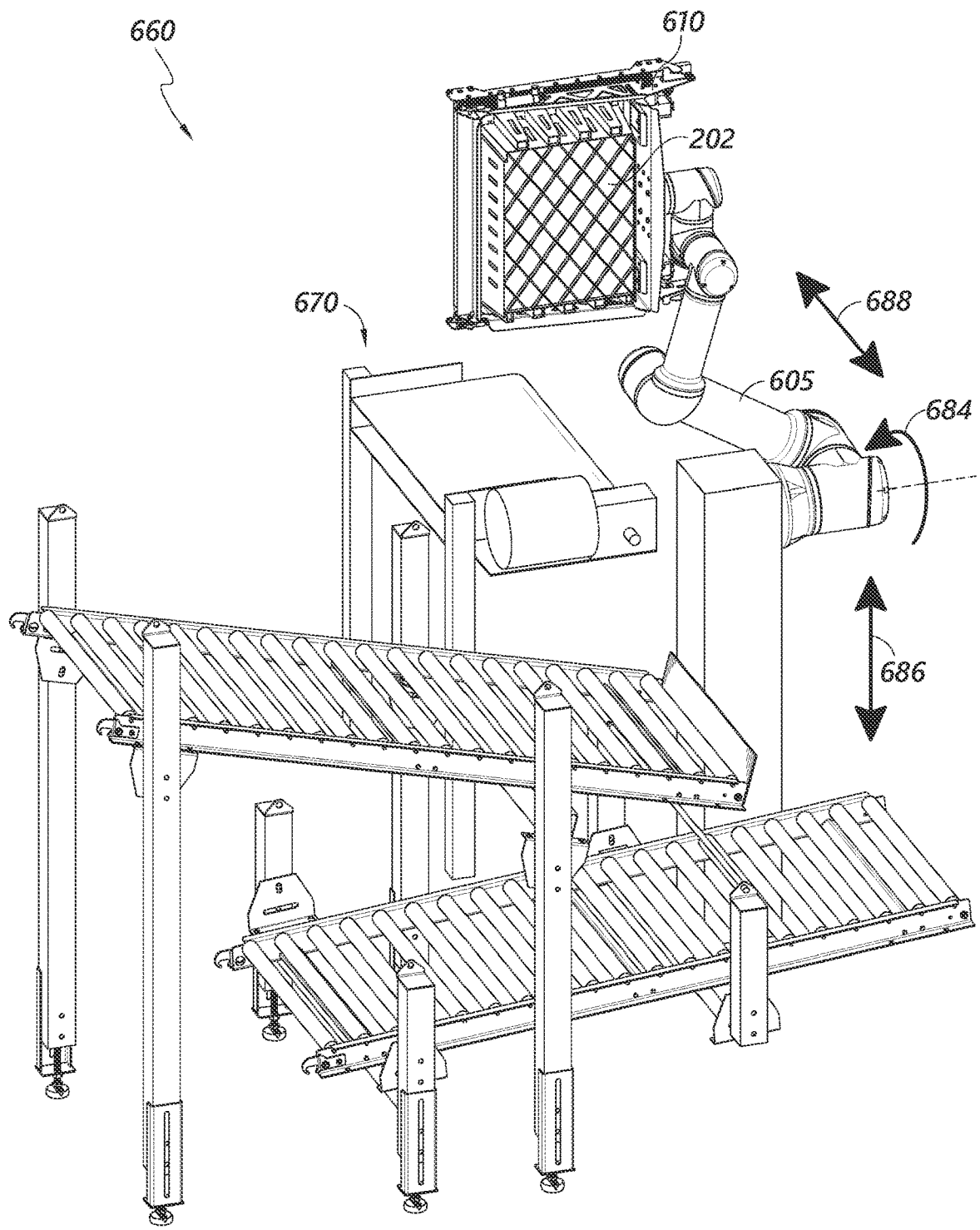
Figure 20:
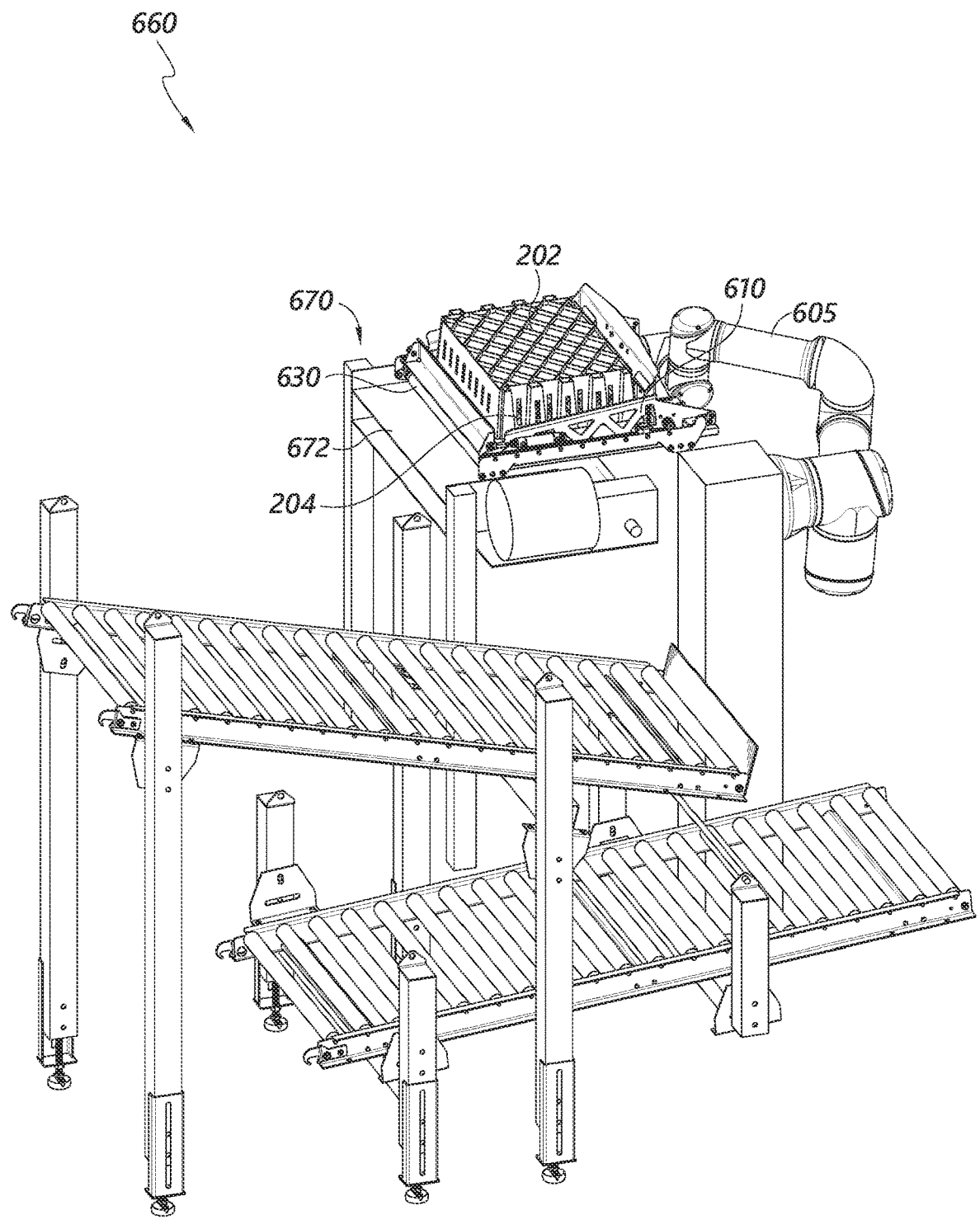

At block 520, the items in the bin are rotationally transferred onto a conveyor. In the example item processing system 200, the items 204 are rotationally transferred onto the transfer conveyor 252. Rotationally transferring the items can include causing the frame rotation actuators 241 to invert the rotatable frame 242 such that the items 204 rest on the transfer conveyor 252 and are contained by the side walls and floor of the bin 202. In the example system 200 of FIGS. 2A-12, the portion of the transfer conveyor 252 disposed below the bin can be an unsupported portion of the conveyor belt surface of the transfer conveyor 252, so as to avoid damage to the items 204 when the items 204 come to rest on the transfer conveyor 252. Following rotational transfer of items onto the transfer conveyor 252, the transfer conveyor 252 is located such that a distal end of the transfer conveyor 252 (e.g., at a roller 254) is disposed above a portion of the conveyor belt surface 222 of the item output section 220. In the example item transfer apparatus 600 of FIGS. 15A-15D, the items 204 can be rotationally transferred onto transfer conveyor 630 by rotating the bin sub-frame 610 and transfer conveyor using robotic arm 605, for example, as shown in FIGS. 18-20. After the items 204 have been rotationally transferred onto the transfer conveyor, the method 500 continues to block 525.

At block 525, the now overturned bin 202 is translated in coordination with movement of the transfer conveyor to release the items 204. In the example systems 200 and 660 of FIGS. 2A-12 and 16-25, moving the transfer conveyor 252 or 630 can include activating the transfer conveyor motor 253 such that the bin-facing (e.g., upper) conveyor belt surface conveys the items 204 along the transfer conveyor 252 or 630 until the items 204 pass over a roller 254 of 632 and fall from the transfer conveyor 252 or 630 onto the conveyor belt surface 222 or 672 of the item output section 220 or 670. In some embodiments, the portion of the conveyor belt surface 222 or 672 onto which the items 204 fall can also be an unsupported portion of the conveyor belt surface 222 or 672 to avoid damage to the items 204 as they land.

As the transfer conveyor 252 or 630 conveys the items 204 toward the item output section 220 or 670, the bin 202 can be translated in the same direction and at the same speed as the upper conveyor belt surface of the transfer conveyor 252 or 630. Translation of the bin 202 can be controlled by the bin translation actuators 259 or by motors 643. Translation of the bin 202 in coordination with the movement of the transfer conveyor 252 or 630 can advantageously further reduce or avoid damaging the items by preventing collisions between the items 204 and side walls of the bin 202, and/or reducing or minimizing shearing forces exerted on the items, as the items 204 travel along the transfer conveyor 252 or 630. In the reference frame of the items, this coordinated movement has the effect of progressively pulling a "floor" out from under the items, without involving any relative sliding motion of the floor relative to the items. Moreover, the continued presence of the bin 202 above the transfer conveyor contains the items 204 and prevents the items 204 from undesirably falling from the sides of the transfer conveyor. Movement of transfer conveyor 252 or 630 and translation of the bin 202 can continue simultaneously until all items 204 are transferred to the item output section 220 or 670. For example, in some embodiments the movement at block 525 can be stopped at a predetermined limit where the opening of the rim of the bin 202 is entirely or substantially uncovered by the transfer conveyor 252 or 630. After the items 204 are released from the bin 202, the method 500 continues to block 530.

The method terminates at block 530, where the system returns to its starting configuration. In the example system 200 of FIGS. 2A-2G, returning to the starting configuration can include translating the bin sub-frame 244 in an opposite direction until the bin 202 is covered by the transfer conveyor 252, rotating the rotatable frame 242 back to an upright configuration, moving the bin sub-frame and the transfer conveyor 252 apart, and moving the support pawls 248 to a retracted configuration to release the bin 202 into the bin output section 230. After the bin 202 has fallen out of item transfer apparatus 240, the support pawls 248 may be reextended and the clamps 250 may be reopened such that the item processing system is in a starting configuration and is ready to receive a next bin 202' (FIG. 12) In the example system 660 of FIGS. 16-25, returning to the starting configuration can include translating the transfer conveyor frame 634 until the bin 202 is covered by the transfer conveyor 630, rotating and/or translating the bin sub-frame 610 using the robotic arm 605 back to an upright configuration of the bin sub-frame 610, and rotating the clamp 618 back to the open configuration to release the bin 202 into the bin output section 675 and such that the item transfer apparatus 600 is in a starting configuration and is ready to receive a next bin 202' (FIG. 25). From the starting configuration, the method 500 may be repeated from block 505 to block 530 repeatedly as more bins containing items are received for processing.

Example Item Transfer Apparatus According to the Present Disclosure

Figure 15A:
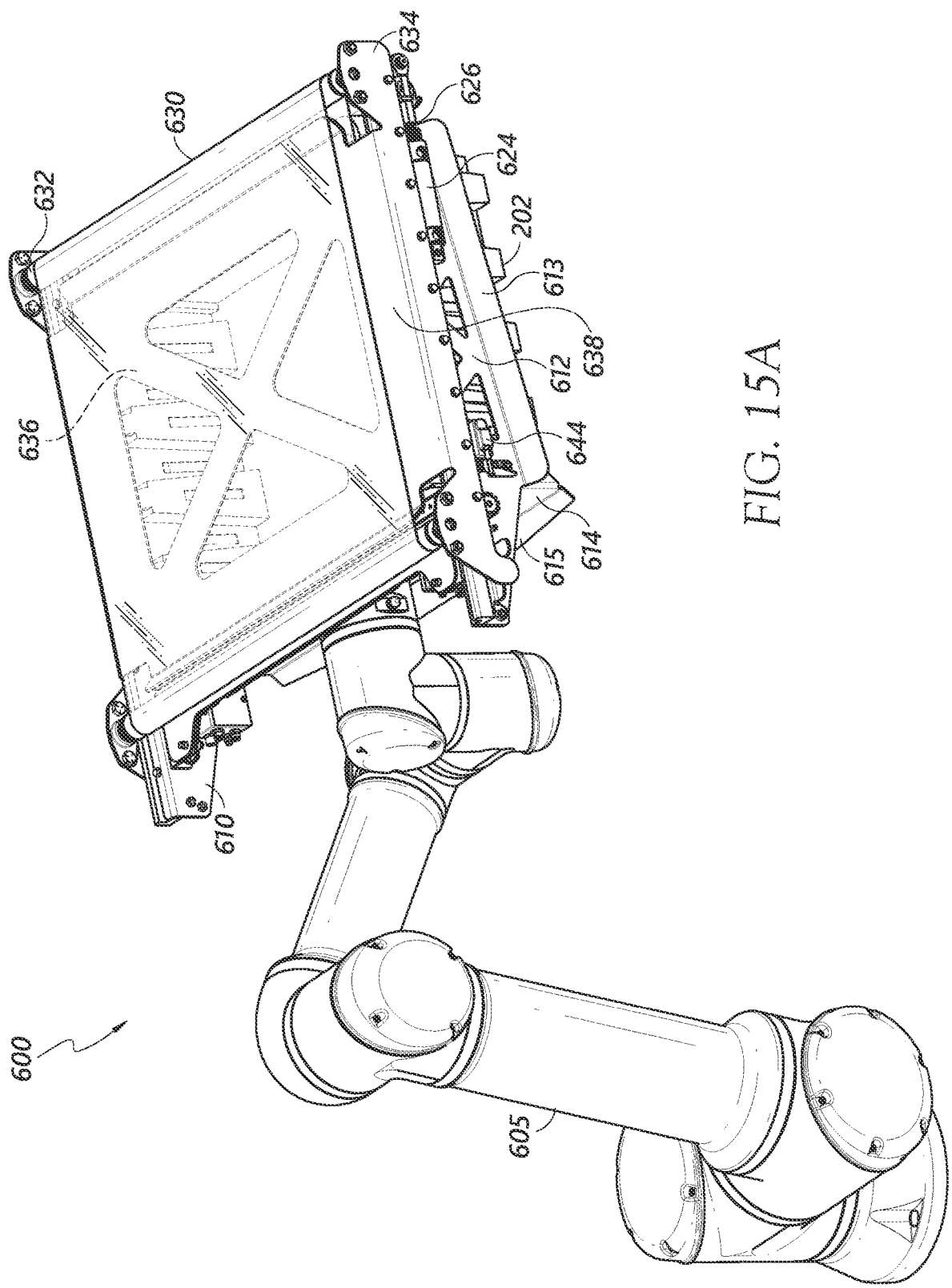
FIGS. 15A-15D depict an example embodiment of an item transfer apparatus in accordance with the present technology.
Figure 15B:
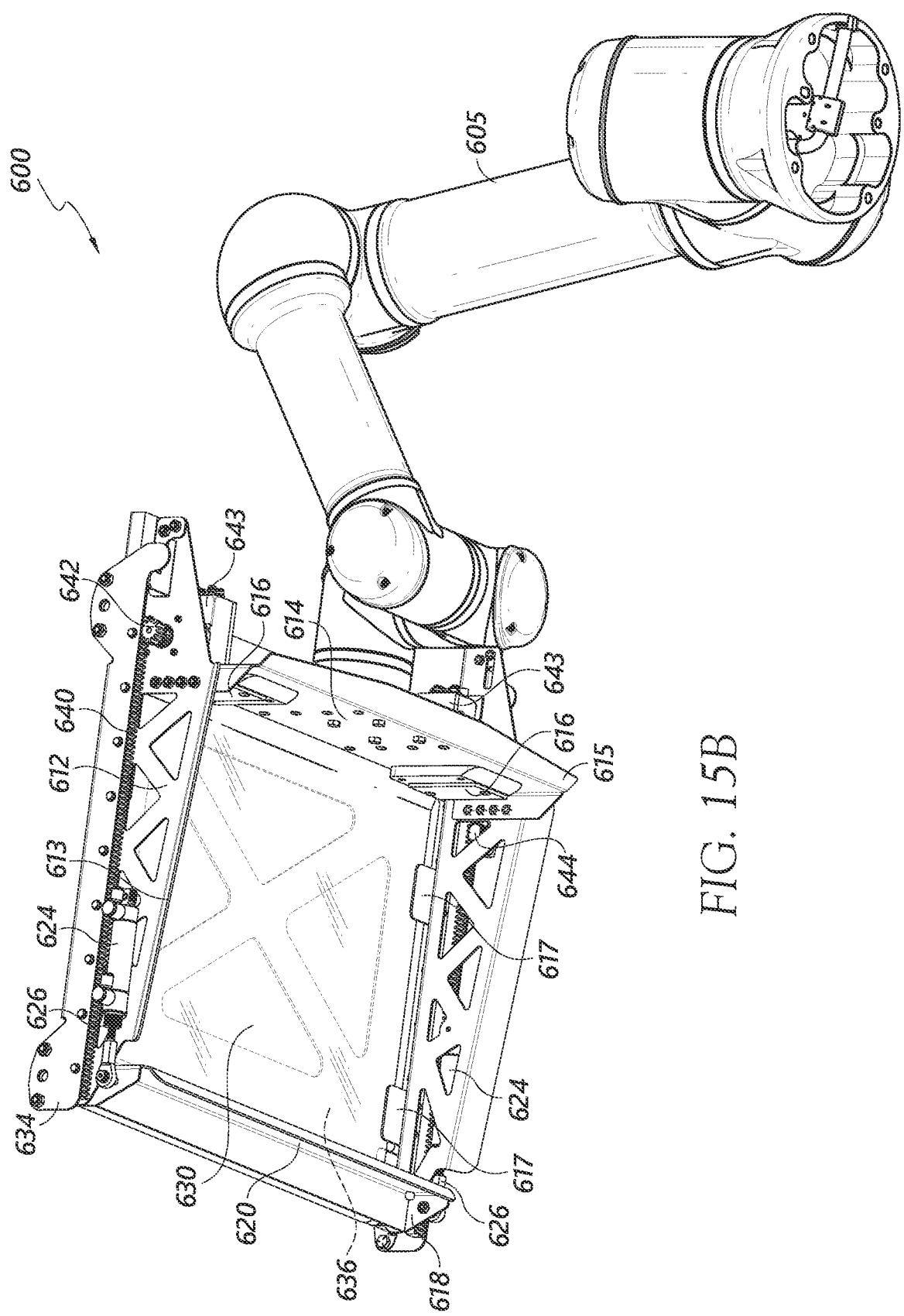
Figure 15C:
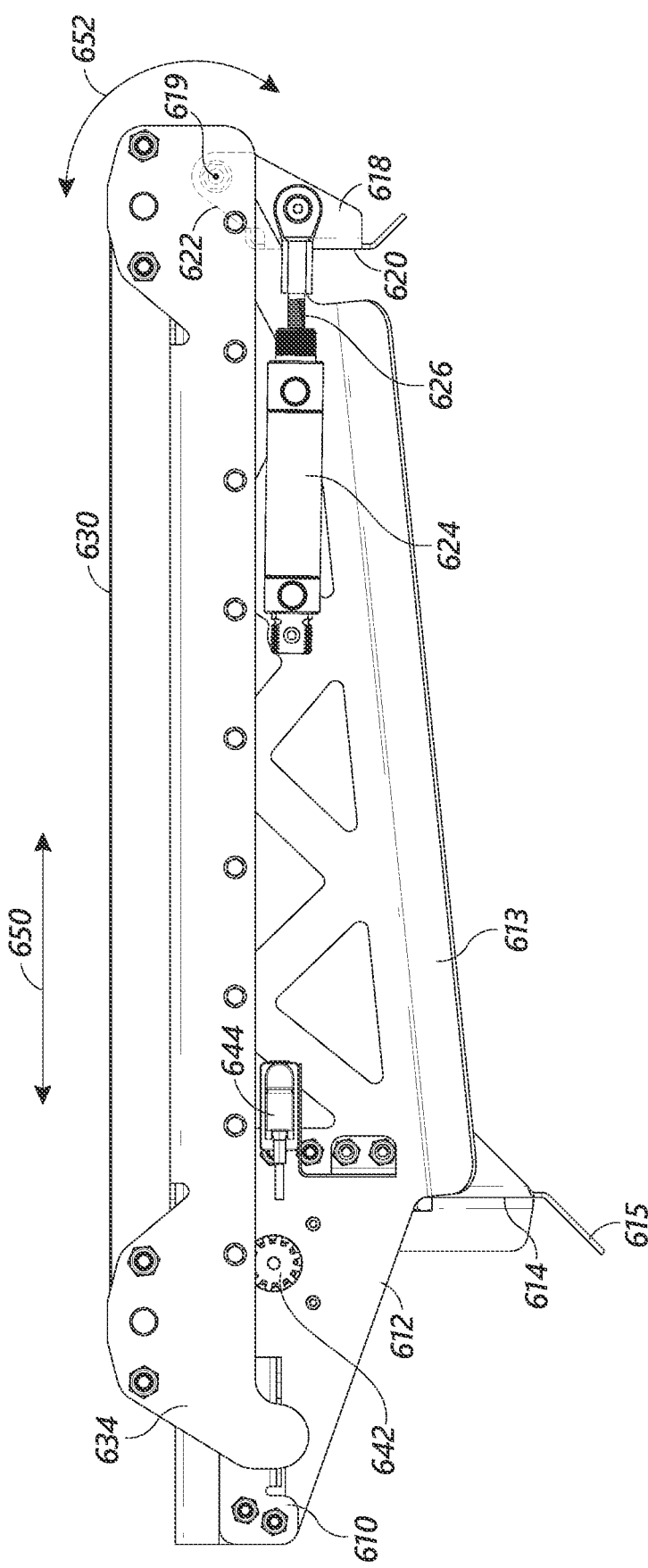
Figure 15D:
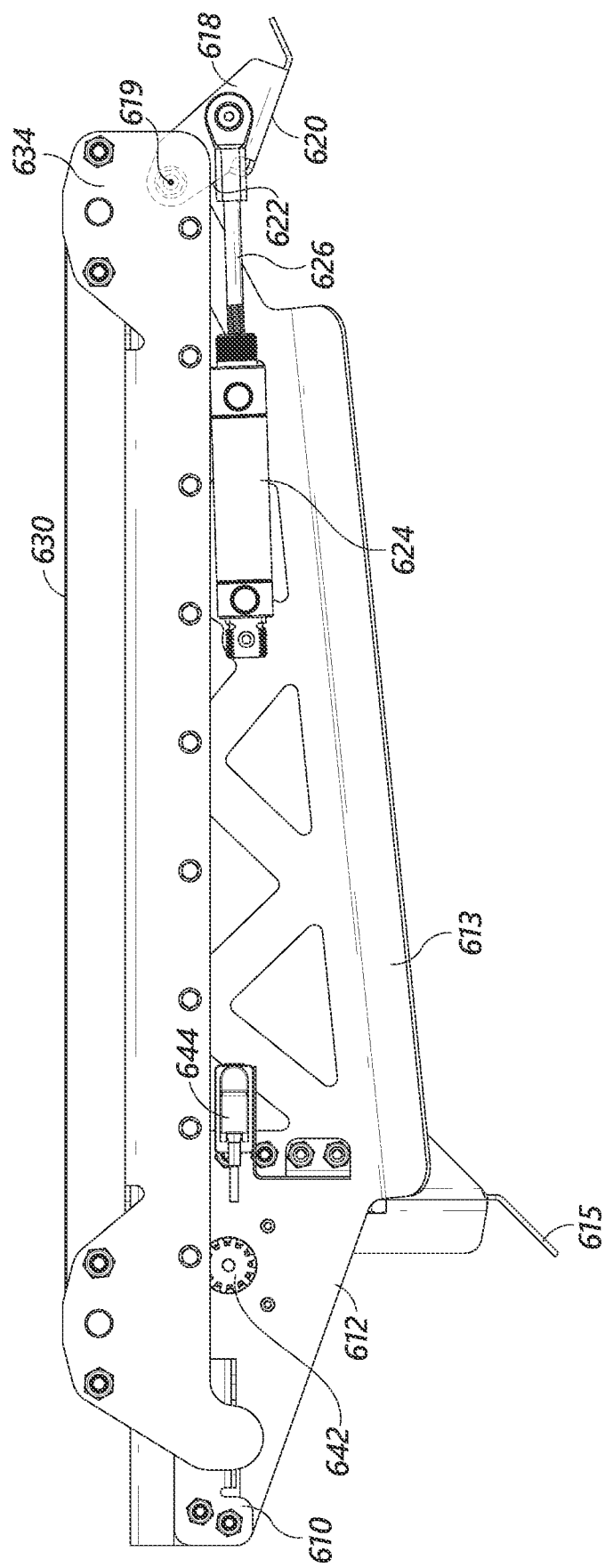

FIGS. 15A-15D depict an example embodiment of an item transfer apparatus 600 for de-binning items in accordance with the present technology. FIG. 15A is an upper side perspective view of the item transfer apparatus 600 with a bin 202 attached thereto. FIG. 15B is a lower side perspective view of the item transfer apparatus 600. FIGS. 15C and 15D are side views of a portion of the item transfer apparatus 600 illustrating axes of motion of certain portions of the item transfer apparatus 600.

The item transfer apparatus 600 of FIGS. 15A-15D can be implemented in conjunction with any of the item processing systems of the present disclosure. For example, the item transfer apparatus 600 may be implemented as the item transfer apparatus 110 in the item processing system 100 of FIG. 1, as the item transfer apparatus 240 in the item processing system 200 of FIGS. 2A-2G, and/or as a portion of the item processing system 400 of FIG. 13. The item transfer apparatus 600 may equally be used to perform some or all of any of the methods or processes disclosed herein, such as the item transfer process of FIGS. 3-12 and/or the method 500 of FIG. 14.

The item transfer apparatus 600 is configured to receive item-containing bins from an input such as the input section 210 of FIGS. 2A-2G, and to transfer the items from the bins to an output such as the output section 220 of FIGS. 2A-2G. The item transfer apparatus 600 includes a bin sub-frame 610 coupled to a transfer conveyor 630. The bin sub-frame 610 includes side rails 612 and an end rail 614. Flanges 613 and 615 can extend at outward angles from lower ends of side rails 612 and end rail 614, respectively, so as to guide the rim of a bin 202 into the correct position between the side rails 612 and the end rail 614 when the bin sub-frame 610 engages the bin 202.

The bin sub-frame 610 further includes a clamp 618 disposed opposite the end rail 614. The clamp 618 can include a guide surface 620 and a locking surface 622. The clamp 618 can be rotatably coupled to the bin sub-frame 610 at a hinge 619. One or more linear actuators 624 can be coupled to the clamp 618 by push rods 626 such that the linear actuators 624 are operable to rotate the clamp 618 about the hinge 619 (e.g., along rotational direction 652) between an open position and a closed position. FIG. 15C depicts the clamp 618 in the closed position; FIG. 15D depicts the clamp 618 in the open position. As shown in FIG. 15D, while the clamp 618 is in the open position, the guide surface 620 of the clamp 618 is disposed at an obtuse angle relative to the transfer conveyor 630 so as to guide the rim of a bin 202 into the space between the side rails 612, the end rail 614, and the clamp 618. As shown in FIG. 15C, while the clamp 618 is in the closed position, the locking surface 622 is disposed at an acute angle relative to the transfer conveyor 630 such that the rim of a bin 202 may be supported by the locking surface 622. Moreover, the use of an angled locking surface 622 may advantageously allow the bin sub-frame 610 to receive and be compatible with multiple different types of bins 202 having slightly different dimensions (e.g., different lengths along the dimension between the end rail 614 and the clamp 618).

The end rail 614 may further include one or more pads 616 disposed to contact the rim of a bin 202 within the bin sub-frame 610. In some embodiments, the pads 616 may comprise a resilient and/or relatively high-friction material, such as a polymeric or rubber material, so as to retain the rim of a bin 202 when held in place against the pads 616. In one example, the pads 616 can be at least partially made from neoprene or the like.

Upper stops 617 can extend from a top edge of the side rails 612 and/or end rail 614. The upper stops 617 can be positioned so as to contact the rim of a bin 202 within the bin sub-frame 610 and to serve as an upper constraint on the motion of a bin 202 entering the bin sub-frame 610. Thus, in operation, the bin sub-frame 610 can be lowered onto a bin 202 with the clamp 618 in the open position, until the rim of the bin 202 contacts the upper stops 617 and the pads 616. When the rim of the bin 202 is at or near the upper stops 617, the linear actuators 624 can move the clamp 618 to the closed position, locking the rim of the bin 202 in a fixed position relative to the sub-frame 610, constrained between the locking surface 622 of the clamp 618, the pads 616, and the upper stops 617. In some embodiments, moving the clamp 618 to the closed position may also lift the bin 202 a short distance into the bin sub-frame 610. A sensor 644, such as a photoelectric sensor, beam break sensor, proximity sensor, or any other suitable type of sensor, can be included near the upper extend of one or both side rails 612 or of the end rail 614, so as to detect when a bin 202 is far enough into the bin sub-frame 610 to close the clamp 618.

The transfer conveyor 630 can be disposed on rollers 632 mounted on a transfer conveyor sub-frame 634. The rollers 632 can be powered so as to move the surface of the transfer conveyor 630 along a lateral axis 650. The conveyor sub-frame 634 can further be slidable along the lateral axis 650. In some embodiments, the conveyor sub-frame 634 includes one or more rack gears 640 which can interlock with circular gears 642 coupled to the bin sub-frame 610. Accordingly, one or more motors 643 can turn the circular gears 642 to slide the conveyor sub-frame 634 relative to the bin sub-frame 610.

With continued reference to FIGS. 15A and 15B, in the example item transfer apparatus 600, the bin sub-frame 610 supporting the bin 202 and the conveyor sub-frame 634 are connected to a robotic arm 605 capable of translating and/or rotating the frame along multiple axes. For example, in some embodiments the item transfer apparatus 600 can rotationally transfer items from the bin 202 onto the transfer conveyor 630 by rotation and/or translation about any of the axes illustrated and discussed with reference to FIG. 2H. In some embodiments, the item transfer apparatus 600 may be used to transfer items in an item processing system in which the input section, bin output section, and item output section are not necessarily aligned along a single longitudinal axis, as will be described in greater detail with reference to FIGS. 16-24.

As described elsewhere herein, at least a portion of the transfer conveyor 630 may be unsupported so as to provide a resilient surface that cushions the transfer of items from the bin 202 onto the transfer conveyor 630. A further example of an unsupported transfer conveyor 630 configuration is illustrated in FIGS. 15A-15D. Additional components such as a shear member 636 and/or edge guide members 638 may be present between the two conveyor belt surfaces of the transfer conveyor 630.

The shear member 636 is included to provide additional rigidity and/or dimensional stability to the conveyor sub-frame 634 of the item transfer apparatus 600. The shear member 636 is a generally planar component which may be spaced away from the bin-facing conveyor belt surface of the transfer conveyor 630 such that it is located relatively closer to the upper conveyor belt surface of the transfer conveyor 630. Accordingly, the spacing between the shear member 636 and the bin-facing conveyor belt surface allows for a downward deflection of the unsupported bin-facing conveyor belt surface as the items are rotationally transferred onto the transfer conveyor 630.

Edge guide members 638 are disposed between the two opposing conveyor belt surfaces and are configured to prevent items from leaving the item transfer apparatus 600 between the rim of bin 202 and the lateral edges of the transfer conveyor 630 during rotational transfer of the items onto the transfer conveyor 630. In some embodiments, the edge guide members 638 may be spaced away from the bin-facing conveyor belt surface of the transfer conveyor 630 and/or may be located where they lie opposite the side walls of the bin 202. Accordingly, the edge members 638 can advantageously improve retention of items between the bin 202 and the transfer conveyor 630, while maintaining the unsupported configuration of the bin-facing conveyor belt surface of the transfer conveyor 630.

Example Item Transfer Process According to the Present Disclosure

FIGS. 16-25 sequentially illustrate an example process for transferring items from a bin 202 using an item processing system 660 as disclosed herein. Although the process of FIGS. 16-25 is shown and described in the context of an item processing system 660 including the item transfer apparatus 600 of FIGS. 15A-15D, it will be appreciated that the same or similar steps may be implemented in conjunction with another item processing system or item transfer apparatus without departing from the scope of the present disclosure. For example, the process of FIGS. 16-25 can be implemented in conjunction with the item transfer apparatus 290 of FIG. 2H, or the item processing system 200 of FIGS.

2A-2G. Moreover, although the process of FIGS. 16-25 is shown and described in the context of transferring strawberries from a bin to a conveyor for further processing, the same or similar steps may be implemented in the context of any other transfer of items from a container.

Figure 16:
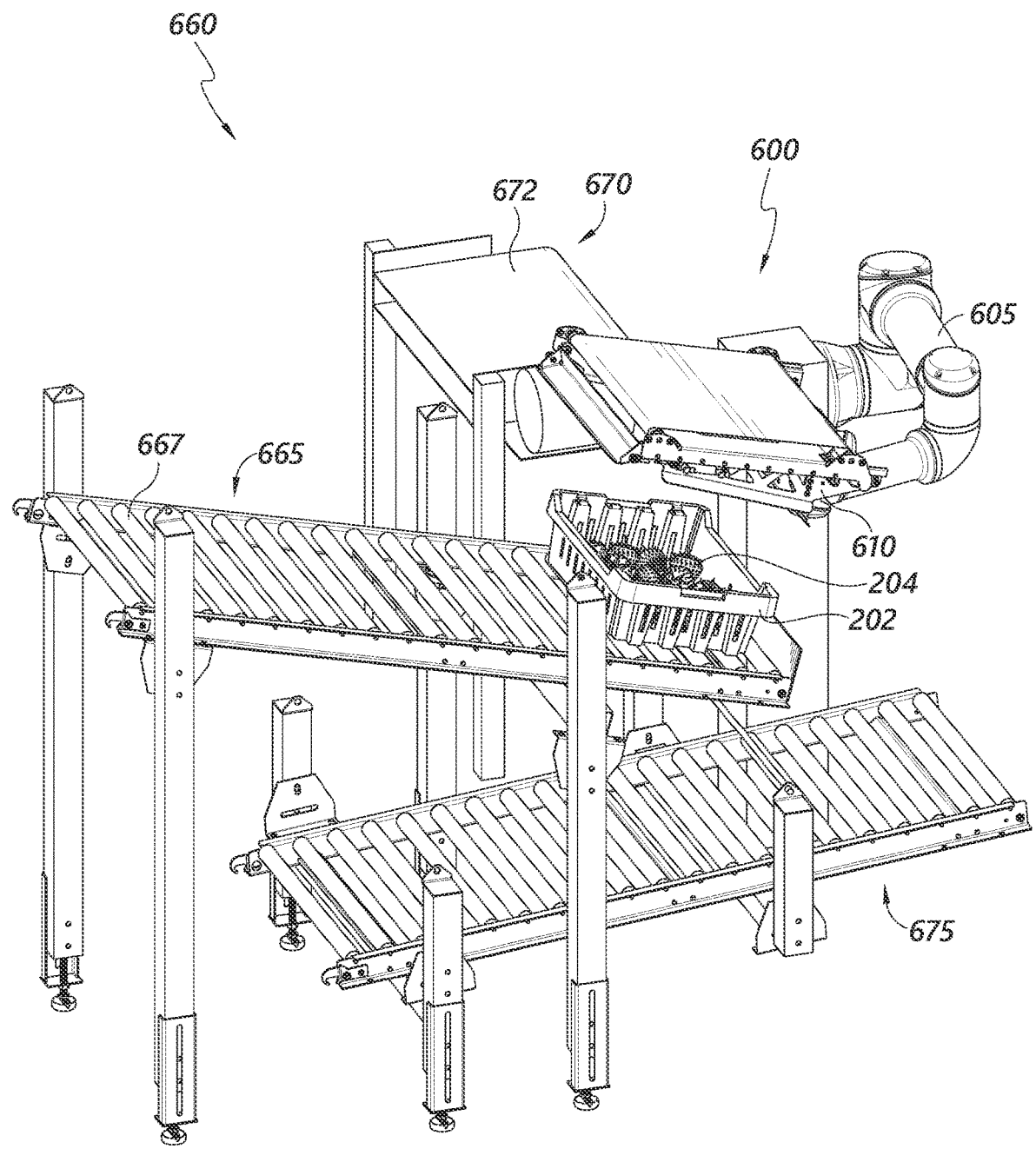
FIGS. 16-25 depict an example sequence for transferring items from a bin using an example item processing system including the item transfer apparatus of FIGS. 15A-15D.

FIG. 16 depicts an initial state of the item transfer process. In the initial state, a bin 202 is disposed on an input section 665 and contains items 204 to be transferred. The items can be strawberries, other produce, or any other type of item contained within the bin 202. In the initial state of FIG. 16, the item-containing bin 202 has passed through the input section 665 by traveling along rollers 667 to an end of the input section 665 near the item transfer apparatus 600. The robotic arm 605 has moved to a position in which the bin sub-frame 610 is disposed generally above the bin 202. From the initial state, as shown in FIG. 16, the process of FIGS. 16-25 will transfer the items 204 from the bin 202 onto a conveyor belt surface 672 of an item output section 670 and will release the empty bin 202 into a bin output section 675.

Figure 17:
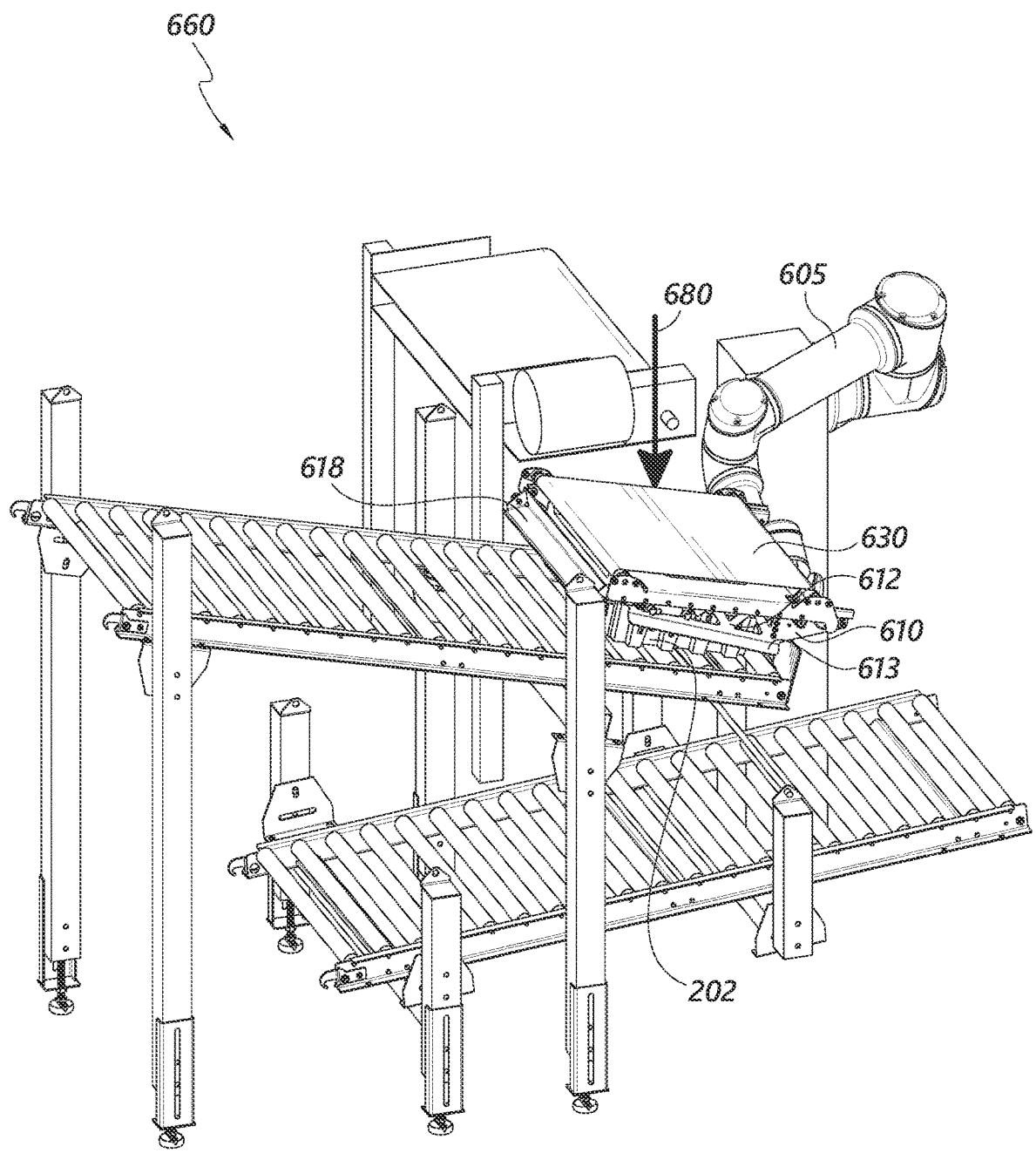

When a bin 202 is present and the item transfer apparatus 600 is ready to transfer the items 604, the process continues to the configuration shown in FIG. 17. As shown in FIG. 17, the robotic arm 605 has moved the bin sub-frame 610 downward generally along direction 680, with the clamp 618 in the open position, to a position in which the bin sub-frame 610 at least partially surrounds the rim of the bin 202. As the bin sub-frame 610 descends, the clamp 618, the flanges 613, and/or flange 615 (FIGS. 15A-15B; not visible in FIG. 17) may guide the rim of the bin 202 into the space between the side rails 612. If necessary, depending on an angle of the input section 665, the robotic arm 605 may also tilt the bin sub-frame 610 to an angle at which the bin sub-frame 610 and the transfer conveyor 630 are substantially parallel to the surface of the input section 665. Descent of the bin sub-frame 610 may continue until the upper surface of the rim of the bin 202 is abutting or close to the upper stops 617 (FIG. 15B; not visible in FIG. 17).

After the bin sub-frame 610 is lowered onto the bin 202, the process continues to the configuration shown in FIG. 18. As shown in FIG. 18, the linear actuators 624 rotate the clamp 618 along direction 682 to the closed position. In some embodiments, rotation of the claim 618 by the linear actuators 624 may occur in response to a signal from sensor 644 (FIGS. 15A-15D; not visible in FIG. 18) indicating the presence of a portion of a bin 202 within an upper portion of the bin sub-frame 610. In the closed position, the locking surface 622 of the clamp 618 secures the rim of the bin 202 between the clamp 618, the upper stops 617 (FIG. 15B; not visible in FIG. 18), and the pads 616 (FIG. 15B; not visible in FIG. 18). Thus, in the configuration shown in FIG. 18, the bin 202 is secured vertically within the item transfer apparatus 600. It will be understood that the item transfer apparatus 600 of the present technology is not limited to securing a bin 202 using a clamp 618, upper stops 617, and pads 616, and that various embodiments of the present technology may equally include additional or different structures for securing a bin 202 within a rotatable frame.

After the clamp 618 is rotated to secure the bin 202 within the item transfer apparatus 600, the process continues to the configurations shown in FIGS. 19 and 20. As shown in FIGS. 19 and 20, the robotic arm 605 rotates the bin sub-frame 610 along rotational direction 684 to invert the bin sub-frame 610 and place it proximate the item output section 670. Movement of the bin sub-frame 610 may further include translation along a vertical translation direction 686 and/or along a horizontal translation direction 688, depending on the relative locations and orientations of the input section 665 and the item output section 670. FIG. 19 illustrates an intermediate position in the transition from the position of FIG. 18 to the position of FIG. 20. In the inverted position of FIG. 20, the items 204 rest on the transfer conveyor 630 and are contained laterally by side walls of the bin 202. The transfer conveyor 630 is disposed above the conveyor belt surface 672 of the output section 670.

As discussed above, in some embodiments, the transfer conveyor 630 may be supported only on end rollers, without any additional intermediate rollers disposed between the rollers disposed at opposite ends of the transfer conveyor 630. This configuration in which the middle portion of the transfer conveyor 630 (e.g., the portion of the transfer conveyor 630 below the bin 202) is unsupported can advantageously provide additional resilience and shock absorption when the items 204 fall onto the transfer conveyor 630, further reducing the probability of bruising or other cosmetic damage to the items in the inversion from FIG. 18 to FIG. 20.

Figure 21A:
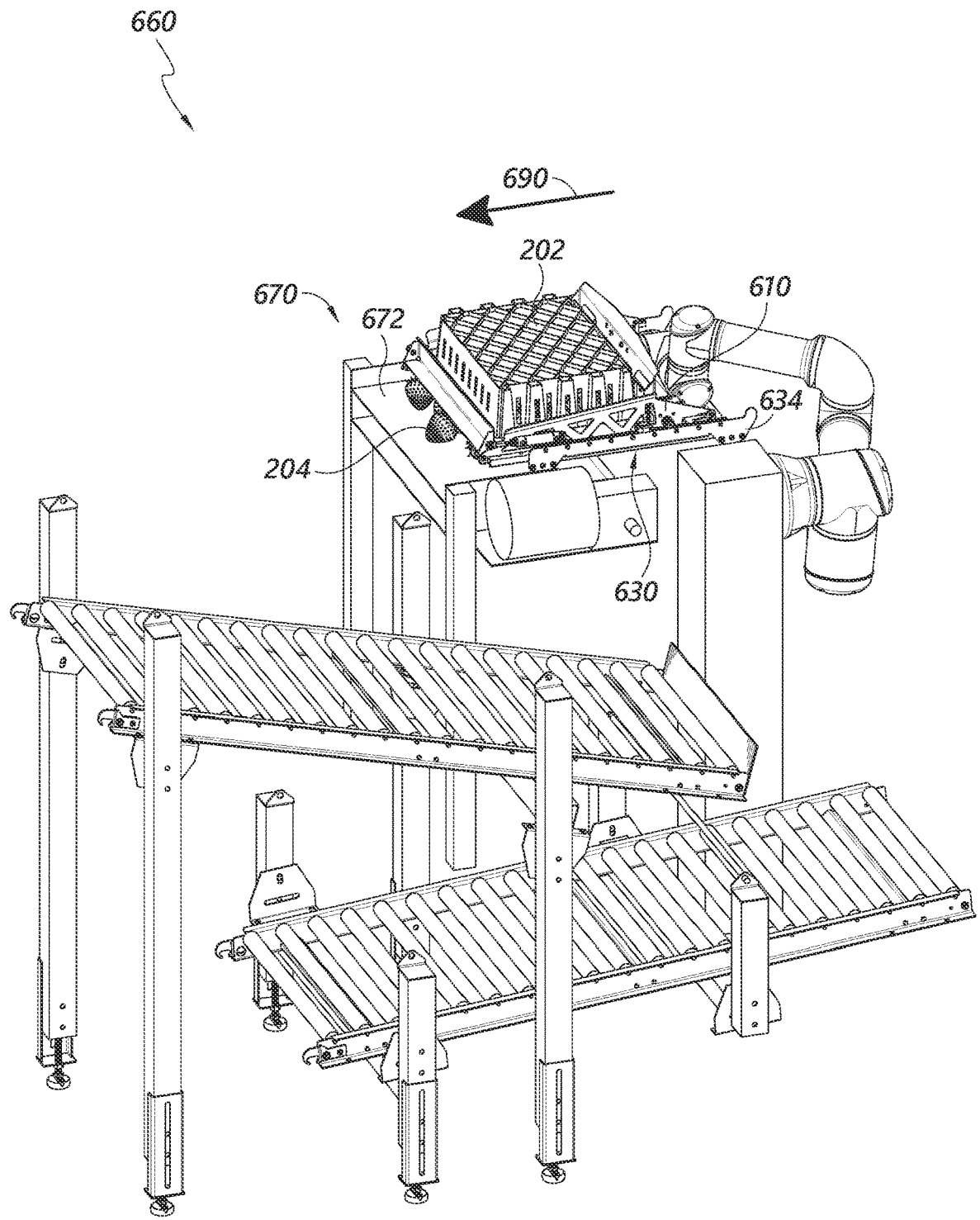
Figure 21B:
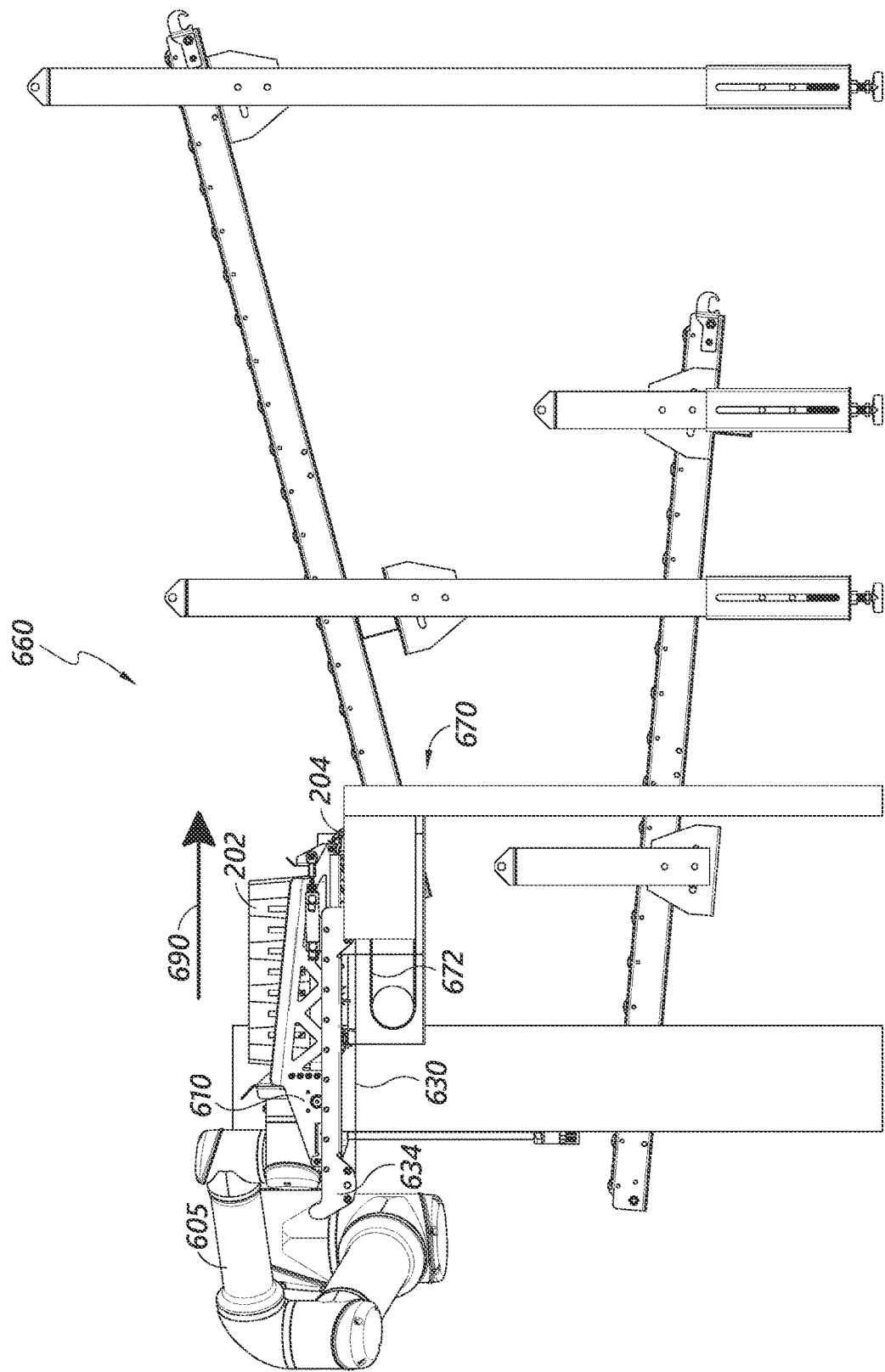

After the transfer conveyor 630 and the bin sub-frame 610 have been rotationally inverted to transfer the items 204 onto the transfer conveyor 630, the process continues to the configuration shown in FIGS. 21A and 21B. From the inverted or rotated position of FIG. 20, the bin sub-frame 610 and the bin 202 are translated linearly along direction 690 in coordination with movement of the item-facing conveyor belt surface of the transfer conveyor 630 along the same direction 690. In some embodiments, the transfer conveyor 630 is moved linearly along direction 690 at the same speed as the bin sub-frame 610 and the bin 202 are linearly translated along direction 690, such that the items 204 are moved toward the conveyor belt surface 672 of the item output section 670 while being contained within the inverted bin 202. In this manner, the items 204 are moved toward the item output section 670 without being able to fall laterally out of the item processing system 660. In some embodiments, in a stationary reference frame of the item processing system 660, the transfer conveyor 630 may remain stationary while the bin sub-frame 610 and the bin 202 are translated along direction 690, the bin sub-frame 610 and the bin 202 may remain stationary while the transfer conveyor 630 and conveyor sub-frame 634 are translated opposite direction 690, or the items 204 may be released onto the conveyor belt surface 672 by a combination of translating the bin sub-frame 610 along direction 690 while translating the conveyor sub-frame 634 opposite direction 690. In any of these movements or combinations of movement, the relative translation between the conveyor sub-frame 634 and the bin sub-frame 610 progressively uncovers the opening of the bin 202 until all or substantially all of the bin 202 is uncovered to allow the items 204 to fall onto the conveyor belt surface 672.

As items 204 reach the end of the transfer conveyor 630, the items 204 begin to fall from the transfer conveyor 630 onto the conveyor belt surface 672 of the item output section 670. As discussed above, the conveyor belt surface 672 may similarly be at least partially unsupported at the end adjacent the item transfer apparatus 600 such that the items 204 falling onto the conveyor belt surface 672 are not bruised or otherwise cosmetically damaged as they are transferred from the item transfer apparatus 600 to the item output section 670. Moreover, the diameter of the rollers of the transfer conveyor 630 can be selected such that the drop from the transfer conveyor 630 onto the conveyor belt surface 672 is relatively small, reducing or minimizing kinetic energy imparted to the items, thereby reducing impact and/or shearing forces and further reducing the probability of cosmetic damage to the items. For example, the vertical distance can be 5 inches or less, such as 3 inches or less, 2 inches or less, 1 inch or less, ½ inch or less, etc.

In some embodiments, the conveyor belt surface 672 of the item output section 670 can be translated at a speed greater than the translational speed of the transfer conveyor 630 and the bin sub-frame 610 along direction 690. Advantageously, the transfer of items 204 from a slower transfer conveyor 630 onto a faster conveyor belt surface 672 of the item output section 670 can provide for increased spacing of the items 204 on the conveyor belt surface 672. Increased spacing of the items 204 can facilitate efficient sorting, packing, and/or other processing of the items 204 downstream of the item transfer apparatus 600, either manually or automatically.

Figure 22A:
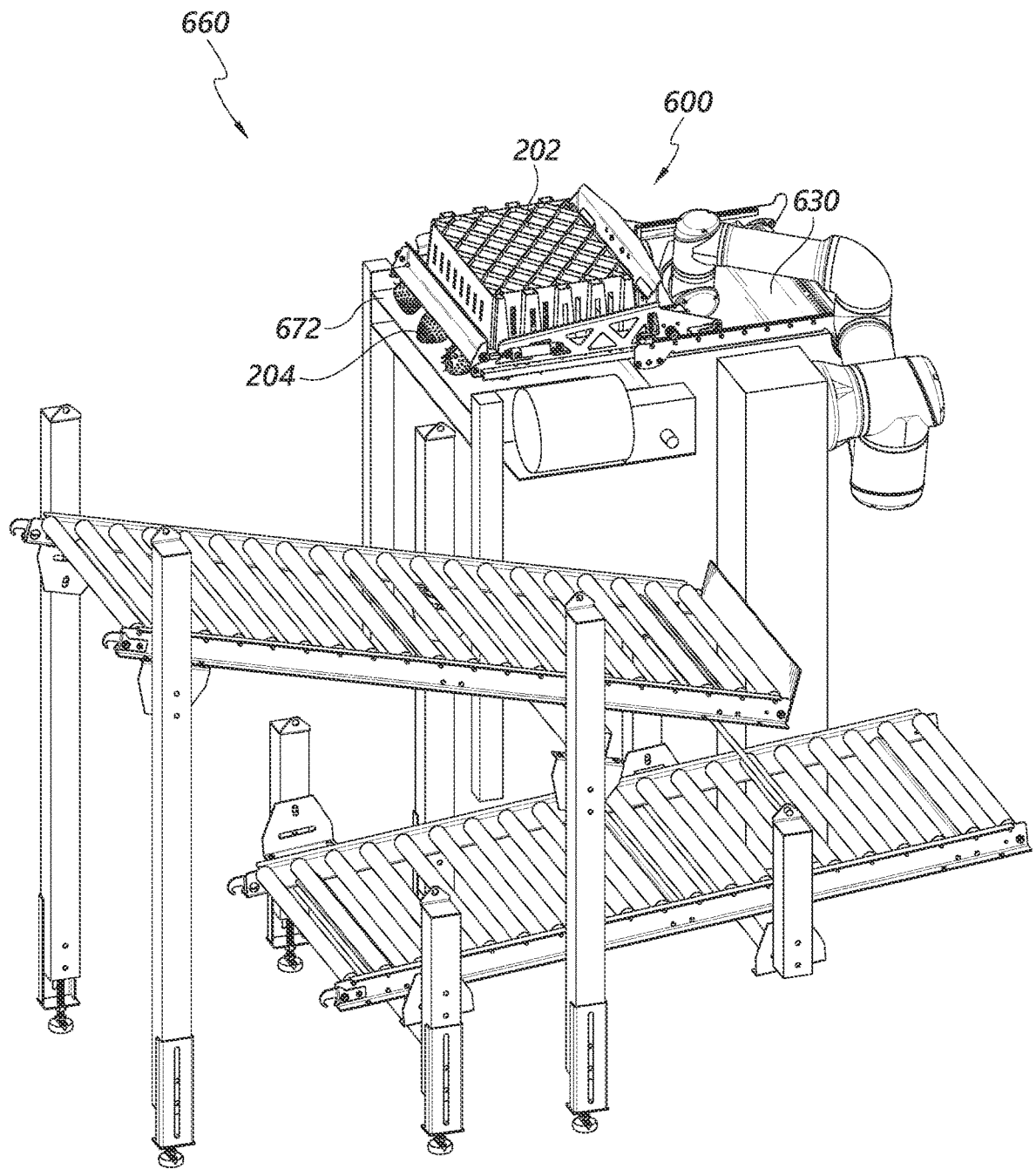
Figure 22B:
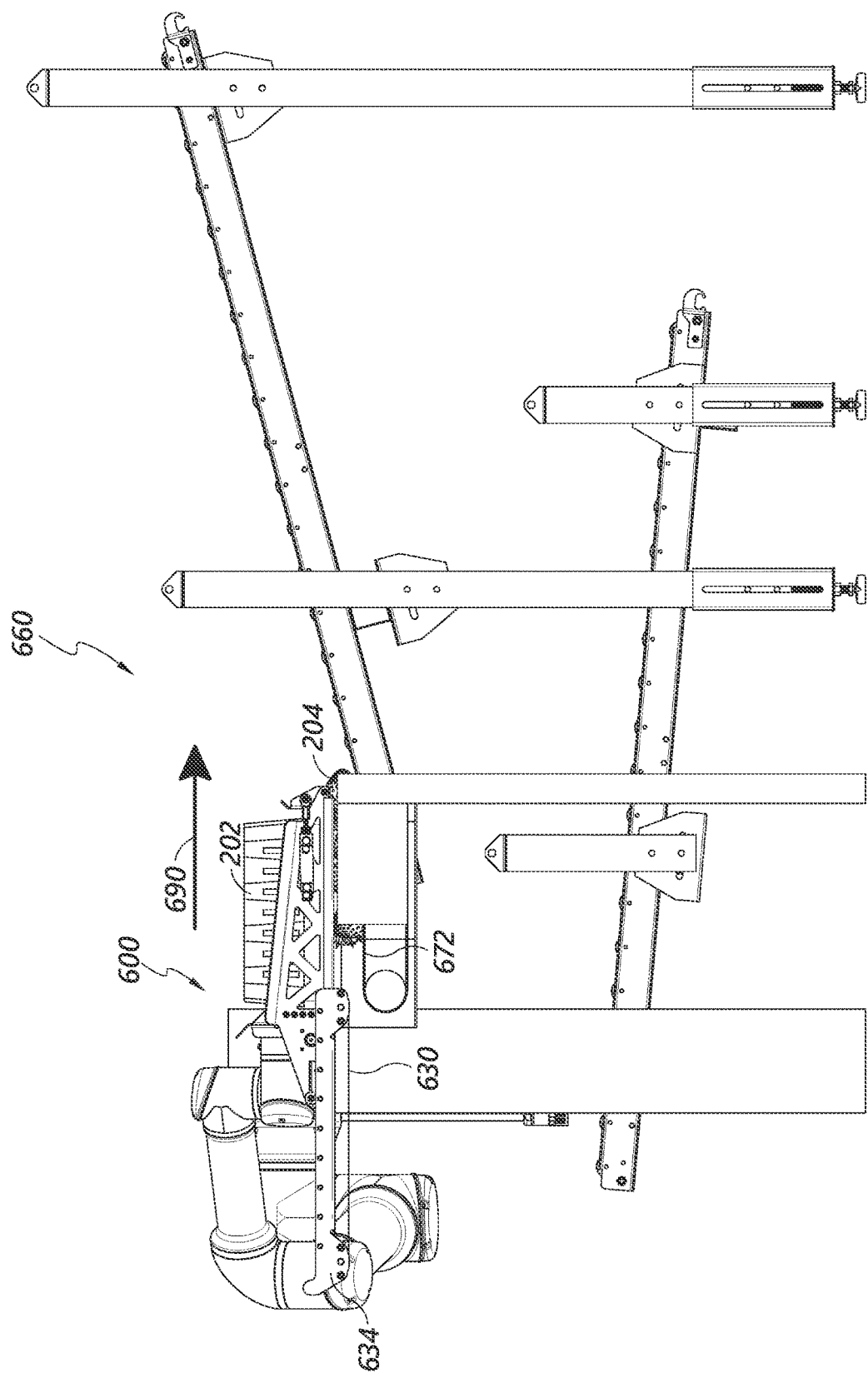

Referring now to FIGS. 22A and 22B, the linear translation of components of the item transfer apparatus 600 along and/or opposite direction 690 continues until the entirety of the bin 202 is substantially uncovered above the conveyor belt surface 672 of the item output section 670; the transfer conveyor 630 and conveyor sub-frame 634 are fully translated away from the bin sub-frame 610, such that all items 204 are transferred from the transfer conveyor 630 onto the conveyor belt surface 672.

Figure 23:
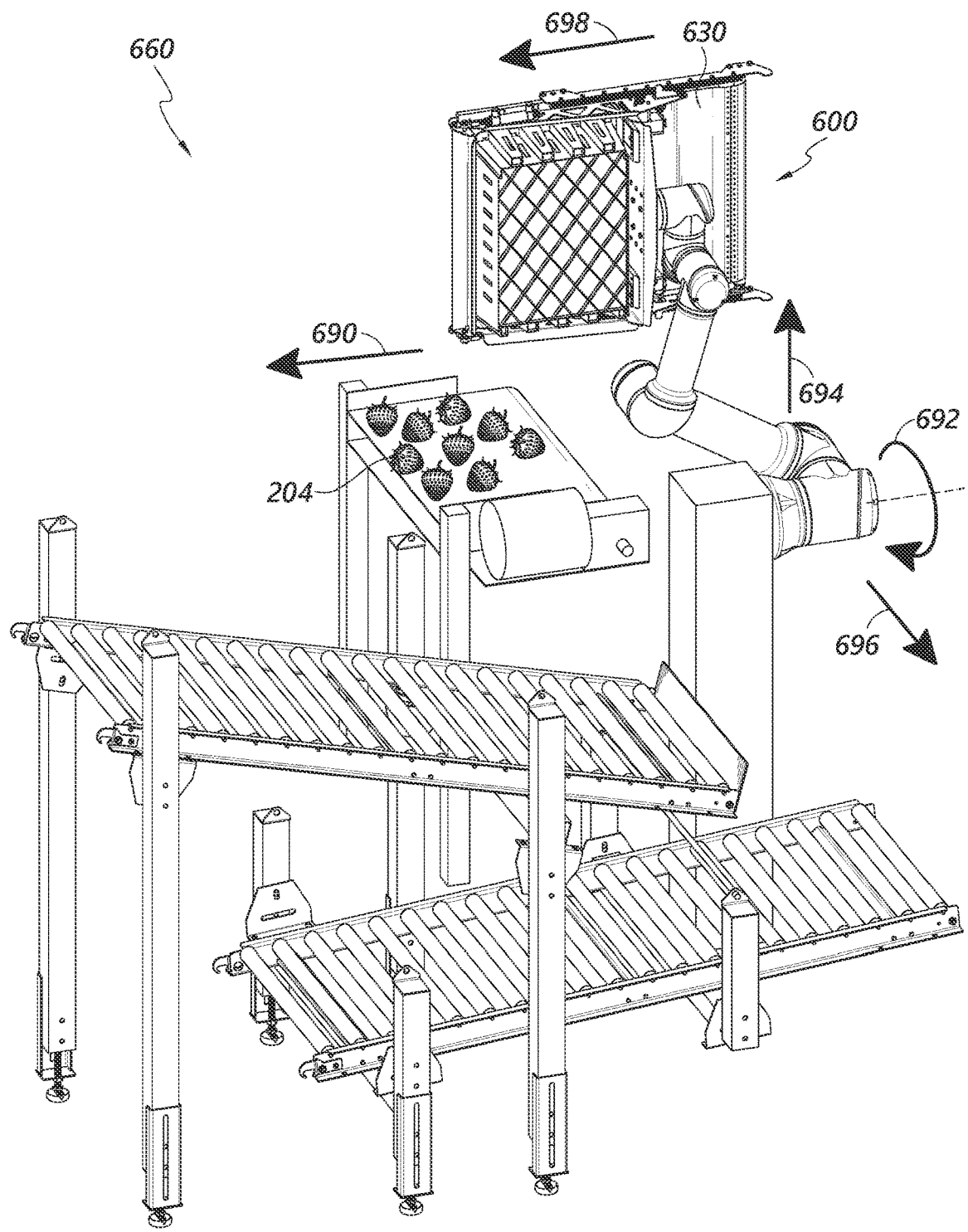
Figure 24:
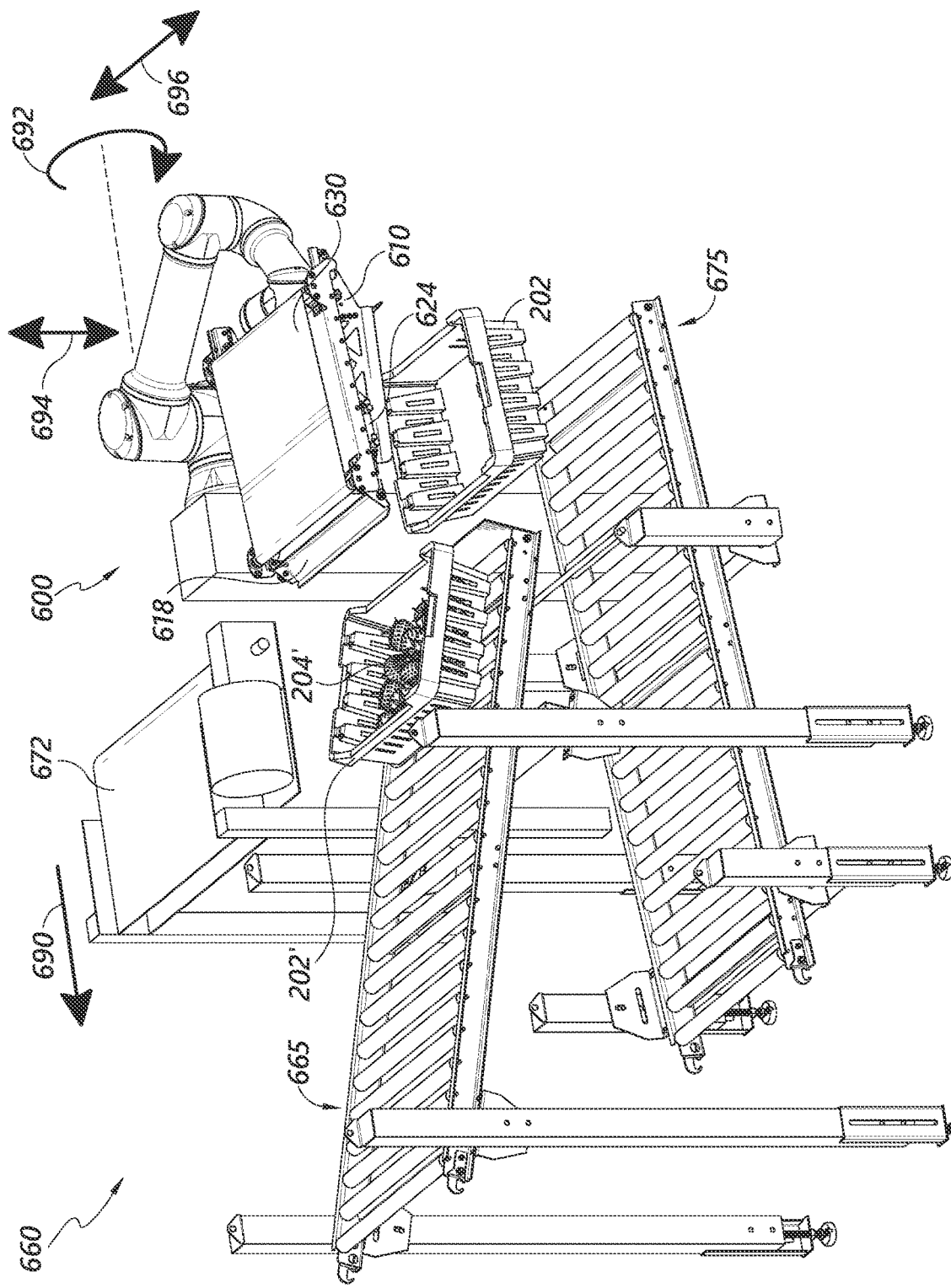
Figure 25:
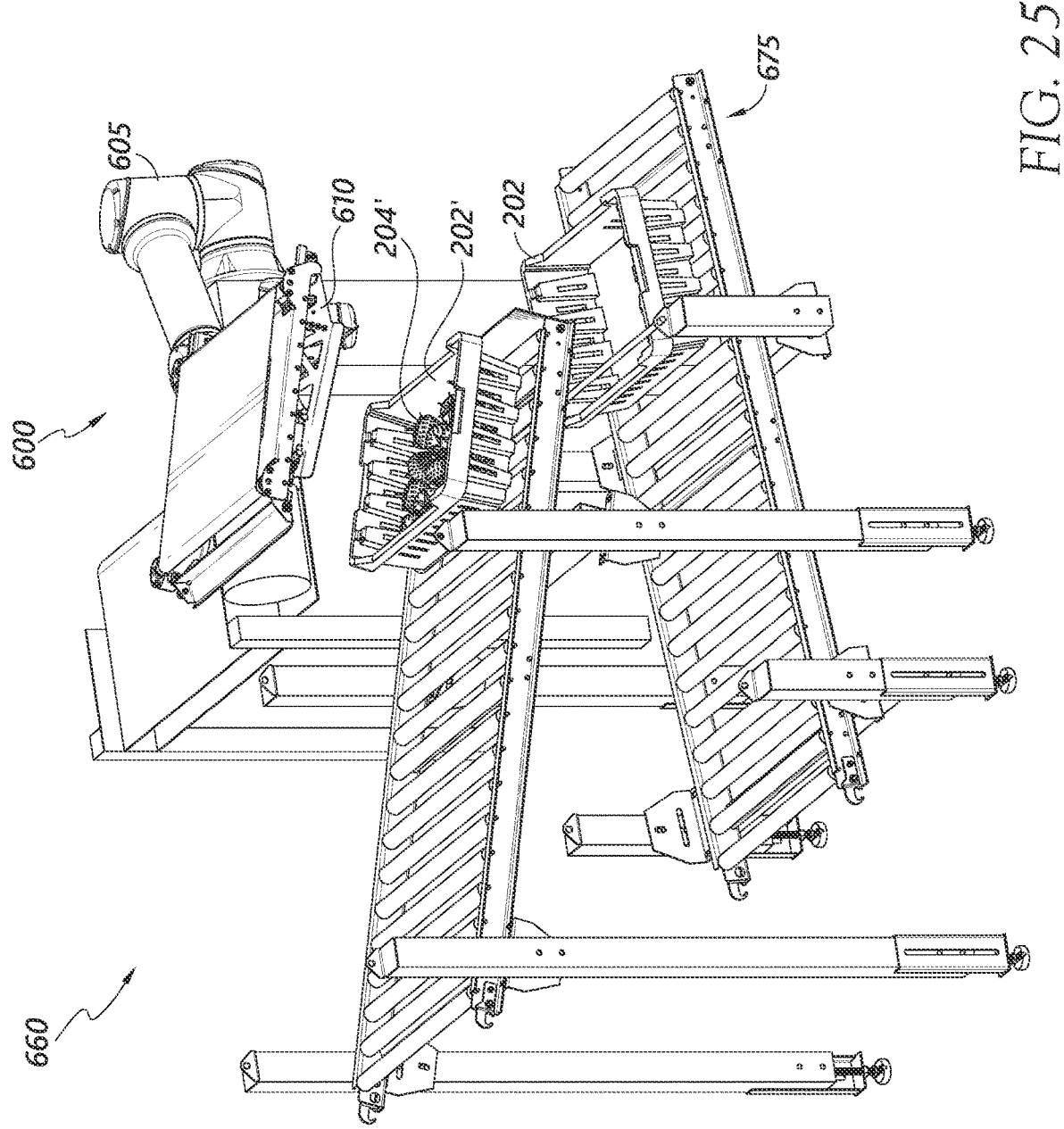

After all items 204 from the bin 202 are transferred onto the conveyor belt surface 672, the process continues to the configurations shown in FIGS. 23 and 24. As shown in FIGS. 23 and 24, the items 204 deposited on the conveyor belt surface 672 are transferred away from the item transfer apparatus 600 by the motion of the conveyor belt surface 672 along direction 690. In addition, the item transfer apparatus 600 rotates back along rotational direction 692 and/or along translation directions 694 and 696, under control of the robotic arm 605. Simultaneously, before rotation of the item transfer apparatus 600, and/or after rotation of the item transfer apparatus 600, the transfer conveyor 630 is also linearly translated back along direction 698 so that the transfer conveyor 630 again covers the bin 202.

As the item transfer apparatus 600 reaches or approaches the configuration of FIG. 24, the linear actuators 624 rotate the clamp 618 back to the open position to release the bin 202. As the clamp 618 is rotated to the open position, the empty bin 202 falls out of the bin sub-frame 610 and onto the bin output section 675, where the bin 202 can travel away from the item transfer apparatus 600 to a bin output location. A next bin 202', containing additional items 204' to be transferred, may have been received in the item processing system 660 and may be waiting in the input section 665.

Continuing to FIG. 25, after the first bin 202 is released onto the bin output section 675, robotic arm 605 can move the bin sub-frame 610 to a position generally above the next bin 202'. From the configuration of FIG. 25, the item transfer apparatus 600 may repeat the process of FIGS. 16-25 indefinitely as more bins are received containing items to be transferred.

Advantages of Embodiments of the Present Disclosure

Without limiting the scope of the foregoing description, additional advantageous features of certain embodiments of the present disclosure will now be described.

Some embodiments may be advantageously adapted for de-binning items which may have delicate internal components or compositions, and/or soft exterior surfaces that may be susceptible to cosmetic damage. For example, in the context of systems for processing strawberries or other berries, other fruits or vegetables, or the like, exterior damage to the skin or outer surface of items (e.g., bruising) may be undesirable to consumers and/or can cause produce to spoil more quickly if the skin is damaged. Many embodiments of the present disclosure are capable of de-binning strawberries with a minimal probability of bruising or other cosmetic damage to the strawberries. As strawberries are generally considered a delicate fruit with a relatively high susceptibility to bruising, it will be understood that the presently disclosed systems and methods can safely and advantageously be implemented for de-binning any other produce or other items that are delicate or susceptible to bruising or any other type of damage from handling.

As discussed above, a number of features of embodiments of the present disclosure are well-suited to handling of delicate items. For example, possible damage to items can be reduced or avoided through the use of unsupported conveyor belt surfaces, such as the portions of the transfer conveyor 252 underlying the bin 202 when the rotatable frame 242 is inverted, as well as the portion of the conveyor belt surface 222 of the item output section 220. Inverting or dropping items onto an unsupported conveyor belt surface provides a springy or resilient surface that gently absorbs the impact of inversion or dropping, rather than causing a rigid impact that can immediately bruise the surface of an item. Moreover, limiting drop distances (e.g., the drop from the transfer conveyor 252 onto the conveyor belt surface 222 of the item output section 220) to a relatively small distance such as 2 inches, 1 inch, or less, further reduces the probability of damage during transfer. In another example, the simultaneous translation of the inverted bin 202 along with movement of the transfer conveyor 252, at the same speed, causes the side walls of the bin 202 to move at the same speed in the same direction as the transfer conveyor 252 surface conveying the items, such that no shearing forces are exerted on the items as they move from the transfer conveyor 252 toward the item output section 220. Thus, various aspects of the present disclosure provide a de-binning system capable of relatively high throughput while avoiding any negative effects on the quality of packaged items, such as produce.

Implementing Systems and Terminology

Implementations disclosed herein provide systems, methods, and devices for transferring items from bins or other containers. It will be appreciated that the systems and methods described herein are not limited to the context of de-binning strawberries or other fruit. Rather, the systems and methods described herein may be used for a wide variety of implementations. One skilled in the art will recognize that these embodiments may be implemented in hardware or a combination of hardware and software and/or firmware.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the present disclosure should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

The methods disclosed herein include one or more steps or actions for achieving the described methods. The method steps and/or actions may be interchanged with one another without departing from the scope of the present disclosure. In other words, unless a specific order of steps or actions is required for proper operation of the method that is being described, the order and/or use of specific steps and/or actions may be modified without departing from the scope of the present disclosure.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). Further, the term "comprising" as used herein is synonymous with "including," "containing," or "characterized by," and is inclusive or open-ended and does not exclude additional, unrecited elements or method steps. Accordingly, the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

What is claimed is:

1. A system for transferring items from a bin, the system comprising:
    an item transfer apparatus comprising:
        a first conveyor configured to move a first conveyor belt surface; and
        a bin sub-frame coupled to the first conveyor and configured to receive a bin;
    one or more processors; and
    a memory storing computer-executable instructions that, when executed by the one or more processors, cause the one or more processors to actuate one or more motors or actuators to perform operations comprising:
        securing a bin containing one or more items to the bin sub-frame such that the first conveyor belt surface covers an opening of the bin;
        rotating the first conveyor and the bin sub-frame about a first lateral axis to a rotated position in which the items rest on the first conveyor belt surface and are laterally contained by side walls of the bin; and
        translating the bin sub-frame along a second lateral axis simultaneously with movement of the first conveyor belt surface to move the items off of the first conveyor belt surface and out of the bin.

2. The system of claim 1, wherein the items are moved off of the first conveyor belt surface onto an item output flow path comprising a second conveyor configured to move a second conveyor belt surface at a first speed, and wherein a distal end of the first conveyor is disposed above the second conveyor belt surface when the first conveyor and the bin sub-frame are in the rotated position.

3. The system of claim 2, wherein the movement of the first conveyor belt surface is at a second speed slower than the first speed.

4. The system of claim 1, wherein the bin sub-frame is translated at a same speed relative to a speed of the first conveyor belt surface along the first lateral axis to avoid exerting a shearing force on the items.

5. The system of claim 1, wherein the bin sub-frame comprises two parallel side rails spaced apart by a distance greater than or equal to a length or a width of a rim of the bin.

6. The system of claim 5, wherein the bin sub-frame further comprises an end rail perpendicular to the two parallel side rails and a rotatable clamp parallel to the end rail, the rotatable clamp configured to rotate between an open configuration and a closed configuration that supports a first side of a rim of a bin within the bin sub-frame.

7. The system of claim 6, wherein the end rail comprises one or more pads comprising a rubber material, the one or more pads disposed to contact a second side of the rim of the bin.

8. The system of claim 6, wherein the instructions further cause the one or more processors to actuate the one or more motors or actuators to perform operations comprising:
rotating the first conveyor and the bin sub-frame about the first lateral axis to an initial position after the items are dropped onto the item output flow path; and
moving the clamp to the open position to release the bin onto a bin output flow path.

9. The system of claim 1, wherein securing the bin to the bin sub-frame comprises:
receiving the bin within the bin sub-frame from an input flow path; and
moving one or more clamps coupled to the bin sub-frame to secure a rim of the bin between the one or more clamps and another component of the item transfer apparatus.

10. The system of claim 1, wherein the first conveyor comprises a first end roller and a second end roller, and wherein the first conveyor belt surface is mounted on the first and second end rollers such that the first conveyor belt surface is unsupported between the first and second end rollers.

11. The system of claim 1, wherein the items fall less than 2 inches from the first conveyor belt surface onto a surface of the item output flow path.

12. The system of claim 1, wherein the item transfer apparatus further comprises a robotic arm configured to move the bin sub-frame and the first conveyor.

13. The system of claim 1, wherein the second lateral axis is parallel to the first lateral axis.

14. The system of claim 1, wherein the second lateral axis is perpendicular to the first lateral axis.

15. The system of claim 1, wherein the items are strawberries.

16. The system of claim 15, wherein the item output flow path conveys the strawberries to a strawberry pack line.

17. A method of transferring items from a bin, the method comprising, under control of one or more processors:
receiving, at a bin sub-frame of an item transfer apparatus, a bin containing one or more items;
securing the bin to the bin sub-frame such that a first conveyor belt surface covers an opening of the bin;
simultaneously rotating the bin sub-frame and the first conveyor belt surface about a first lateral axis to a rotated position in which the items rest on the first conveyor belt surface and are laterally contained by side walls of the bin; and
translating the bin sub-frame along a second lateral axis simultaneously with movement of the first conveyor belt surface to drop the items out of the bin from the first conveyor belt surface onto an item output flow path.

18. The method of claim 17, wherein the item output flow path comprises a second conveyor configured to move a second conveyor belt surface at a first speed, and wherein the movement of the first conveyor belt surface is at a second speed slower than the first speed.

19. The method of claim 17, wherein the bin sub-frame is translated at a same speed relative to a speed of the first conveyor belt surface along the first lateral axis to avoid exerting a shearing force on the items.

20. The method of claim 17, wherein securing the bin to the bin sub-frame comprises moving one or more clamps movably coupled to the bin sub-frame to secure a rim of the bin within the bin sub-frame.

21. The method of claim 20, further comprising:
rotating the first conveyor and the bin sub-frame about the first lateral axis to an initial position after the items are dropped onto the item output flow path; and
moving the one or more clamps to release the bin onto a bin output flow path.

22. The method of claim 17, wherein simultaneously rotating the bin sub-frame and the first conveyor belt surface causes the items to rest on an unsupported portion of the first conveyor belt surface.

23. The method of claim 17, wherein dropping the items from the first conveyor belt surface onto the item output flow path comprises dropping the items a vertical distance of less than 2 inches.

24. The method of claim 17, wherein the second lateral axis is parallel to the first lateral axis.

25. The method of claim 17, wherein the second lateral axis is perpendicular to the first lateral axis.

26. The method of claim 17, wherein the items are strawberries.

27. The method of claim 26, wherein the item output flow path conveys the strawberries to a strawberry pack line.

28. A system for transferring items from a bin, the system comprising:
an item transfer apparatus comprising:
a first conveyor configured to move a first conveyor belt surface; and
a bin sub-frame coupled to the first conveyor and configured to receive a bin;
one or more processors; and
a memory storing computer-executable instructions that, when executed by the one or more processors, cause the one or more processors to actuate one or more motors or actuators to perform operations comprising:
securing a bin containing one or more items to the bin sub-frame such that the first conveyor belt surface covers an opening of the bin;
rotating the first conveyor and the bin sub-frame about a first lateral axis to a rotated position in which the items rest on the first conveyor belt surface and are laterally contained by side walls of the bin; and
translating the bin sub-frame along a second lateral axis in coordination with movement of the first conveyor belt surface parallel to the second lateral axis to move the items off of the first conveyor belt surface and out of the bin.

29. The system of claim 28, wherein the items are moved off of the first conveyor belt surface onto an item output flow path comprising a second conveyor configured to move a second conveyor belt surface at a first speed, and wherein a distal end of the first conveyor is disposed above the second conveyor belt surface when the first conveyor and the bin sub-frame are in the rotated position.

30. The system of claim 29, wherein the movement of the first conveyor belt surface is at a second speed slower than the first speed.

31. The system of claim 28, wherein the bin sub-frame is translated at a same speed relative to a speed of the first conveyor belt surface along the first lateral axis to avoid exerting a shearing force on the items.

32. The system of claim 28, wherein the bin sub-frame comprises two parallel side rails spaced apart by a distance greater than or equal to a length or a width of a rim of the bin.

33. The system of claim 32, wherein the bin sub-frame further comprises an end rail perpendicular to the two parallel side rails and a rotatable clamp parallel to the end rail, the rotatable clamp configured to rotate between an open configuration and a closed configuration that supports a first side of a rim of a bin within the bin sub-frame.

34. The system of claim 33, wherein the end rail comprises one or more pads comprising a rubber material, the one or more pads disposed to contact a second side of the rim of the bin.

35. The system of claim 33, wherein the instructions further cause the one or more processors to actuate the one or more motors or actuators to perform operations comprising:
rotating the first conveyor and the bin sub-frame about the first lateral axis to an initial position after the items are dropped onto the item output flow path; and
moving the clamp to the open position to release the bin onto a bin output flow path.

36. The system of claim 28, wherein securing the bin to the bin sub-frame comprises:
receiving the bin within the bin sub-frame from an input flow path; and
moving one or more clamps coupled to the bin sub-frame to secure a rim of the bin between the one or more clamps and another component of the item transfer apparatus.

37. The system of claim 28, wherein the first conveyor comprises a first end roller and a second end roller, and wherein the first conveyor belt surface is mounted on the first and second end rollers such that the first conveyor belt surface is unsupported between the first and second end rollers.

38. The system of claim 28, wherein the items fall less than 2 inches from the first conveyor belt surface onto a surface of the item output flow path.

39. The system of claim 28, wherein the item transfer apparatus further comprises a robotic arm configured to move the bin sub-frame and the first conveyor.

40. The system of claim 28, wherein the second lateral axis is parallel to the first lateral axis.

41. The system of claim 28, wherein the second lateral axis is perpendicular to the first lateral axis.

42. The system of claim 28, wherein the items are strawberries.

43. The system of claim 42, wherein the item output flow path conveys the strawberries to a strawberry pack line.

44. A method of transferring items from a bin, the method comprising, under control of one or more processors:
receiving, at a bin sub-frame of an item transfer apparatus, a bin containing one or more items;
securing the bin to the bin sub-frame such that a first conveyor belt surface covers an opening of the bin;
simultaneously rotating the bin sub-frame and the first conveyor belt surface about a first lateral axis to a rotated position in which the items rest on the first conveyor belt surface and are laterally contained by side walls of the bin; and
translating the bin sub-frame along a second lateral axis in coordination with movement of the first conveyor belt surface parallel to the second lateral axis to drop the items out of the bin from the first conveyor belt surface onto an item output flow path.

45. The method of claim 44, wherein the item output flow path comprises a second conveyor configured to move a second conveyor belt surface at a first speed, and wherein the movement of the first conveyor belt surface is at a second speed slower than the first speed.

46. The method of claim 44, wherein the bin sub-frame is translated at a same speed relative to a speed of the first conveyor belt surface along the first lateral axis to avoid exerting a shearing force on the items.

47. The method of claim 44, wherein securing the bin to the bin sub-frame comprises moving one or more clamps movably coupled to the bin sub-frame to secure a rim of the bin within the bin sub-frame.

48. The method of claim 47, further comprising:
rotating the first conveyor and the bin sub-frame about the first lateral axis to an initial position after the items are dropped onto the item output flow path; and
moving the one or more clamps to release the bin onto a bin output flow path.

49. The method of claim 44, wherein simultaneously rotating the bin sub- frame and the first conveyor belt surface causes the items to rest on an unsupported portion of the first conveyor belt surface.

50. The method of claim 44, wherein dropping the items from the first conveyor belt surface onto the item output flow path comprises dropping the items a vertical distance of less than 2 inches.

51. The method of claim 44, wherein the second lateral axis is parallel to the first lateral axis.

52. The method of claim 44, wherein the second lateral axis is perpendicular to the first lateral axis.

53. The method of claim 44, wherein the items are strawberries.

54. The method of claim 53, wherein the item output flow path conveys the strawberries to a strawberry pack line.

* * * * *